(12) United States Patent
Moon et al.

(10) Patent No.: US 12,548,208 B2
(45) Date of Patent: Feb. 10, 2026

(54) WEARABLE DEVICE FOR DISPLAYING VISUAL OBJECT FOR CONTROLLING VIRTUAL OBJECT AND METHOD THEREOF

(71) Applicant: Samsung Electronics Co., Ltd., Suwon-si (KR)

(72) Inventors: Harin Moon, Suwon-si (KR); Wanje Park, Suwon-si (KR); Eunkyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 18/475,848

(22) Filed: Sep. 27, 2023

(65) Prior Publication Data

US 2024/0169603 A1 May 23, 2024

Related U.S. Application Data

(63) Continuation of application No. PCT/KR2023/012137, filed on Aug. 17, 2023.

(30) Foreign Application Priority Data

Nov. 21, 2022 (KR) .......................... 10-2022-0156800
Dec. 15, 2022 (KR) .......................... 10-2022-0176367

(51) Int. Cl.
*G06T 11/00* (2006.01)
*G06T 7/70* (2017.01)

(52) U.S. Cl.
CPC ............... *G06T 11/00* (2013.01); *G06T 7/70* (2017.01)

(58) Field of Classification Search
CPC ................................... G06T 11/00; G06T 7/70
See application file for complete search history.

(56) References Cited

U.S. PATENT DOCUMENTS 10,546,426 B2 1/2020 Balan et al.
10,692,299 B2 6/2020 Bhushan et al.
(Continued)

FOREIGN PATENT DOCUMENTS

JP 6499384 B2 4/2019
JP 2019-75125 A 5/2019
(Continued)

OTHER PUBLICATIONS

YouTube, HoloLens 2 AR Headset: On Stage Live Demonstration, Feb. 24, 2019, https://youtu.be/ulHPPtPBgHk?t=108.
YouTube, HoloLens 2 Showcase, Mar. 14, 2022, https://youtu.be/5ayOuUl5aMc?t=25.
YouTube, The HoloLens 2 Tour!—Discovering a World of Holograms, Mar. 23, 2021, https://youtu.be/rMks7sMzPxl?t=275.
(Continued)

*Primary Examiner* — Haixia Du
(74) *Attorney, Agent, or Firm* — Jefferson IP Law, LLP

(57) ABSTRACT

A processor of a wearable device is configured to identify locations of one or more virtual objects in a displaying area based on an image including at least a portion of the displaying area. The processor is configured to display, on a plane disposed based on a location of the wearable device in an external space including the wearable device, the image superimposed on one or more visual objects representing the one or more virtual objects. The processor is configured to modify, in response to an input associated with the one or more visual objects, the one or more virtual objects. The present document is associated with a metaverse service for enhancing interconnection between a real object and a virtual object. For example, the metaverse service is provided through a network based on fifth generation (5G) and/or sixth generation (6G).

20 Claims, 33 Drawing Sheets

(56) References Cited

U.S. PATENT DOCUMENTS

| | | | |
|---|---|---|---|
| 10,948,995 B2 | 3/2021 | Kim | |
| 11,175,730 B2 | 11/2021 | Johnson et al. | |
| 11,195,020 B1 | 12/2021 | Yan et al. | |
| 11,205,303 B2 | 12/2021 | Schowengerdt et al. | |
| 11,720,223 B2 | 8/2023 | Kaehler et al. | |
| 11,829,679 B2 | 11/2023 | Smith et al. | |
| 11,972,037 B2 | 4/2024 | Takamizawa et al. | |
| 2014/0218361 A1* | 8/2014 | Abe | A63F 13/42 345/424 |
| 2018/0210628 A1* | 7/2018 | McPhee | G06F 3/04883 |
| 2019/0294314 A1 | 9/2019 | Tada et al. | |
| 2020/0042083 A1 | 2/2020 | Min | |
| 2021/0135895 A1 | 5/2021 | Cheung | |
| 2021/0304465 A1* | 9/2021 | Dryer | G06F 3/0304 |
| 2022/0172439 A1* | 6/2022 | Takamizawa | G06T 19/20 |
| 2022/0319128 A1 | 10/2022 | Bazin et al. | |
| 2022/0319136 A1* | 10/2022 | Zeng | G06T 19/006 |
| 2022/0335695 A1 | 10/2022 | Bastov et al. | |
| 2023/0222742 A1* | 7/2023 | Kawano | G06T 19/006 345/633 |
| 2023/0418430 A1* | 12/2023 | Favale | G06F 3/04845 |

FOREIGN PATENT DOCUMENTS

| | | |
|---|---|---|
| KR | 10-1937823 B1 | 1/2019 |
| KR | 10-2019-0085894 A | 7/2019 |
| KR | 10-2021-0129277 A | 10/2021 |
| KR | 10-2022-0081388 A | 6/2022 |
| KR | 10-2022-0088962 A | 6/2022 |
| KR | 10-2425958 B1 | 7/2022 |
| KR | 10-2022-0115824 A | 8/2022 |
| KR | 10-2022-0121990 A | 9/2022 |
| KR | 10-2022-0138831 A | 10/2022 |
| WO | 2020/179027 A1 | 9/2020 |

OTHER PUBLICATIONS

Apple Developer Documentation, Scanning and detecting 3D objects, https://developer.apple.com/documentation/arkit/content_anchors/scanning_and_detecting_3d_objects.

International Search Report and Written Opinion dated Nov. 24, 2023, issued in International Application No. PCT/KR2023/012137.

* cited by examiner

WEARABLE DEVICE FOR DISPLAYING VISUAL OBJECT FOR CONTROLLING VIRTUAL OBJECT AND METHOD THEREOF

CROSS-REFERENCE TO RELATED APPLICATION(S)

This application is a continuation application, claiming priority under § 365(c), of an International application No. PCT/KR2023/012137, filed on Aug. 17, 2023, which is based on and claims the benefit of a Korean patent application number 10-2022-0156800, filed on Nov. 21, 2022, in the Korean Intellectual Property Office, and of a Korean patent application number 10-2022-0176367, filed on Dec. 15, 2022, in the Korean Intellectual Property Office, the disclosure of each of which is incorporated by reference herein in its entirety.

TECHNICAL FIELD

The disclosure relates to an electronic device for displaying a visual object for controlling a virtual object and a method thereof.

BACKGROUND ART

In order to provide an enhanced user experience, an electronic device that provides an augmented reality (AR) service displaying information generated by computer in association with an external object in the real-world are being developed. The electronic device may be a wearable device that may be worn by a user. For example, the electronic device may be an AR glasses and/or a head-mounted device (HMD).

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device for displaying a visual object for controlling a virtual object and a method thereof.

Additional aspects will be set forth in part in the description which follows and, in part, will be apparent from the description, or may be learned by practice of the presented embodiments.

In accordance with an aspect of the disclosure, a wearable device is provided. The wearable device includes a camera, a display, and a processor. The processor may be configured to obtain, by using the camera disposed toward a direction of a displaying area formed by the display, an image including at least a portion of the displaying area. The processor may be configured to identify locations of one or more virtual objects disposed in the displaying area based on the image. The processor may be configured to display, on a plane disposed based on a location of the wearable device in an external space including the wearable device, the image overlapped with one or more visual objects representing the one or more virtual objects. The one or more visual objects may be disposed on the image based on the identified locations. The processor may be configured to modify, in response to an input associated with the one or more visual objects, the one or more virtual objects.

In accordance with an aspect of the disclosure, a method of an electronic device is provided. The method may includes obtaining, by using a camera of the wearable device disposed toward a direction of a displaying area formed by a display, an image including at least a portion of the displaying area formed by the display of the wearable device. The method may comprise identifying locations of one or more virtual objects disposed in the displaying area based on the image. The method may comprise displaying, on a plane disposed based on a location of the wearable device in an external space including the wearable device, the image overlapped with one or more visual objects representing the one or more virtual objects. The one or more visual objects may be disposed on the image based on the identified locations. The method may comprise modifying, in response to an input associated with the one or more visual objects, the one or more virtual objects.

In accordance with an aspect of the disclosure, a non-transitory computer readable storage medium storing one or more programs is provided. The one or more programs may comprise instructions which, when executed by a processor of a wearable device including a camera a display, cause the wearable device to obtain, by using the camera disposed toward a direction of a displaying area formed by the display, an image including at least portion of the displaying area. The non-transitory computer readable storage medium storing the one or more programs, the one or more programs may comprise instructions which, when executed by the processor, cause the wearable device to identify locations of one or more virtual objects disposed in the displaying area based on the image. The non-transitory computer readable storage medium storing the one or more programs, the one or more programs may comprise instructions which, when executed by the processor, cause the wearable device to display, on a plane disposed based on a location of the wearable device in an external space including the wearable device, the image overlapped with one or more visual objects representing the one or more virtual objects. The one or more visual objects may be disposed on the image based on the identified locations. The non-transitory computer readable storage medium storing the one or more programs, the one or more programs may comprise instructions which, when executed by the processor, cause the wearable device to modify, in response to an input associated with the one or more visual objects, the one or more virtual objects.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that a singular forms "a," "an," and "the" include plural referents unless the context clearly dictates otherwise. Thus, for example, reference to "a component surface" includes reference to one or more of such surfaces.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 1A:
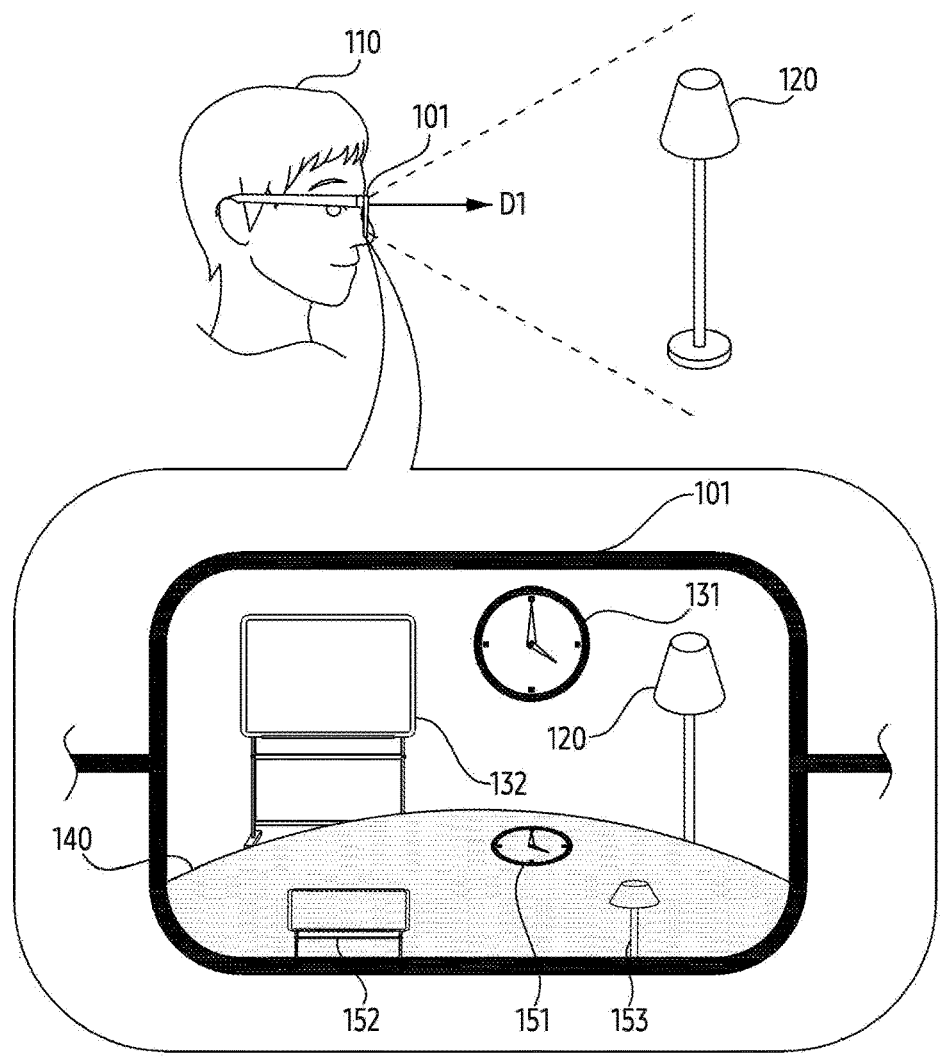
FIGS. 1A and 1B illustrate an example of a user interface (UI) displayed by a wearable device based on a motion of the wearable device, according to an embodiment.
Figure 1A:
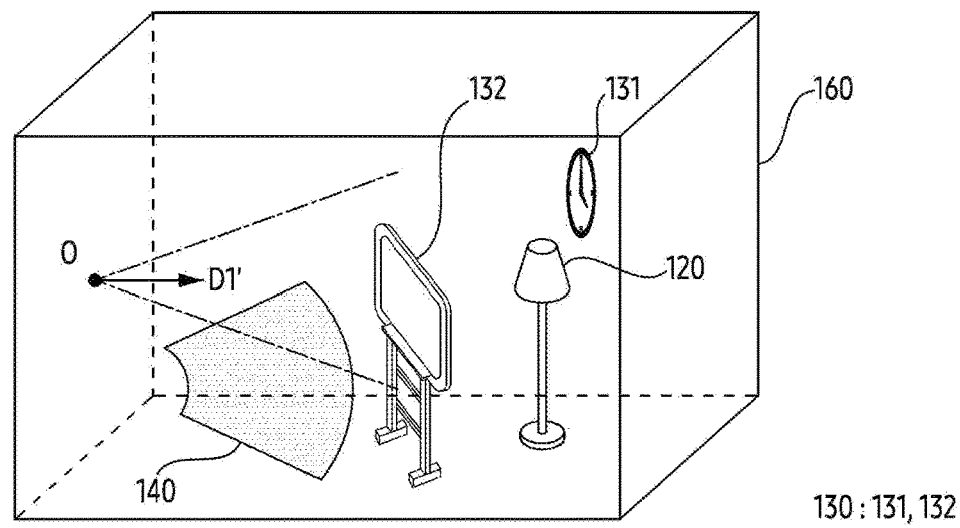
Figure 1B:
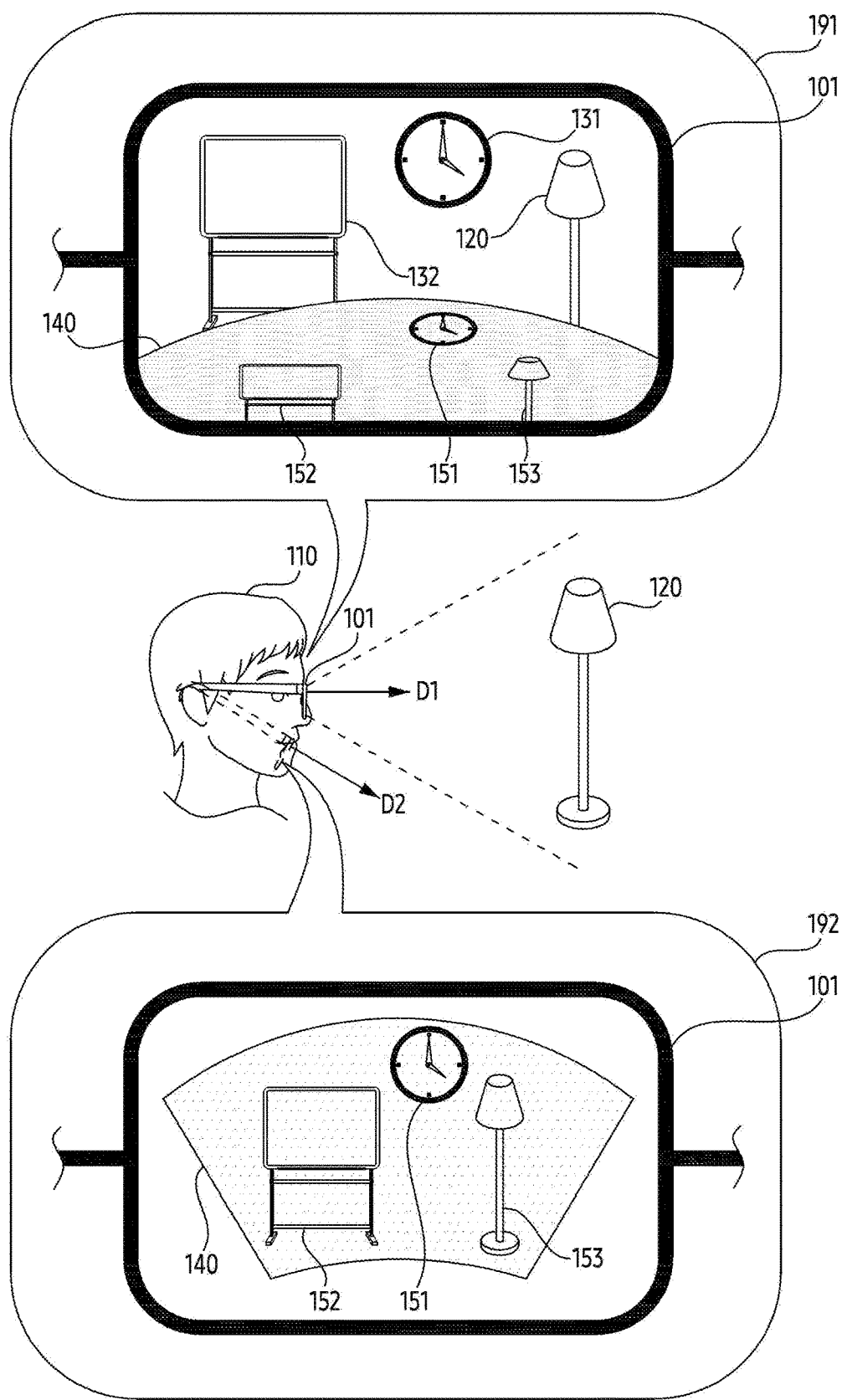

FIGS. 1A and 1B illustrate an example of a user interface (UI) displayed by a wearable device 101 based on a motion of the wearable device 101, according to an embodiment.

Referring to FIGS. 1A and 1B, the wearable device 101 according to an embodiment may include a head-mounted display (HMD) wearable on a head of a user 110. Although the appearance of the wearable device 101 is illustrated in a form of glasses, embodiment is not limited thereto. An example of a structure of the wearable device 101 wearable on the head of the user 110 will be described with reference to FIGS. 3A and 3B and/or 4A and 4B. One or more hardware included in the wearable device 101 will be described with reference to FIG. 2.

According to an embodiment, the wearable device 101 may perform a function associated with an augmented reality (AR) and/or a mixed reality (MR). Referring to FIGS. 1A and 1B, while the user 110 wears the wearable device 101, the wearable device 101 may include at least one lens disposed adjacent to the user 110's eye. The wearable device 101 may combine light emitted from a display of the wearable device 101 with ambient light passing through the lens. The displaying area of the display may be formed within a lens through which the ambient light passes. Since the wearable device 101 combines the ambient light and the light emitted from the display, the user 110 may see an image mixed a real object recognized by the ambient light and a virtual object formed by the light emitted from the display.

According to an embodiment, the wearable device 101 may perform a function associated with a video-see through (or visual-see-through (VST)) and/or a virtual reality (VR). Referring to FIGS. 1A and 1B, the wearable device 101 may include a housing covering eyes of the user 110, while the user 110 wears the wearable device 101. The wearable device 101 may include a display disposed on a first surface facing the eye within the state. The wearable device 101 may include a camera disposed on a second surface opposite to the first surface. The wearable device 101 may obtain frames including ambient light, by using the camera. The wearable device 101 may make the user 110 to recognize the ambient light through the display, by outputting the frames in the display disposed on the first surface. A displaying area of the display disposed on the first surface may be formed by one or more pixels included in the display. The wearable device 101 may make the user 110 to recognize a virtual object together with a real object recognized by the ambient light, by synthesizing the virtual object within frames outputted through the display.

According to an embodiment, the wearable device 101 may provide a user experience based on a mixed reality (MR) by using a space 160. The wearable device 101 may generate the space 160 mapped to an external space by recognizing the external space including the wearable device 101. The embodiment is not limited thereto, and the wearable device 101 may provide a user experience based on augmented reality and/or virtual reality by using the space 160. Recognizing the external space by the wearable device 101 may include obtaining information on size of the external space (e.g., the size of the external space distinguished by side wall, floor surface, and/or ceiling surface). Recognizing the external space by the wearable device 101 may include identifying a real object 120 included in the external space. Identifying the real object 120 by the wearable device 101 may include identifying a location of the real object 120 in the external space. Identifying the real object 120 by the wearable device 101 may include identifying size (e.g., width, height, altitude, and/or length) of the real object 120. Generating the space 160 by the wearable device 101 may include generating information for performing 3D rendering with respect to the space 160.

According to an embodiment, the wearable device 101 may display a virtual object 130 together with the real object 120 included in a displaying area. In a state in which the user 110 wears the wearable device 101, the user 110 may see an image mixed the real object 120 and the virtual object 130, through the displaying area. Referring to FIG. 1A, a state in which the wearable device 101 displays a first virtual object 131 and a second virtual object 132 together with the real object 120 in the displaying area when the first virtual object 131 and the second virtual object 132 are included in the space 160 will be illustrated.

In a state of FIG. 1A, the wearable device 101 may identify a point O in the space 160 corresponding to a location of the wearable device 101 in the external space and a direction D1' in the space 160 corresponding to a direction of the wearable device 101 D1. The wearable device 101 may identify the location and/or direction D1 of the wearable device 101 in the external space, by using a sensor and/or a camera included in the wearable device 101. Based on the point O in the space 160 corresponding to the location and the direction D1' in the space 160 corresponding to the direction D1, the wearable device 101 may identify a view angle indicating a portion of the space 160 to be displayed through the displaying area. Referring to FIG. 1A, the wearable device 101 may display at least a portion of the first virtual object 131 included in the view angle, in the displaying area. Similarly, the wearable device 101 may display the second virtual object 132 in the displaying area, based on whether the second virtual object 132 is at least partially included in the view angle.

Referring to FIG. 1A, the virtual object 130 (e.g., the first virtual object 131 and/or the second virtual object 132) may be spaced apart from the point O in the space 160. The wearable device 101 may display the first virtual object 131 in the displaying area so that the first virtual object 131 has a perspective based on a distance between the point O and the first virtual object 131 in the space 160. For example, the wearable device 101 may display the first virtual object 131 based on binocular disparity corresponding to the distance. The binocular disparity may be inversely proportional to a distance between the eyes and the object. Referring to an example of FIG. 1A, the first virtual object 131 may be further away from the point O in the space 160 corresponding to the wearable device 101 than the second virtual object 132. In the example, the binocular disparity of the first virtual object 131 in the displaying area may be smaller than the binocular disparity of the second virtual object 132.

According to an embodiment, the wearable device 101 may execute a function for controlling the virtual object 130, based on the space 160. The function may include a parallel translation and/or a rotational displacement of the virtual object 130 in the space 160. The function may include one or more functions provided by an application connected to the virtual object 130. For example, the wearable device 101 may execute the function based on a body part (e.g., hand) of the user 110 moved toward the virtual object 130. In the example, as a distance between the wearable device 101 and the virtual object 130 increases, the user 110 may extend his/her hand further.

According to an embodiment, the wearable device 101 may provide a control panel for remotely controlling the virtual object 130. Referring to FIG. 1A, a case in which the wearable device 101 displays a control panel in a form of a control panel 140 is illustrated. The control panel may be referred to as a desk, a virtual desk, and/or a My Desk. In the space 160, the control panel 140 in which the control panel is formed may be adjoin to the point O corresponding to the wearable device 101. According to an embodiment, an example of an operation in which the wearable device 101 determines and/or modifies a location of the control panel 140 in the space 160 will be described with reference to FIGS. 6A, 6B, and 7 to 9. Hereinafter, it is assumed that the control panel 140 is disposed below the point O corresponding to the wearable device 101 in the space 160.

Referring to FIG. 1A, a case in which the wearable device 101 displays at least a portion of the control panel 140 based on the direction D1 of the wearable device 101 is illustrated. In order to remotely control the virtual object 130, the wearable device 101 may display the virtual object 130 two-dimensionally in the control panel 140. For example, the wearable device 101 may display a first visual object 151 corresponding to the first virtual object 131 included in the displaying area, in the control panel 140. The wearable device 101 may display a second visual object 152 corresponding to the second virtual object 132 shown through the displaying area in the control panel 140. The wearable device 101 may display a third visual object 153 representing the real object 120 shown through the displaying area in the control panel 140.

Referring to FIG. 1B, different states 191 and 192 of a screen shown along with directions D1 and D2 of the wearable device 101 through the displaying area of the wearable device 101 are illustrated. In a state 191 in which the wearable device 101 faces the direction D1, the wearable device 101 may display the first virtual object 131 and the second virtual object 132 based on the view angle in the space 160 corresponding to the direction D1, together with at least a portion of the control panel 140. In a state in which the wearable device 101 faces the direction D2, the wearable device 101 may display the control panel 140. When the user 110 looks above the direction D1, the wearable device 101 may cease displaying the control panel 140 or display the control panel 140 based on an area smaller than an area displayed in the state 191. When ceasing to display the control panel 140, the wearable device 101 may display a visual object (e.g., a visual affordance in a form of a miniature of the control panel 140) to guide the control panel 140.

Referring to FIG. 1B, an example in which the wearable device 101 displays the control panel 140 having a fan shape in the displaying area in the state 192 is illustrated, but a shape of the control panel 140 is not limited thereto. For example, the shape of the control panel 140 may include polygons such as triangles, squares, and/or pentagons, or may have a shape of a closed curve. In the control panel 140, the wearable device 101 may display a visual object (e.g., the first visual object 151 and/or the second visual object 152) representing each of the virtual objects 130 (e.g., the first virtual object 131 and/or a second virtual object 132) shown along the direction D1. In the control panel 140, the wearable device 101 may display the third visual object 153 corresponding to the real object 120 shown to the user 110 in the state 191. For example, the virtual object displayed on the control panel 140 may be visually distinguished from the real object displayed or provided on the control panel 140. For example, based on whether the visual object displayed on the control panel 140 corresponds to any one of a real object or a virtual object, the wearable device 101 may display an outline and/or a pattern surrounding the visual object, or may display brightness and/or chroma of the visual object. For example, the wearable device 101 may display the third visual object 153 using a chroma different from the first visual object 151 and the second visual object 152, to inform that the third visual object 153 is the real object 120. For example, the wearable device 101 may emphasize the first visual object 151 to the second visual object 152 among the first visual object 151 to the third visual object 153, by using the outline and/or the pattern. The pattern may include one or more dots and/or parallel lines overlapped the visual object. For example, an image displayed on the control panel 140 may be associated with an image shown to the user 110 wearing the wearable device 101 in a specific direction (e.g., the direction D1). For example, the wearable device 101 may visualize a map (e.g., a mini map) with respect to a virtual object (e.g., the first virtual object 131 and/or the second virtual object 132) shown in the direction D1, through the control panel 140.

According to an embodiment, the wearable device 101 may control the virtual object 130 in response to an input associated with a visual object displayed in the control panel 140. For example, the wearable device 101 may move the first virtual object 131 matched to the first visual object 151, in response to an input indicating to move the first visual object 151 in the control panel 140. In the example, the wearable device 101 may move the first virtual object 131 based on the input received in the state 192. In the above assumption, since the control panel 140 is disposed closer to the point O than the first virtual object 131 in the space 160, the user 110 may move the first virtual object 131 by using the first visual object 151 in the control panel 140 disposed closer than the first virtual object 131 in the space 160. According to an embodiment, an operation in which the wearable device 101 controls the virtual object 130 by using the visual objects (e.g., the first visual object 151 to the second visual object 152) displayed in the control panel 140 will be described with reference to FIGS. 10A to 10D, 11A to 11C, and 12 to 14.

In an embodiment, a control panel such as the control panel 140 may be displayed not only through the wearable device 101 but also through an external electronic device such as a smartphone and/or a tablet. According to an embodiment, an example of an operation performed by the wearable device 101 and/or an external electronic device based on the control panel 140 will be described with reference to FIGS. 15A and 15B, and/or 16. In an embodiment, the wearable device 101 may display an area for controlling information sharing with an external electronic device different from wearable device 101, within a control panel such as the control panel 140. An example of an operation in which the wearable device 101 displays the area will be described with reference to FIGS. 17A to 17D, 18, and 19.

Hereinafter, according to an embodiment, one or more programs executed by at least one hardware included in the wearable device 101 and the wearable device 101 will be described with reference to FIG. 2.

Figure 2:
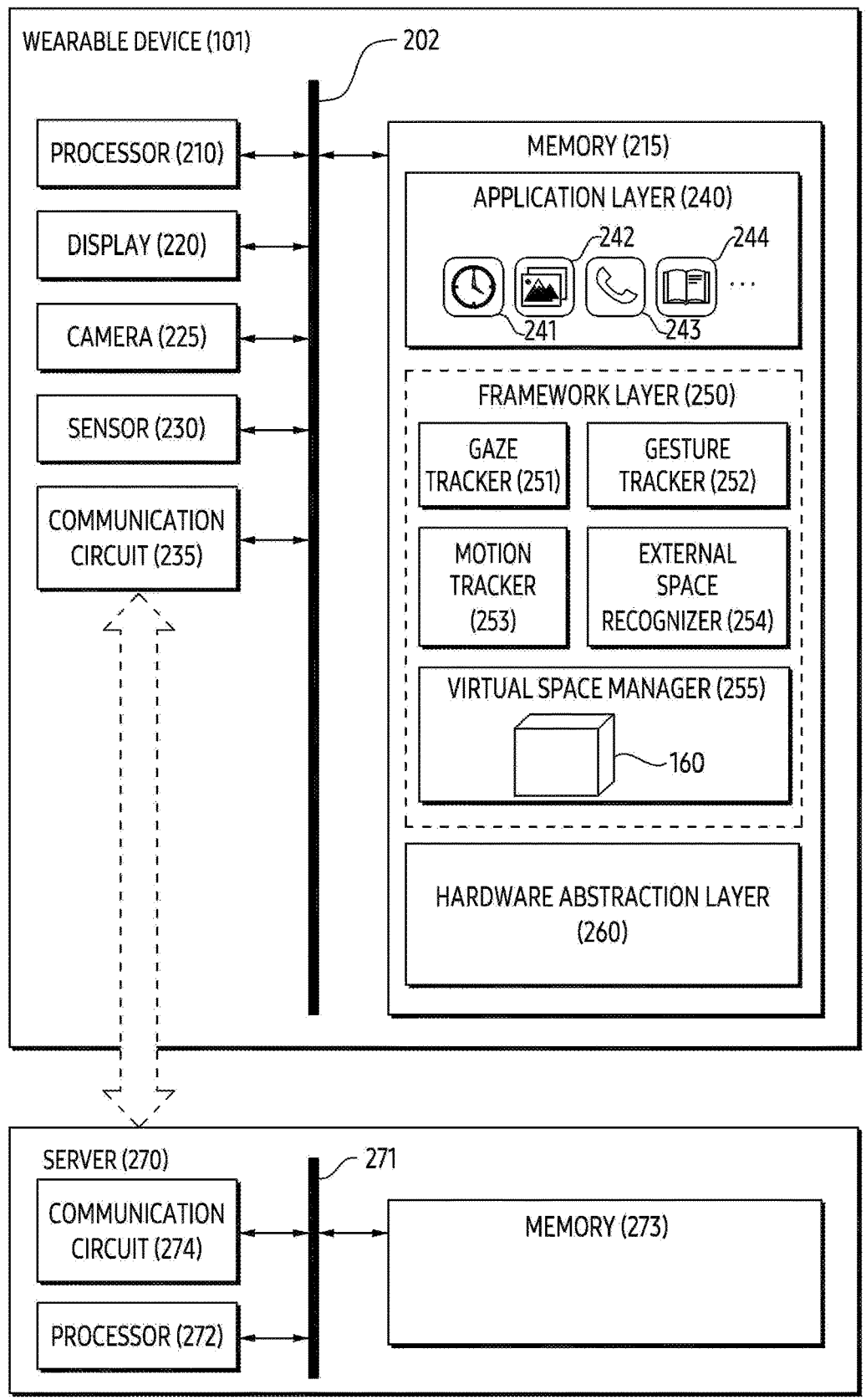
FIG. 2 illustrates a block diagram of a wearable device, according to an embodiment.

FIG. 2 illustrates a block diagram of a wearable device 101, according to an embodiment. The wearable device 101 of FIG. 2 may include the wearable device 101 of FIGS. 1A and 1B.

According to an embodiment, the wearable device 101 may include at least one of a processor 210, a memory 215, a display 220, a camera 225, a sensor 230, or a communication circuit 235. The processor 210, the memory 215, the display 220, the camera 225, the sensor 230, or the communication circuit 235 are electronically and/or operably coupled with each other by an electronical component such as a communication bus 202. Hereinafter, the operational coupling of hardware may mean that a direct or indirect connection between hardware is established by wire or wirelessly, so that a second hardware is controlled by a first hardware among the hardware. Although illustrated based on different blocks, embodiments are not limited thereto, and a portion (e.g., at least a portion of the processor 210, the memory 215, and the communication circuit 235) of the hardware of FIG. 2 may be included in a single integrated circuit such as a system on a chip (SoC). The type and/or number of hardware included in the wearable device 101 is not limited to an embodiment of FIG. 2. For example, the wearable device 101 may include only a portion of the hardware illustrated in FIG. 2.

In an embodiment, the processor 210 of the wearable device 101 may include hardware for processing data based on one or more instructions. The hardware for processing data may include, for example, an arithmetical and logical unit (ALU), a floating point unit (FPU), a field programmable gate array (FPGA), a central processing unit (CPU), and/or an application processor (AP). The processor 210 may have a structure of a single-core processor, or a structure of a multi-core processor such as a dual core, a quad core, or a hexa.

According to an embodiment, the memory 215 of the wearable device 101 may include a hardware component for storing data and/or instructions inputted and/or outputted to the processor 210 of the wearable device 101. The memory 215 may include a volatile memory such as a random-access memory (RAM) and/or a non-volatile memory such as a read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

In an embodiment, the display 220 of the wearable device 101 may output visualized information (e.g., a visualized object and/or a screen illustrated in FIGS. 1A, 1B, 6A, 7, 8, 10A to 10D, 11A to 11C, 12, 13, 15A, and 15B, and 16 to 18 and/or screen) to a user (e.g., the user 110 of FIGS. 1A and 1B). For example, the display 220 may be controlled by the processor 210 including a circuit such as a graphic processing unit (GPU) to output visualized information to the user. The display 220 may include a flat panel display (FPD) and/or an electronic paper. The FPD may include a liquid crystal display (LCD), a plasma display panel (PDP), and/or one or more light emitting diode (LED). The LED may include an organic LED (OLED). The display 220 of FIG. 2 may include at least one display 350 that will be described later with reference to FIGS. 3A and 3B and/or 4A and 4B.

In an embodiment, the camera 225 of the wearable device 101 may include one or more optical sensors (e.g., a charged coupled device (CCD) sensor, a complementary metal oxide semiconductor (CMOS) sensor) that generate an electrical signal indicating color and/or brightness of light. A plurality of optical sensors included in the camera 225 may be disposed in a form of a 2-dimensional array. The camera 225 may generate 2-dimensional frame data corresponding to light reaching the light sensors of the 2-dimensional array, by substantially simultaneously obtaining electrical signals of each of the plurality of optical sensors. For example, the photographic data captured using the camera 225 may mean a 2-dimensional frame data obtained from the camera 225. For example, video data captured using the camera 225 may mean a sequence of a plurality of 2-dimensional frame data obtained from the camera 225 according to a frame rate. The camera 225 may further include a flashlight disposed in a direction in which the camera 225 receives light and for outputting light in the direction. Although the camera 225 is illustrated based on single block, the number of the camera 225 included in the wearable device 101 is not limited to the embodiment. The wearable device 101 may include one or more cameras, such as one or more cameras 340 that will be described later with reference to FIGS. 3A and 3B and/or 4A and 4B.

According to an embodiment, the sensor 230 of the wearable device 101 may generate electronic information processable by the processor 210 and/or the memory 215 of the wearable device 101, from non-electronic information associated with the wearable device 101. The information may be referred to as sensor data. The sensor 230 may include a global positioning system (GPS) sensor for detecting a geographic location of the wearable device 101, an image sensor, an illumination sensor and/or a time-of-light (ToF) sensor, and an inertial measurement unit (IMU) for detecting physical motion of the wearable device 101. For example, the wearable device 101 may identify a direction (e.g., directions D1 and D2 of FIGS. 1A and 1B) of the wearable device 101 by using the sensor 230 including the IMU.

In an embodiment, the communication circuit 235 of the wearable device 101 may include hardware components to support a transmission and/or reception of an electrical signal between the wearable device 101 and the external electronic device. The communication circuit 235 may include, for example, at least one of a MODEM, an antenna, and an optic/electronic (O/E) converter. The communication circuit 235 may support a transmission and/or reception of an electrical signal, based on various types of protocols, such as Ethernet, a local area network (LAN), a wide area network (WAN), a wireless fidelity (Wi-Fi), Bluetooth, Bluetooth low energy (BLE), ZigBee, a long term evolution (LTE), fifth generation (5G) new radio (NR).

Although not illustrated, according to an embodiment, the wearable device 101 may include an output means for outputting information in a form other than a visualized form. For example, the wearable device 101 may include a speaker for outputting an acoustic signal. For example, the wearable device 101 may include a motor for providing vibration-based haptic feedback.

According to an embodiment, one or more instructions (or commands) indicating calculation and/or operation to be performed on data by the processor 210 of the wearable device 101 may be stored in the memory 215 of the wearable device 101. A set of one or more instructions may be referred to as a program, firmware, operating system, process, routine, sub-routine, and/or application. Hereinafter, a fact that an application is installed in the electronic device (e.g., the wearable device 101) means that one or more instructions provided in a form of the application are stored in the memory 215, and it may mean that the one or more of the applications are stored in an executable format (e.g., a file with an extension specified by the operating system of the wearable device 101) by the processor of the electronic device.

Referring to FIG. 2, programs installed in the wearable device 101 may be classified into any one of different layers including an application layer 240, a framework layer 250, and/or a hardware abstraction layer (HAL) 260 based on a target. For example, programs (e.g., drivers) designed to target hardware (e.g., the display 220, the camera 225, the sensor 230, and/or the communication circuit 235) of the wearable device 101 may be classified, in the hardware abstraction layer 260. For example, in the framework layer 250, programs (e.g., a gaze tracker 251, a gesture tracker 252, a motion tracker 253, an external space recognizer 254, and/or a virtual space manager 255) designed to target at least one of the hardware abstraction layer 260 and/or the application layer 240 may be classified. Programs classified into the framework layer 250 may provide an application programming interface (API) executable based on another program.

Referring to FIG. 2, a program designed to target a user (e.g., the user 110 of FIGS. 1A and 1B) controlling the wearable device 101 may be classified within the application layer 240. Referring to FIG. 2, a watch application 241, a gallery application 242, a call application 243, and/or a note application 244 are exemplified as an example of programs classified into the application layer 240, but embodiments are not limited thereto. For example, programs classified as the application layer 240 (e.g., the application software) may cause execution of a function supported by programs classified as the framework layer 250, by calling the API.

Referring to FIG. 2, the wearable device 101 may process information associated with the user's gaze wearing the wearable device 101, based on the execution of the gaze tracker 251. For example, the wearable device 101 may obtain an image including the user's eyes from the camera 225. Based on a location and/or direction of pupil included in the image, the wearable device 101 may identify a direction of the user's gaze.

Referring to FIG. 2, the wearable device 101 may identify motion of a preset body part including a hand, based on the execution of the gesture tracker 252. For example, the wearable device 101 may obtain frames including the preset body part from the camera 225. Based on motion and/or posture of the preset body part indicated by the frames, the wearable device 101 may identify a gesture performed by the preset body part.

Referring to FIG. 2, the wearable device 101 may identify a motion of the wearable device 101 based on the execution of the motion tracker 253. The motion of the wearable device 101 may be associated with a motion of the user's head, in a state in which the wearable device 101 is worn by the user. For example, the wearable device 101 may identify a direction of the wearable device 101 that substantially coincide with the direction of the head, such as the directions D1 and D2 in FIGS. 1A and 1B. The wearable device 101 may identify the motion of the wearable device 101 based on sensor data of the sensor 230 including the IMU.

Referring to FIG. 2, the wearable device 101 may obtain information on an external space including the wearable device 101, based on the execution of the external space recognizer 254. The wearable device 101 may obtain the information using the camera 225 and/or the sensor 230. Referring to FIG. 2, the wearable device 101 may process information on the space 160, based on the execution of the virtual space manager 255. In a state in which the virtual space manager 255 is executed, the wearable device 101 may identify the space 160 mapped to the external space, based on the information obtained based on the external space recognizer 254. In case of identifying a real object (e.g., the real object 120 in FIGS. 1A and 1B) in the external space based on the external space recognizer 254, the wearable device 101 may identify at least a portion occupied by the real object in the space 160, based on the mapping between the external space and the space 160 by the virtual space manager 255. Based on the execution of the external space recognizer 254 and/or the motion tracker 253, the wearable device 101 may identify a location and/or direction of the wearable device 101 in the external space. For example, based on the execution of the external space recognizer 254, the motion tracker 253, and/or the virtual space manager 255, the wearable device 101 may perform simultaneous localization and mapping (SLAM) to recognize the external space and a location of the wearable device 101 in the external space.

According to an embodiment, the wearable device 101 may add, delete, and/or modify a virtual object (e.g., the virtual object 130 of FIGS. 1A and 1B) in the space 160, based on the execution of the virtual space manager 255. The addition, deletion, and/or modification of the virtual object may be performed by calling the API provided by the virtual space manager 255. The API may be called based on the execution of a program included in the application layer 240. For example, based on the execution of the watch application 241, the processor 210 may add a virtual object (e.g., the first virtual object 131 of FIGS. 1A and 1B) having a watch shape in the space 160, by using the virtual space manager 255. For example, based on the execution of the note application 244, the processor 210 may add a virtual object (e.g., the second virtual object 132 of FIGS. 1A and 1B) having a shape of a blackboard in the space 160, by using the virtual space manager 255.

According to an embodiment, the wearable device 101 may generate a control panel for controlling a virtual object in the space 160, based on the execution of the virtual space manager 255. The wearable device 101 may add a control panel having a preset shape (e.g., a fan shape) in the space 160, such as the control panel 140 of FIGS. 1A and 1B. A location of the control panel added to the space 160 may be determined based on a location and/or direction of the wearable device 101 identified by the motion tracker 253, in the external space recognized by the external space recognizer 254. The size of the control panel may be determined based on a location and a direction of the wearable device 101 identified by the motion tracker 253, and/or a user's gesture identified by the gesture tracker 252.

Referring to FIG. 2, according to an embodiment, the wearable device 101 may communicate with a server 270 by using the communication circuit 235. The server 270 may include at least one of a processor 272, a memory 273, or a communication circuit 274. The processor 272, the memory 273, and the communication circuit 274 may be electrically and/or operably connected with each other by electronic components such as a communication bus 271, in the server 270. Each of the processor 272, the memory 273, and the communication circuit 274 in the server 270 may correspond to each of the processor 210, the memory 215, and the communication circuit 235 in the wearable device 101. In order to reduce repetition of the description, among the descriptions of the processor 272, the memory 273, and the communication circuit 274, overlapping descriptions with the processor 210, memory 215, and communication circuit 235 in the wearable device 101 may be omitted.

According to an embodiment, the wearable device 101 may communicate with the server 270, based on the execution of at least one of the programs classified as the framework layer 250. For example, in a state in which the gaze tracker 251 is executed, the wearable device 101 may process information associated with the user's gaze, by communicating with the server 270. For example, in a state in which the gesture tracker 252 is executed, the wearable device 101 may recognize a gesture performed by a preset body part including a hand, by communicating with the server 270. For example, in a state in which the external space recognizer 254 is executed, the wearable device 101 may obtain information on the external space by communicating with the server 270.

According to an embodiment, the wearable device 101 may communicate with the server 270 based on the execution of the virtual space manager 255. In a state in which the virtual space manager 255 is executed, the wearable device 101 may obtain information associated with the space 160 from the server 270. The information associated with the space 160 may include information (e.g., a location in the space 160 and/or size of the virtual object) on at least one virtual object disposed in the space 160. The wearable device 101 may obtain information associated with a control panel disposed in the space 160, by communicating with the server 270. The wearable device 101 may transmit a signal with respect to a user input identified by the camera 225 and/or the sensor 230 to the server 270. The user input may include a user input indicating control of a virtual object and/or a control panel. The wearable device 101 may receive information to modify at least one virtual object in the space 160 and/or the space 160, in response to the signal, from servers 270. Based on the information, the wearable device 101 may modify at least one virtual object in the space 160 and/or the space 160 by executing the virtual space manager 255. In a state in which the virtual space manager 255 is executed, the wearable device 101 may perform rendering on at least a portion of the space 160, based on information associated with the space 160. The virtual object 130 and/or visual object (e.g., the first visual object 151 to the third visual object 153 included in the control panel 140) displayed in the displaying area of FIGS. 1A and 1B may be displayed based on the rendering.

Referring to FIG. 2, an embodiment in which the wearable device 101 executes the virtual space manager 255 is illustrated, but the embodiment is not limited thereto. For example, the virtual space manager 255 may be stored in the memory 273 of the server 270. In the example, the server 270 may modify at least a portion of the space 160, based on information transmitted from the wearable device 101, in a state in which the virtual space manager 255 is executed. In the example, the server 270 may transmit information for visualizing at least a portion of the space 160 to the wearable device 101.

As described above, according to an embodiment, the wearable device 101 may execute one or more programs for recognizing an external space including the wearable device 101. The wearable device 101 may provide a user experience based on AR, MR, and/or VST, by using the space 160 mapped to the external space. For example, the wearable device 101 may display a screen in which a real object and a virtual object are mixed to a user through the display 220. In order to support a control of a virtual object separated from the user in the screen, the wearable device 101 may form a control panel adjacent to the user. Based on the control panel, the wearable device 101 may support controlling the virtual object independently of a gesture that directly controls the virtual object separated from the user.

Hereinafter, according to an embodiment, an example of a form factor of the wearable device 101 will be described, by using FIGS. 3A and 3B and/or 4A and 4B.

Figure 3A:
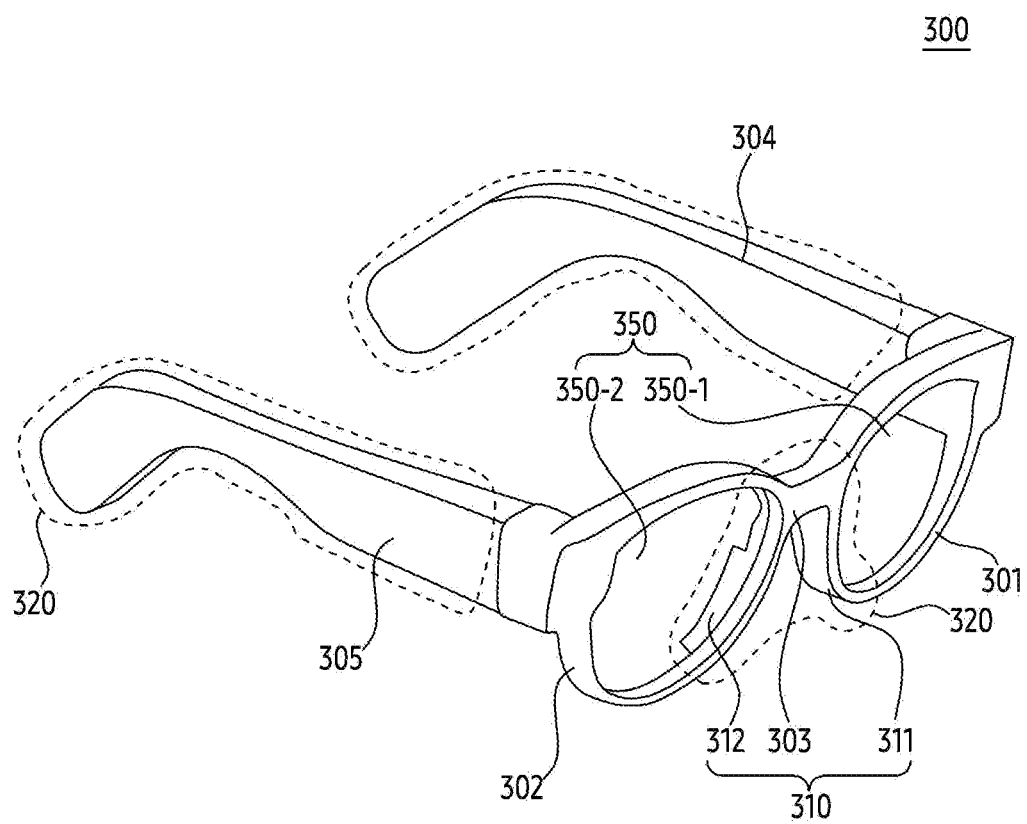
FIG. 3A illustrates an example of a perspective view of a wearable device, according to an embodiment.

FIG. 3A illustrates an example of a perspective view of a wearable device 300 according to an embodiment. FIG. 3B illustrates an example of one or more hardware disposed in a wearable device 300 according to an embodiment. The wearable device 300 of FIGS. 3A and 3B may include the wearable device 101 of FIGS. 1A and 1B and/or 2. Referring to FIG. 3A, according to an embodiment, the wearable device 300 may include at least one display 350 and a frame supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image to a user through the at least one display 350 in response to a user's preset gesture obtained through a motion recognition camera 340-2 of FIG. 3B.

According to an embodiment, the at least one display 350 in the wearable device 300 may provide visual information to a user. The at least one display 350 may include the display 220 of FIG. 2. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Figure 3B:
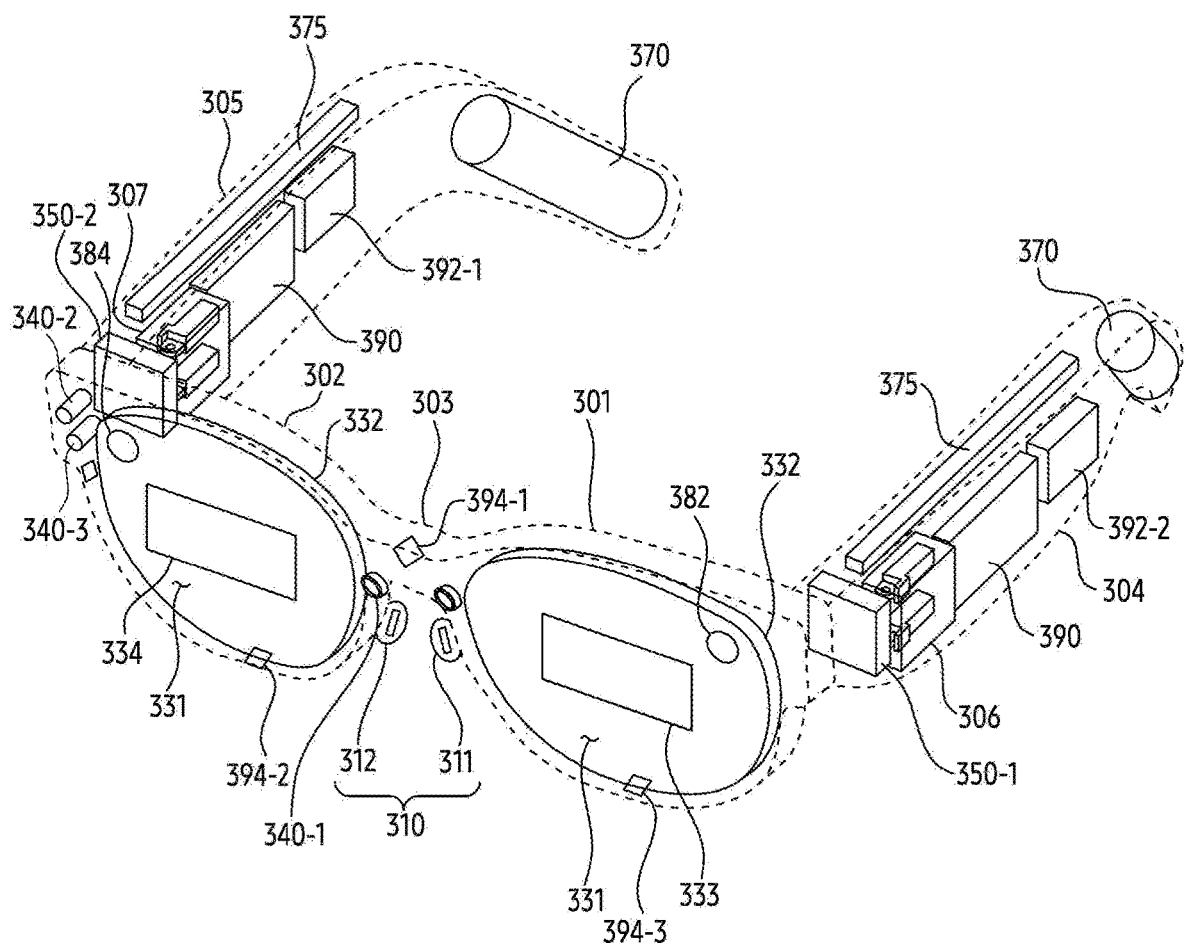
FIG. 3B illustrates an example of one or more hardware disposed in a wearable device, according to an embodiment.

Referring to FIG. 3B, the at least one display 350 may provide another visual information, which is distinct from the visual information, together with the visual information included in the ambient light passing through the lens, a user wearing the wearable device 300, by forming a displaying area on the lens. The lens may be formed based on at least one of a fresnel lens, a pancake lens, or a multi-channel lens. For example, the displaying area formed by the at least one display 350 may be formed on the second surface 332 among the first surface 331 and the second surface 332 of the lens. When the user wears the wearable device 300, the ambient light may be transmitted to the user by being incident on the first surface 331 and being penetrated through the second surface 332. For another example, the at least one display 350 may display the virtual reality image to be combined with a real screen transmitted through the ambient light. The virtual reality image outputted from the at least one display 350 may be transmitted to the user's eyes through the one or more hardware (e.g., optical devices 382 and 384, and/or at least one waveguides 333 and 334)) included in the wearable device 300.

According to an embodiment, the wearable device 300 may include the waveguides 333 and 334 that diffracts light transmitted from the at least one display 350 and relayed by the optical devices 382 and 384 and transmits it to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident to one end of the waveguides 333 and 334 may be propagated to the other end of the waveguides 333 and 334 by the nano pattern. The waveguides 333 and 334 may include at least one of at least one diffraction element (e.g., a diffractive optical element (DOE), a holographic optical element (HOE)), and a reflection element (e.g., a reflection mirror). For example, the waveguides 333 and 334 may be disposed in the wearable device 300 to guide a screen displayed by the at least one display 350 to the user's eyes. For example, the screen may be transmitted to the user's eyes based on total internal reflection (TIR) generated in the waveguides 333 and 334.

According to an embodiment, the wearable device 300 may analyze an object included in a real image collected through a photographing camera 340-1, combine virtual object corresponding to an object that become a subject of augmented reality provision among the analyzed object, and display them on the at least one display 350. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLAM) supported by the multi-camera. The user wearing the wearable device 300 may watch an image displayed on the at least one display 350.

According to an embodiment, the frame may be configured with a physical structure in which the wearable device 300 may be worn on the user's body. According to an embodiment, the frame may be configured so that when the user wears the wearable device 300, the first display 350-1 and the second display 350-2 may be positioned corresponding to the user's left and right eyes. The frame may support the at least one display 350. For example, the frame may support the first display 350-1 and the second display 350-2 to be positioned at positions corresponding to the user's left and right eyes.

Referring to FIG. 3A, according to an embodiment, the frame may include an area 320 at least partially in contact with the portion of the user's body in case that the user wears the wearable device 300. For example, the area 320 in contact with the portion of the user's body of the frame may include an area contacting a portion of the user's nose, a portion of the user's ear, and a portion of the side of the user's face that the wearable device 300 contacts. According to an embodiment, the frame may include a nose pad 310 that is contacted on the portion of the user's body. When the wearable device 300 is worn by the user, the nose pad 310 may be contacted on the portion of the user's nose. The frame may include a first temple 304 and a second temple 305 that is contacted on another portion of the user's body that is distinct from the portion of the user's body.

For example, the frame may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 300 may include hardware (e.g., hardware described above based on the block diagram of FIG. 2) that performs various functions. For example, the hardware may include a battery module 370, an antenna module 375, the optical devices 382 and 384, speakers 392-1 and 392-2, microphones 394-1, 394-2, and 394-3, a light emitting module (not illustrated), and/or a printed circuit board 390. Various hardware may be disposed in the frame.

According to an embodiment, the microphone 394-1, 394-2, and 394-3 of the wearable device 300 may obtain a sound signal, by being disposed on at least a portion of the frame. The first microphone 394-1 disposed on the nose pad 310, the second microphone 394-2 disposed on the second rim 302, and the third microphone 394-3 disposed on the first rim 301 are illustrated in FIG. 3B, but the number and disposition of the microphone 394 are not limited to an embodiment of FIG. 3B. In case that the number of the microphone 394 included in the wearable device 300 is two or more, the wearable device 300 may identify the direction of the sound signal by using a plurality of microphones disposed on different portions of the frame.

According to an embodiment, the optical devices 382 and 384 may transmit the virtual object transmitted from the at least one display 350 to the waveguides 333 and 334. For example, the optical devices 382 and 384 may be a projector. The optical devices 382 and 384 may be disposed adjacent to the at least one display 350 or may be included in the at least one display 350 as portion of the at least one display 350. The first optical device 382 may correspond to the first display 350-1, and the second optical device 384 may correspond to the second display 350-2. The first optical device 382 may transmit the light outputted from the first display 350-1 to the first waveguide 333, and the second optical device 384 may transmit light outputted from the second display 350-2 to the second waveguide 334.

In an embodiment, a camera 340 may include an eye tracking camera (ET CAM) 340-1, the motion recognition camera 340-2, and/or the photographing camera 340-3. The photographing camera 340-3, the eye tracking camera 340-1, and the motion recognition camera 340-2 may be disposed at different positions on the frame and may perform different functions. The photographing camera 340-3, the eye tracking camera 340-1, and the motion recognition camera 340-2 may be an example of the camera 225 of FIG. 2. The eye tracking camera 340-1 may output data indicating the gaze of the user wearing the wearable device 300. For example, the wearable device 300 may detect the gaze from an image including the user's pupil obtained through the eye tracking camera 340-1. An example in which the eye tracking camera 340-1 is disposed toward the user's right eye is illustrated in FIG. 3B, but the embodiment is not limited thereto, and the eye tracking camera 340-1 may be disposed alone toward the user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including an image of the specific object obtained by using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350 by tracking the gaze of the user wearing the wearable device 300. For example, when the user looks at the front, the wearable device 300 may naturally display environment information associated with the user's front on the at least one display 350 at the position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

In an embodiment, the motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to the gesture by recognizing the user's gesture, and may provide a display corresponding to the signal to the at least one display 350. The processor may identify a signal corresponding to the operation and may perform a preset function based on the identification. In an embodiment, the motion recognition camera 340-2 may be disposed on the first rim 301 and/or the second rim 302.

In an embodiment, the camera 340 included in the wearable device 300 is not limited to the above-described eye tracking camera 340-1 and the motion recognition camera 340-2. For example, the wearable device 300 may identify an external object included in the FoV by using the photographing camera 340-3 disposed toward the user's FoV. That the wearable device 300 identifies the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, the wearable device 300 may include the camera 340 (e.g., a face tracking (FT) camera) disposed toward the face in order to obtain an image including the face of the user wearing the wearable device 300.

Although not illustrated, the wearable device 300 according to an embodiment may further include a light source (e.g., LED) that emits light toward a subject (e.g., user's eyes, face, and/or an external object in the FoV) photographed by using the camera 340. The light source may include an LED having an infrared wavelength. The light source may be disposed on at least one of the frame, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electronically and/or operably connected to a communication circuit (e.g., the communication circuit 235 of FIG. 2) of the wearable device 300. In an embodiment, the antenna module 375 may be disposed in the first temple 304 and/or the second temple 305. For example, the antenna module 375 may be disposed close to one surface of the first temple 304 and/or the second temple 305.

In an embodiment, the speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include the second speaker 392-2 disposed adjacent to the user's left ear by being disposed in the first temple 304, and the first speaker 392-1 disposed adjacent to the user's right ear by being disposed in the second temple 305.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, in case that the wearable device 300 needs charging, it may repeatedly emit red light at a preset timing. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 or the second temple 305. The PCB 390 may include an interposer disposed between at least two sub PCBs. On the PCB 390, one or more hardware (e.g., hardware illustrated by the blocks described above with reference to FIG. 2) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

Figure 4A:
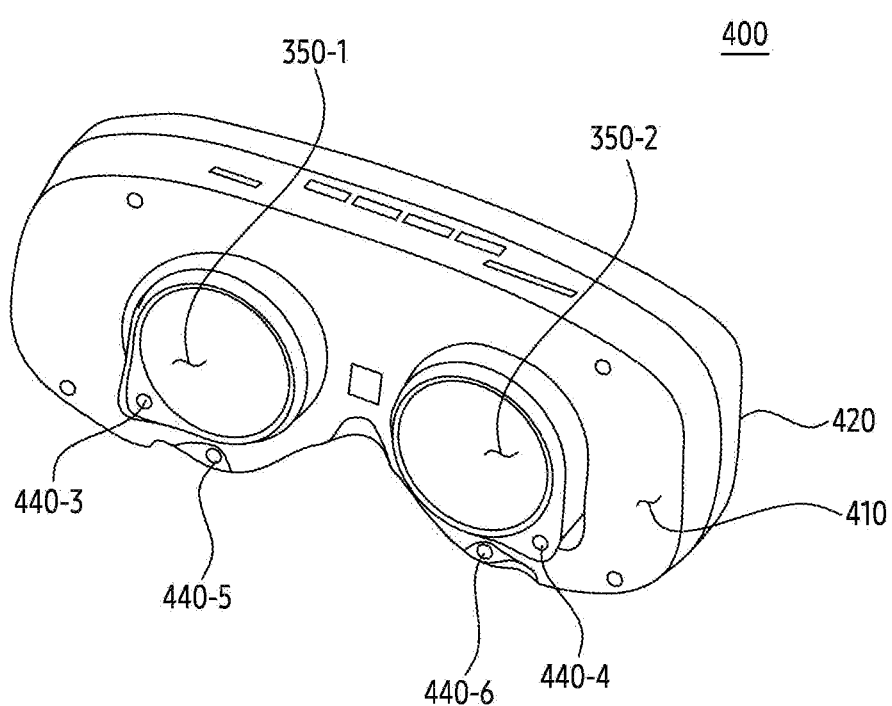
FIGS. 4A and 4B illustrate an example of the appearance of a wearable device, according to an embodiment.
Figure 4B:
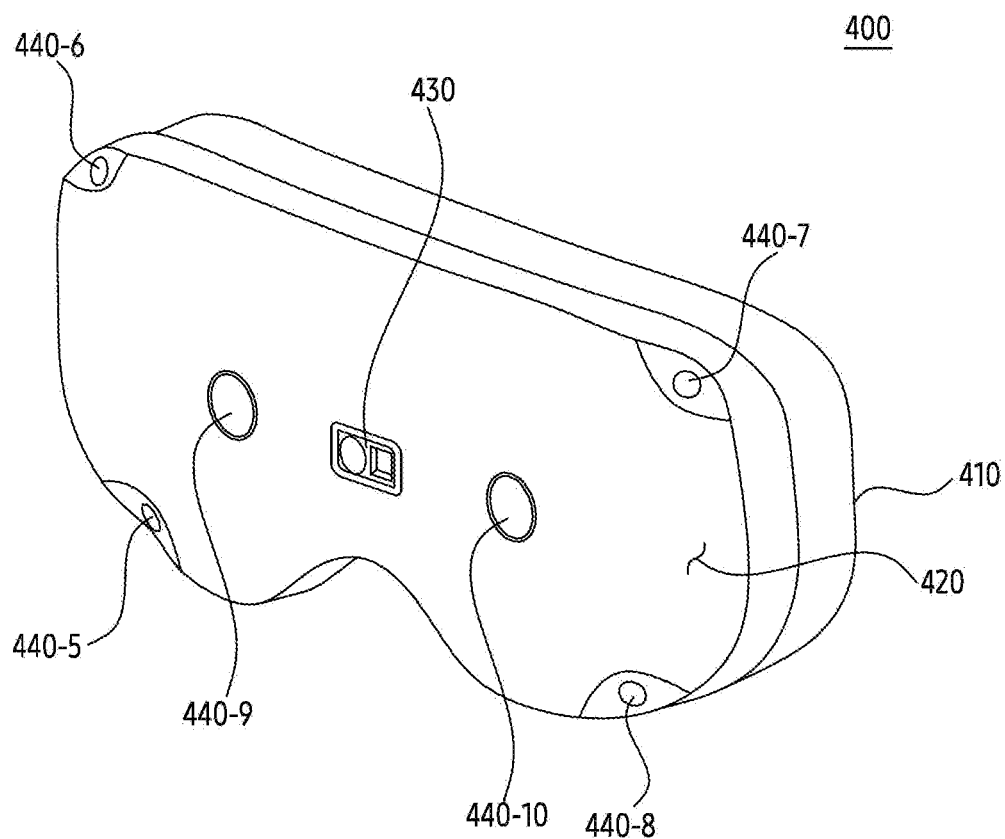

FIGS. 4A and 4B illustrate an example of the appearance of a wearable device 400 according to an embodiment. The wearable device 400 of FIGS. 4A and 4B may include the wearable device 101 of FIGS. 1A and 1B and/or 2. According to an embodiment, an example of an appearance of a first surface 410 of the housing of the wearable device 400 may be illustrated in FIG. 4A, and an example of an appearance of a second surface 420 opposite to the first surface 410 may be illustrated in FIG. 4B.

Referring to FIG. 4A, according to an embodiment, the first surface 410 of the wearable device 400 may have an attachable shape on the user's body part (e.g., the user's face). Although not illustrated, the wearable device 400 may further include a strap for being fixed on the user's body part, and/or one or more temples (e.g., a first temple 304 and/or a second temple 305 of FIGS. 3A and 3B). A first display 350-1 for outputting an image to the left eye among the user's two eyes and a second display 350-2 for outputting an image to the right eye among the user's two eyes may be disposed on the first surface 410. The wearable device 400 may be formed on the first surface 410 and may further include rubber or silicon packing for preventing interference by light (e.g., ambient light) different from the light emitted from the first display 350-1 and the second display 350-2.

According to an embodiment, the wearable device 400 may include cameras 440-1 and 440-2 for photographing and/or tracking two eyes of the user adjacent to each of the first display 350-1 and the second display 350-2. The cameras 440-1 and 440-2 may be referred to as ET cameras. According to an embodiment, the wearable device 400 may include cameras 440-3 and 440-4 for photographing and/or recognizing the user's face. The cameras 440-3 and 440-4 may be referred to as FT cameras.

Referring to FIG. 4B, a camera (e.g., cameras 440-5, 440-6, 440-7, 440-8, 440-9, and 440-10), and/or a sensor (e.g., a depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize an external object different from the wearable device 400. For example, by using cameras 440-9, and 440-10, the wearable device 400 may obtain an image and/or video to be transmitted to each of the user's two eyes. The camera 440-9 may be disposed on the second surface 420 of the wearable device 400 to obtain an image to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment, the wearable device 400 may include the depth sensor 430 disposed on the second surface 420 in order to identify a distance between the wearable device 400 and the external object. By using the depth sensor 430, the wearable device 400 may obtain spatial information (e.g., a depth map) about at least a portion of the FoV of the user wearing the wearable device 400.

Although not illustrated, a microphone for obtaining sound outputted from the external object may be disposed on the second surface 420 of the wearable device 400. The number of microphones may be one or more depending on embodiments.

As described above, according to an embodiment, the wearable device 400 may have a form factor to be worn on a user's head. The wearable device 400 may provide a user experience based on augmented reality and/or mixed reality in a state worn on the head. The wearable device 400 may recognize the external space, by using cameras 440-5, 440-6, 440-7, 440-8, 440-9, and 440-10 for tracking an external space and an external object (e.g., the real object 120 of FIGS. 1A and 1B) in the external space. The wearable device 400 may dispose at least one virtual object (e.g., the virtual object 130 of FIGS. 1A and 1B), in a virtual space (e.g., the space 160 of FIGS. 1A and 1B and/or 2) mapped to the external space. Based on the at least one virtual object disposed in the virtual space, the wearable device 400 may provide a user experience based on augmented reality and/or mixed reality. The wearable device 400 may provide a control panel (e.g., a control panel formed based on the control panel 140 of FIGS. 1A and 1B) for more easily controlling a virtual object spaced apart from a user (e.g., the user 110 of FIGS. 1A and 1B) wearing the wearable device 400.

Hereinafter, referring to FIG. 5, an example of an operation in which a wearable device (e.g., the wearable device 101 of FIGS. 1A and 1B and/or 2) including the wearable device 300 of FIGS. 3A and 3B and/or the wearable device 400 of FIGS. 4A and 4B forms a control panel based on a 2-dimensional displayed plane will be described.

Figure 5:
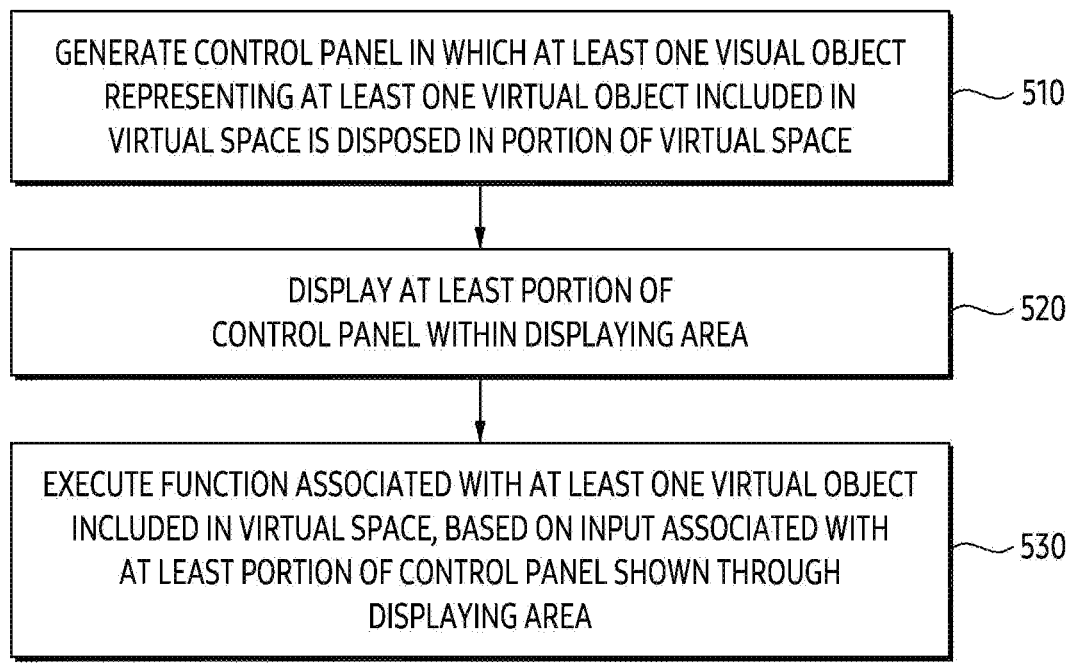
FIG. 5 illustrates an example of a flowchart for a wearable device, according to an embodiment.

FIG. 5 illustrates an example of a flowchart for a wearable device, according to an embodiment. The wearable device of FIG. 5 may be an example of the wearable device 101 of FIGS. 1A and 1B and/or 2. For example, at least one of operations of FIG. 5 may be performed by the wearable device 101 and/or the processor 210 of FIG. 2.

Referring to FIG. 5, according to an embodiment, in operation 510, the wearable device may generate a control panel in which at least one visual object representing at least one virtual object included in the virtual space is disposed in a portion of the virtual space. For example, the term "virtual space" used in the document may indicate to a space around a wearable device including a real object and/or a virtual object, or a space including the wearable device. For example, the virtual space used in the document may include one or more real objects. For example, the virtual space used in the document may include the space 160.

For example, the virtual space may be matched with an external space including a wearable device, such as the space 160 in FIGS. 1A and 1B and/or 2. The wearable device may generate a control panel (e.g., the control panel 140 of FIGS. 1A and 1B) for controlling the at least one virtual object in the virtual space.

In an embodiment, the control panel generated based on operation 510 may be disposed adjacent to a location of the wearable device in the virtual space. For example, a ratio between altitude of the control panel in the virtual space and altitude of the wearable device in the virtual space may be maintained at a preset ratio. For example, the control panel in the virtual space may have an altitude set by a motion of a preset body part (e.g., a hand). For example, the location of the control panel in the virtual space may have an altitude corresponding to a preset body part such as a user's elbow, within the front of the user wearing the wearable device. For example, a size of the control panel within the virtual space may have a preset size or a size set by a motion of the preset body part.

In an embodiment, the control panel generated based on operation 510 may be disposed based on a portion of the virtual space corresponding to the real object. For example, the wearable device may identify a real object adjacent to the wearable device by recognizing an external space. When the real object has a plane suitable for forming a control panel, such as a table, the wearable device may generate a control panel of operation 510 based on the plane of the real object. For example, the control panel generated based on operation 510 may have a size and/or location matched with the plane of the real object in the virtual space.

According to an embodiment, the wearable device may display a visual object for controlling a virtual object in a virtual space on a control panel disposed in the virtual space based on the operation described above. The wearable device may obtain an image by using a camera (e.g., the camera 225 of FIG. 2). The image may include at least a portion of an external space shown to a user wearing a wearable device. The image may include at least one real object and/or at least one virtual object shown to the user of the wearable device, such as a screen shot. The wearable device may overlap and display the visual object together with the image on the control panel. The visual object may be disposed at a location corresponding to the virtual object in the image. For example, the image and visual object may be arranged based on mixed reality shown to the user within the control panel. For example, a wearable device may identify a virtual object included in an image, and arrange and/or combine a visual object representing the virtual object on a location where the virtual object is identified. An operation in which the wearable device generate a control panel and arrange the image and the visual object on the control panel based on operation 510 will be described with reference to FIGS. 6A, 6B, and 7 to 9.

Referring to FIG. 5, according to an embodiment, in operation 520, the wearable device may display at least a portion of the control panel within a displaying area. The wearable device may determine whether to display the control panel, based on a direction (e.g., directions D1 and D2 of FIGS. 1A and 1B) of the wearable device identified using a sensor (e.g., the sensor 230 of FIG. 2). For example, when a control panel generated based on operation 510 is included in a view angle formed in the virtual space based on the direction, the wearable device may display at least a portion of the control panel included in the view angle. In an embodiment where the wearable device is an HMD worn on the user's head, the direction may coincide with a direction of the user's head. For example, according to a motion of the head of the user wearing the wearable device, the wearable device may display at least a portion of the control panel. According to an embodiment, a layout of the control panel displayed by the wearable device will be described with reference to FIGS. 10A to 10D.

Referring to FIG. 5, according to an embodiment, in operation 530, the wearable device may execute a function associated with at least one virtual object included in the virtual space, based on an input associated with at least a portion of the control panel shown through the displaying area. The input may include an input indicating to move a location of the visual object displayed in the control panel. In response to the input, the wearable device may move the virtual object matched to the visual object associated with the input. The input of operation 530 may include an input indicating to rotate the visual object displayed in the control panel. In response to the input, the wearable device may rotate the virtual object matched to the visual object in the virtual space. The input of operation 530 may include an input indicating to modify the size of the visual object displayed in the control panel. In response to the input, the wearable device may modify the size of the virtual object. The wearable device may modify the size of the virtual object based on a ratio of the size between the visual object and the virtual object. The input of operation 530 may include an input to modify the layout of the visual object displayed in the control panel. The wearable device may modify the layout of the virtual object in response to the input. The input of operation 530 may include an input indicating to execute at least one function assigned to the virtual object matched to the visual object displayed in the control panel. In response to the input, the wearable device may execute the at least one function by executing an application corresponding to the virtual object. For example, the virtual object may include a widget and/or a gadget provided by the application. The input of operation 530 may include an input indicating to transmit the visual object displayed in the control panel. In response to the input, the wearable device may transmit information associated with the virtual object matched to the visual object to an external electronic device distinguished from the wearable device. An operation in which the wearable device according to an embodiment executes the at least one function of operation 530 will be described with reference to FIGS. 11A to 11C, 12, 13, 14, 15A, 15B, 16, 17A to 17D, 18, and 19.

As described above, according to an embodiment, a wearable device is a control panel for controlling a virtual object in a virtual space, and may form a control panel having a location adjacent to the wearable device in the virtual space. In the control panel, the wearable device may display a visual object representing the virtual object. Based on an input associated with the visual object, the wearable device may support controlling the virtual object.

Hereinafter, referring to FIGS. 6A and 6B, according to an embodiment, an example of an operation in which the wearable device adds the control panel in the virtual space is described.

Figure 6A:
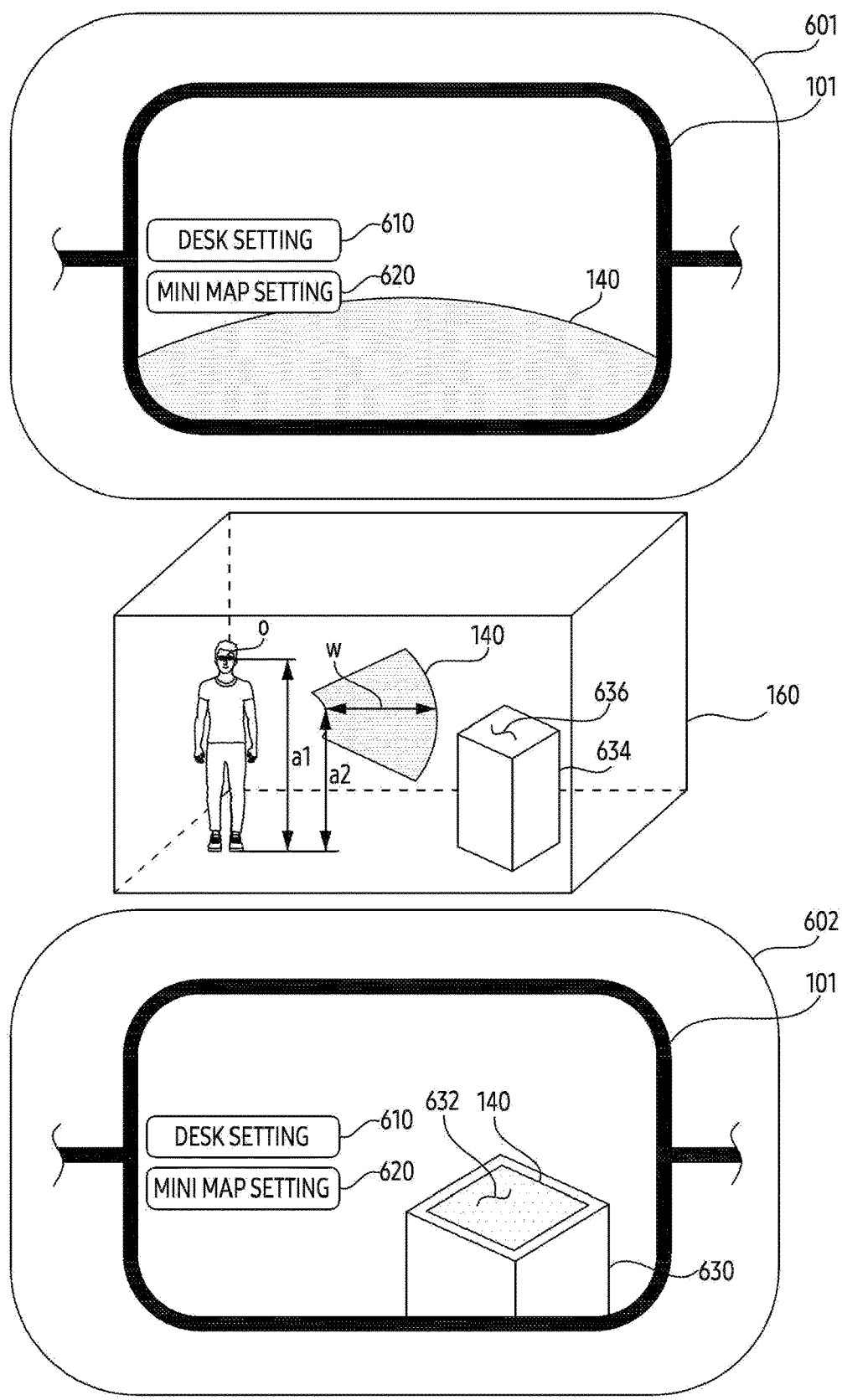
FIGS. 6A and 6B illustrate an example of an operation performed by a wearable device in response to an input indicating to generate a control panel for controlling a virtual object in a space, according to an embodiment.
Figure 6B:
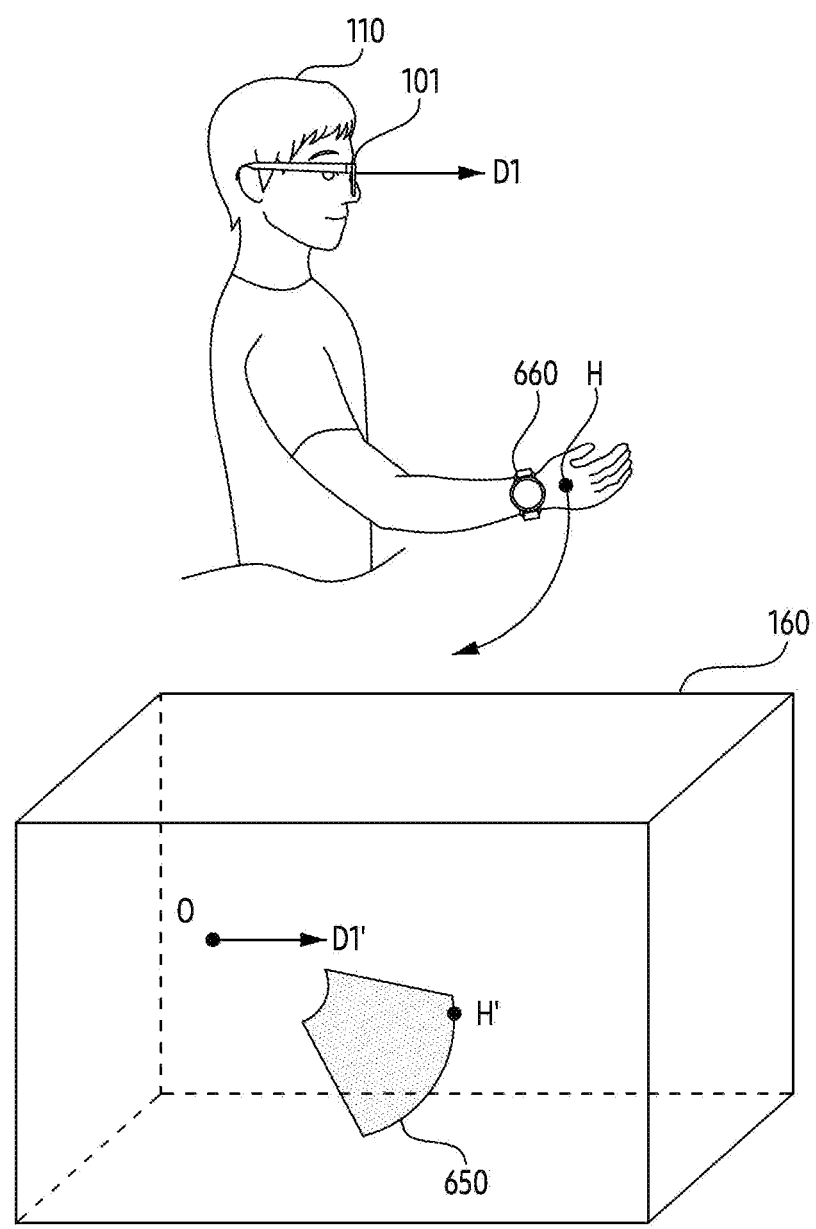

FIGS. 6A and 6B illustrate an example of an operation performed by a wearable device 101 in response to an input indicating to generate a control panel 140 for controlling a virtual object in a space 160, according to an embodiment. The wearable device 101 of FIGS. 6A and 6B may be an example of the wearable device of FIGS. 1A, 1B, 2, 3A, 3B, 4A, 4B, and 5. For example, an operation of the wearable device 101 described later with reference to FIGS. 6A and 6B may be performed by the wearable device 101 of FIG. 2.

According to an embodiment, the wearable device 101 may identify an input indicating to generate a control panel. The input may include an input indicating to select a preset visual object in a displaying area formed by a display (e.g., the display 220 of FIG. 2) of the wearable device 101. Referring to FIG. 6A, the wearable device 101 may display visual objects 610 and 620 having a form of a button, in the displaying area. In order to receive an input indicating to generate a control panel, the wearable device 101 may display a visual object 610 including preset text (e.g., "desk setting"). In order to receive an input indicating to select at least one virtual object to be controlled by the control panel, the wearable device 101 may display a visual object 620 including preset text (e.g., "minimap setting"). An operation of the wearable device 101 associated with the visual object 620 will be described with reference to FIG. 8. The input indicating to generate the control panel may include an input indicating to select the visual object 610.

In an embodiment, an input indicating to generate the control panel may include a voice command including a preset utterance. For example, the wearable device 101 may identify a natural language sentence after a preset utterance, based on identifying the preset utterance (e.g., "high Bixby") indicating a beginning moment of the voice command. The wearable device 101 may identify the natural language sentence based on speech-to-text (STT). The wearable device 101 may use a neural network associated with a voice recognition to perform the STT. After the preset utterance, the wearable device 101 may identify the input based on identifying the natural language sentence (e.g., "set up desk area") indicating to generate a control panel.

The embodiment is not limited thereto, and the input indicating to generate the control panel may be identified through a preset button in the wearable device 101 and/or an external electronic device (e.g., a controller of the wearable device 101, a mobile phone, and/or smart accessories such as watches) connected to the wearable device 101. For example, based on identifying a preset gesture with respect to a preset button (e.g., a home button), the external electronic device may transmit a signal indicating to identify the gesture to the wearable device 101. The preset gesture may include a gesture (e.g., a long-press gesture) of pressing the preset button beyond a preset time. The wearable device 101 may identify the input based on receiving the signal.

According to an embodiment, the wearable device 101 may generate a control panel 140 corresponding to the control panel in the space 160, based on the input indicating to generate the control panel. The wearable device 101 may detect a real object 630 adjacent to the wearable device 101, by using the space 160 matched with an external space including the wearable device 101. For example, the wearable device 101 may detect the real object 630 spaced apart from the wearable device 101 by less than a preset distance. The wearable device 101 may generate the control panel 140 based on the detected real object 630. Referring to FIG. 6A, according to an embodiment, different states 601 and 602 in which the wearable device 101 displays the control panel 140 are illustrated. Hereinafter, the state 601 is assumed to be a state in which the real object 630 adjacent to the wearable device 101 does not exist. The state 602 is assumed to be a state in which the real object 630 adjacent to wearable device 101 exists.

In the state 601 of FIG. 6A, based on a point O corresponding to a location of the wearable device 101 within the space 160, the wearable device 101 may determine a location of the control panel 140. For example, the wearable device 101 may determine an altitude a2 of the control panel 140 by applying a preset ratio to an altitude a1 of the point O within the space 160. In an embodiment, the preset ratio may be a ratio between a distance from a person's toe to a point (e.g., a point corresponding to the eye) within the head and a distance from the person's toe and an elbow. Since the space 160 matches with the external space recognized by the wearable device 101, the altitude a2 of the control panel 140 may be dependent on an altitude of the wearable device 101 in the external space. Referring to state 601 of FIG. 6A, the wearable device 101 may arrange the control panel 140 based on the altitude a2 lower than the wearable device 101 in the space 160. When the wearable device 101 arranges the control panel 140 in the space 160 based on a location and/or direction of the wearable device 101 as shown in state 601 of FIG. 6A, the wearable device 101 may modify a location and/or direction of control panel 140 in the space 160 as the location and/or direction of the wearable device 101 changes.

In the state 601 of FIG. 6A, the wearable device 101 may determine a size (e.g., a width w of the control panel 140) of the control panel 140, based on the altitude a1 of the wearable device 101 in the space 160. In an embodiment where the wearable device 101 determines the altitude a2 of the control panel 140 by applying a preset ratio to the altitude a1, the width w of the control panel 140 may correspond to a difference between altitudes a1 and a2 (e.g., a1-a2). For example, the sum of the width w and the altitude a2 of the control panel 140 may correspond to the altitude a1 of the wearable device 101. A length of the control panel 140 perpendicular to the width w of the control panel 140 may be associated with a size (e.g., a distance between shoulders) of a body part of the user wearing the wearable device 101.

According to an embodiment, the wearable device 101 may recommend the altitude a2 and/or size of the control panel 140 in the space 160, based on the user's posture wearing the wearable device 101. In a state 601 where the user wearing the wearable device 101 stands, the wearable device 101 may determine the altitude a2 based on a height of the user. Meanwhile, when the user wearing the wearable device 101 is sitting, the wearable device 101 may recommend the altitude a2 and/or size of the control panel 140 in the space 160, based on the user's sitting height and/or the user's posture.

According to an embodiment, the wearable device 101 may identify the real object 630 in a preset portion of external space adjacent to the wearable device 101. For example, the wearable device 101 may identify the real object 630 by scanning a preset altitude range below the altitude a1 of the wearable device 101. The preset portion of the external space may be included in the preset altitude range. The preset altitude range may include an altitude at which a preset body part (e.g., an elbow) of the user wearing the wearable device 101 is disposed. The wearable device 101 may identify a portion 634 matched with the real object 630, in the space 160 mapped to the external space. The portion 634 may be less than a preset distance from the point O of the wearable device 101, or may be at least partially included in the preset altitude range.

Referring to FIG. 6A, in the state 602, the wearable device 101 may generate the control panel 140 based on a portion 634 in the space 160 matched with the real object 630, in response to identifying the real object 630 in a preset portion of the external space adjacent to the wearable device 101. In the state 602 of FIG. 6A in which the wearable device 101 detects the real object 630, the wearable device 101 may display the control panel 140 by overlapping on one surface 632 of the real object 630 within the displaying area. For example, a location of the control panel 140 in the space 160 may be matched to the portion 634 of the space 160 matching the real object 630 and/or the portion 636 of the space 160 matching one surface 632. Referring to the state 602 of FIG. 6A, the wearable device 101 may display the control panel 140 on the one surface 632 of the real object 630 that is shown through the displaying area and has a planar shape.

Referring to FIG. 6A, the operation in which the wearable device 101 arranges the control panel 140 by using the altitude a1 of the wearable device 101 and/or the real object 630 adjacent to the wearable device 101 is described, but the embodiment is not limited thereto. According to an embodiment, the wearable device 101 may adjust the altitude and/or size of the control panel 140 in the space 160, based on the user's gesture wearing the wearable device 101.

Referring to FIG. 6B, according to an embodiment, a state in which the wearable device 101 identifies an input indicating to select a plane for the control panel within the external space by tracking a preset body part including the hand is shown. The wearable device 101 may track a point H included in the hand by using a camera (e.g., the camera 225 of FIG. 2) of the wearable device 101. When connected to an external electronic device 660 wearable on a hand and/or a body part (e.g., a wrist) adjacent to the hand, the wearable device 101 may track the point H by using the sensor (e.g., IMU) of the external electronic device 660. Referring to FIG. 6B, the external electronic device 660 worn on the wrist of the user 110, such as a smart watch, is illustrated. However, embodiment is not limited thereto.

In the state of FIG. 6B, the wearable device 101 may identify a point H' mapped to the point H within the space 160 mapped to the external space. Since the wearable device 101 tracks a motion of the hand, the wearable device 101 may identify a path 650 of the point H' in the space 160 moved by the tracked motion. In a state of FIG. 6B where the path 650 is in a form of a closed curve, the wearable device 101 may generate a control panel based on the closed curve. For example, the wearable device 101 is a control panel for controlling at least one virtual object in the space 160, and may generate a plane with a shape, altitude, and/or size of the path 650.

As described above, according to an embodiment, the wearable device 101 may add the control panel 140 within the space 160, based on the posture and/or size of the user 110 wearing the wearable device 101. The wearable device 101 may add the control panel 140 to the space 160 based on the real object 630 adjacent to the wearable device 101. The wearable device 101 may add the control panel 140 to the space 160, based on the path 650 in the space 160 identified by tracking a motion of the user's preset body part (e.g., hand). In order to make the control panel 140 to a control panel for controlling at least one virtual object in the space 160, the wearable device 101 may receive an input indicating to select at least one virtual object to be linked to the control panel 140. An operation in which the wearable device 101 receives the input indicating to select the at least one virtual object will be described with reference to FIG. 8.

Hereinafter, according to an embodiment, referring to FIG. 7, an example of an operation performed by the wearable device 101 based on an input indicating to move the control panel 140 included in the space 160 will be described.

Figure 7:
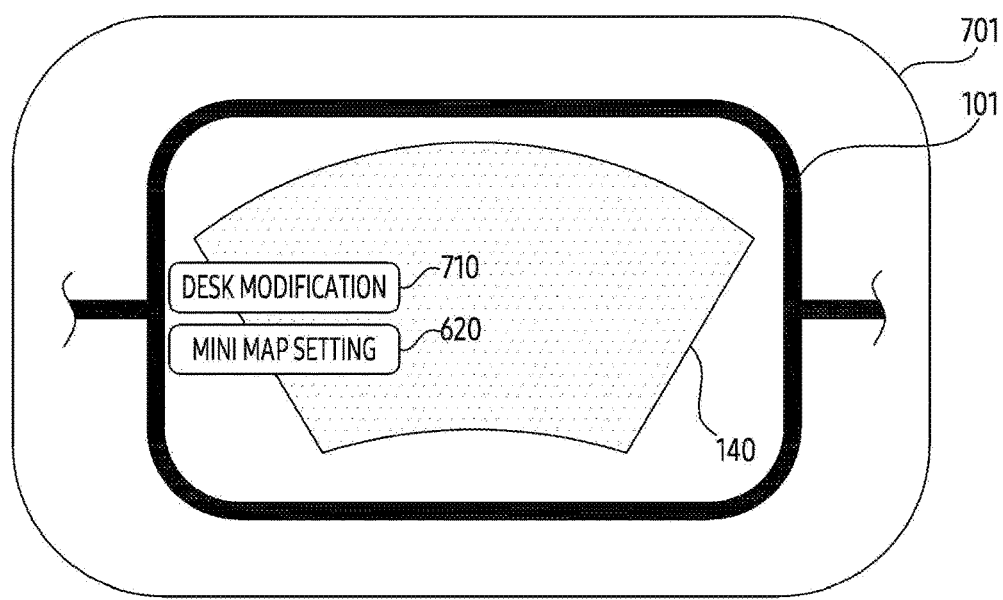
FIG. 7 illustrates an example of an operation performed by a wearable device in response to an input indicating to modify a control panel for controlling a virtual object in a space, according to an embodiment.
Figure 7:
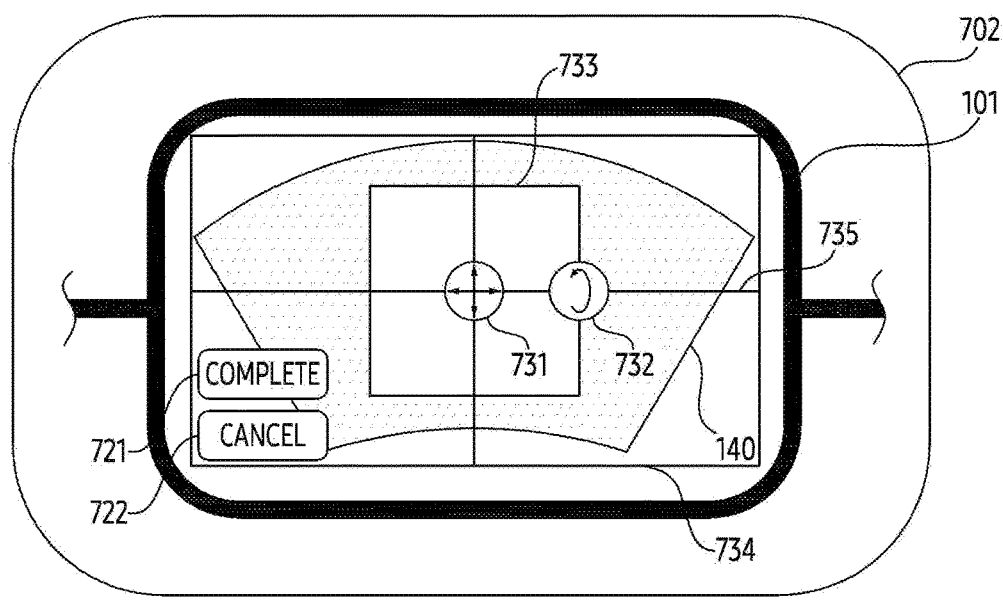
Figure 7:
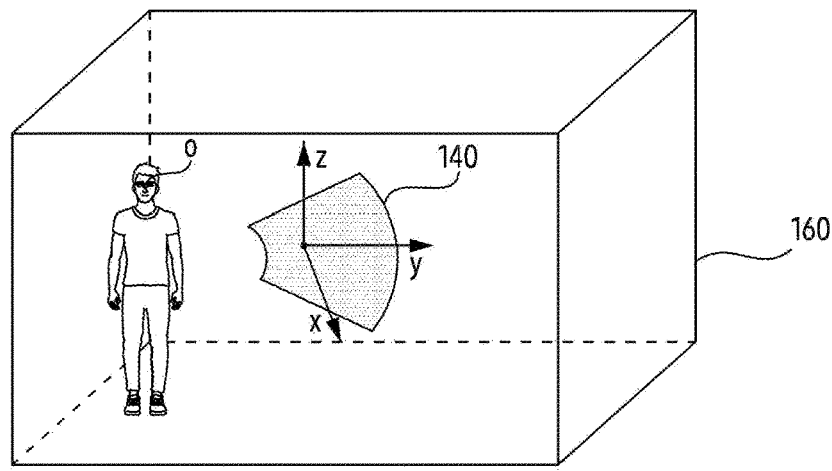

FIG. 7 illustrates an example of an operation performed by a wearable device 101 in response to an input indicating to modify a control panel 140 for controlling a virtual object in a space 160, according to an embodiment. The wearable device 101 of FIG. 7 may be an example of the wearable device of FIGS. 1A, 1B, 2, 3A, 3B, 4A, 4B, and 5. For example, an operation of the wearable device 101 described later with reference to FIG. 7 may be performed by the wearable device 101 of FIG. 2.

Referring to FIG. 7, according to an embodiment, states 701 and 702 in which the wearable device 101 displays the control panel 140 which is a control panel for controlling a virtual object (e.g., the virtual object 130 of FIGS. 1A and 1B) in a displaying area are illustrated. The wearable device 101 may display the control panel 140 in the displaying area, based on a location of the control panel 140 in the space 160 and/or a location relationship between view angles formed in the space 160 based on the direction of the wearable device 101. The displaying area of the wearable device 101 may be formed by at least partially overlapping with the FoV of the user (e.g., the user 110 of FIGS. 1A and 1B) wearing the wearable device 101, based on a display (e.g., the display 220 of FIG. 2) in the wearable device 101. The view angle may be associated with a motion of the wearable device 101 identified by a sensor (e.g., the sensor 230 of FIG. 2) of the wearable device 101. In the states 701 and 702 of FIG. 7, the wearable device 101 may display the control panel 140, based on the view angle facing the control panel 140 in the space 160. Referring to FIG. 7, when the control panel 140 is formed below the point O, which is a reference location of the wearable device 101 in the space 160, the wearable device 101 may display the control panel 140 based on a direction facing downward of the wearable device 101.

Referring to FIG. 7, within the state 701, the wearable device 101 may display visual objects 710 and 620 corresponding to each of options for modifying the control panel formed by the control panel 140. The wearable device 101 may display the visual object 710 having a form of a button, based on the input indicating to generate the control panel 140 described above with reference to FIGS. 6A and 6B. The wearable device 101 may display preset text guiding the movement (e.g., parallel movement and/or rotational movement) of the control panel 140 within the space 160, such as "desk change", within the visual object 710. The wearable device 101 may switch from the state 701 to the state 702 for guiding the movement of the control panel 140 based on an input indicating to select the visual object 710.

Referring to FIG. 7, within the state 702, the wearable device 101 may display visual objects 731, 732, 733, 734, and 735 to control the movement of the control panel 140.

For example, the wearable device 101 may display the visual object 731 having a form of a handle, button, and/or icon to guide the parallel movement of the control panel 140 within the space 160. The wearable device 101 may display a visual object 732 having a form of a handle, button, and/or icon to guide the rotation movement of the control panel 140 within the space 160. The wearable device 101 may display the visual object 735 having a form of a line for guiding a reference axis of the control panel 140 that is rotated based on an input associated with the visual object 732. The wearable device 101 may display the visual objects 733 and 734 having a form of a box for guiding adjustment of the size (e.g., length and/or width) of the control panel 140. Based on a gesture of selecting and/or moving at least one of the visual objects 731, 732, 733, 734, and 735, the wearable device 101 may perform parallel movement and/or rotation movement of the control panel 140 within the space 160.

For example, within the state 702, the wearable device 101 may move the control panel 140 within the space 160 in response to an input indicating to select and/or move the visual object 731. The wearable device 101 may move the control panel 140 in a direction of at least one of the axes (e.g., x-axis, y-axis, and/or z-axis) with respect to the control panel 140 based on the input. Based on the movement of the control panel 140 in the space 160, the wearable device 101 may move the control panel 140 included in the displaying area.

For example, within the state 702, the wearable device 101 may rotate the control panel 140 within the space 160 in response to an input indicating to select and/or move the visual object 732. Based on the input, the wearable device 101 may rotate the control panel 140 around the reference axis matched to the visual object 735 within the space 160. Based on the rotation of the control panel 140 in the space 160, the wearable device 101 may modify the control panel 140 shown through the displaying area.

For example, within the state 702, in response to an input indicating to select and/or move at least one of the visual objects 733 and 734, the wearable device 101 may modify the size of the control panel 140 within the space 160. Based on the input, the wearable device 101 may modify at least one of the length and/or width of the control panel 140. In an embodiment, the wearable device 101 may modify the length and width of the control panel 140 while maintaining a ratio of the length and width of the control panel 140, in response to the input. In an embodiment, the wearable device 101 may selectively modify any of the length or width of the control panel 140, based on an edge selected by the input within the visual objects 733 and 734 having a form of a box. For example, based on a gesture performed on one edge parallel to a length direction of the control panel 140 within the visual object 733, the wearable device 101 may modify the length among the length or width of the control panel 140. The wearable device 101 may enlarge or reduce the control panel 140 based on the direction of the input. For example, the wearable device 101 may reduce the size of the control panel 140, based on an input indicating to move one edge of the visual object 734 to the inside of the control panel 140. For example, the wearable device 101 may enlarge the size of the control panel 140, based on an input indicating to move one edge of the visual object 734 to the outside of the control panel 140.

Referring to FIG. 7, according to an embodiment, the wearable device 101 may display visual objects 721 and 722 to switch from the state 702 for guiding the movement of the control panel to another state distinguished from the state 702. Based on an input indicating to select at least one of the visual objects 721 and 722, the wearable device 101 may cease displaying the visual objects 731, 732, 733, 734, and 735 to control the movement of the control panel 140. The wearable device 101 may receive input to modify the location, angle, and/or size of the control panel 140 in the space 160 to before the state 702, through the visual object 722 having a form of a button including preset text such as "cancel". The input may include an input to cancel the modification applied to the control panel 140 within the state 702. The wearable device 101 may identify an input for settling the modification applied to the control panel 140 within the state 702, through the visual object 721 having a form of a button including preset text such as "completion" (or "storage"). After receiving the input indicating to select the visual object 721, the wearable device 101 may maintain the location, angle, and/or size of the control panel 140 within the space 160 at the timing of receiving the input.

As described above, according to an embodiment, in the space 160 mapped to the external space 160, the wearable device 101 may form a control panel for controlling at least one virtual object in the space 160. An example in which the wearable device 101 forms the control panel based on the fan-shaped control panel 140 will be described, but a shape of the control panel is not limited to the shape of the control panel 140. The wearable device 101 may display at least one visual object (e.g., the first visual object 151 to the second visual object 152 of FIGS. 1A and 1B) for controlling the at least one virtual object on the control panel 140, which is added to the space 160 based on the operation of FIGS. 6A and 6B and moved within the space 160 based on the operation of FIG. 7.

Hereinafter, referring to FIG. 8, according to an embodiment, an example of an operation in which the wearable device 101 adds a visual object for controlling a virtual object to the control panel 140 formed within the space 160 based on the operation described above with reference to FIGS. 6A and 6B and/or 7 will be described.

Figure 8:
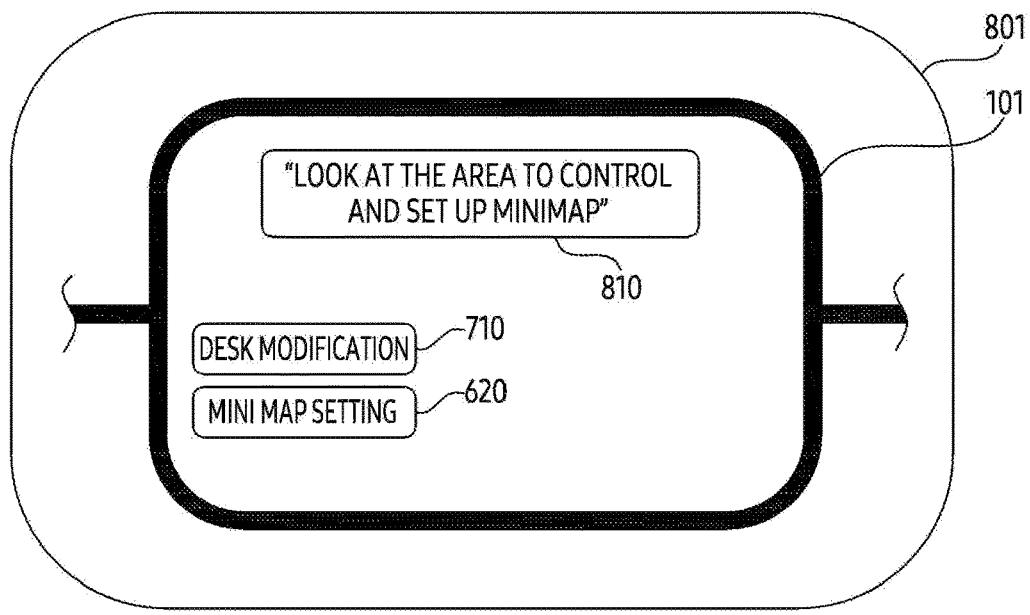
FIG. 8 illustrates an example of an operation performed by a wearable device in response to an input indicating to map a control panel and at least a portion of a space, according to an embodiment.
Figure 8:
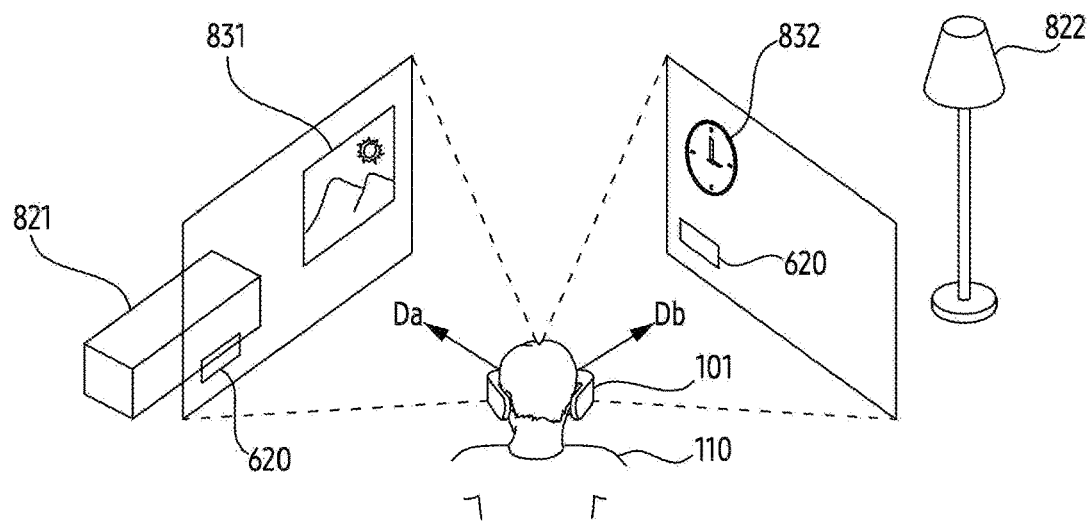
Figure 8:
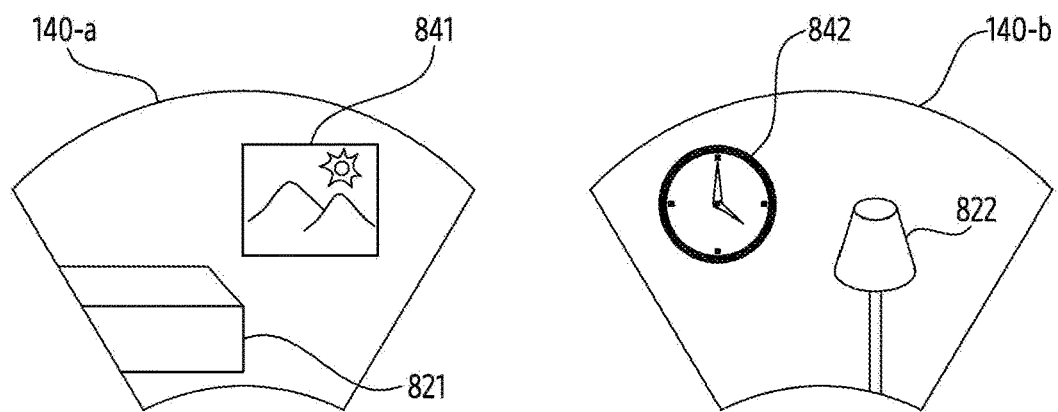

FIG. 8 illustrates an example of an operation performed by a wearable device 101 in response to an input indicating to map a control panel 140 and at least a portion of a space, according to an embodiment. The wearable device 101 of FIG. 8 may be an example of the wearable device of FIGS. 1A, 1B, 2, 3A, 3B, 4A, 4B, and 5. For example, an operation of the wearable device 101 described later with reference to FIG. 8 may be performed by the wearable device 101 of FIG. 2.

According to an embodiment, the wearable device 101 may generate the control panel 140 for the control panel in a virtual space (e.g., the space 160 of FIGS. 1A and 1B), based on the above-described operation with reference to FIGS. 6A and 6B and/or 7. Referring to FIG. 8, within the state 801 in which the control panel 140 for the control panel is generated, the wearable device 101 may display a visual object 620 for selecting at least one virtual object to be controlled by the control panel in the displaying area. The visual object 620 of FIG. 8 may include the visual object 620 of FIGS. 6A and 6B and/or 7. Within the state 801, the wearable device 101 may display a visual object 810 having a form of a pop-up window including preset text (e.g., "look at the area to control and set up minimap") for guiding to select at least one virtual object.

Referring to FIG. 8, in the state 801, the wearable device 101 may selectively display virtual objects (e.g., a first virtual object 831 and/or a second virtual object 832) included in the virtual space in the displaying area, based on a direction (e.g., directions Da and Db) of the wearable device 101. For example, when the wearable device 101 faces the direction Da, the wearable device 101 may display the first virtual object 831 based on the view angle in the virtual space corresponding to the direction Da. Referring to FIG. 8, the user 110 facing the direction Da may see all of the first virtual object 831 and the first real object 821 through the displaying area of the wearable device 101. For example, when the wearable device 101 faces the direction Db, the wearable device 101 may output the second virtual object 832 included in the view angle in the virtual space corresponding to the direction Db to the user 110, through the display area. Referring to FIG. 8, the user 110 facing the direction Db may see all of the second virtual object 832 and the second real object 822 through the displaying area of the wearable device 101.

According to an embodiment, in response to an input indicating to select the visual object 620, the wearable device 101 may obtain an image including at least a portion of the display area, by using a camera (e.g., the camera 225 of FIG. 2) disposed toward the direction of the displaying area formed by a display (e.g., the display 220 of FIG. 2). The image may include a portion corresponding to the direction in the external space including the wearable device 101. The image may include a screen shot of the displaying area. For example, while the user 110 faces the direction Da, the wearable device 101 identifying the input may obtain an image including the first real object 821, by using the camera facing the direction Da. For example, while the user 110 faces the direction Db, in response to the input, the wearable device 101 may obtain an image including the second real object 822, by controlling the camera facing the direction Db.

According to an embodiment, the wearable device 101 may identify a location of a virtual object disposed in a displaying area based on an image obtained using a camera. The wearable device 101 may display the image in which the visual object representing the virtual object is overlapped on the control panel 140 for the control panel. The visual object may be disposed on the image based on the identified location. Referring to FIG. 8, the wearable device 101 facing the direction Da may obtain a first image including the first real object 821 and/or the first virtual object 831, based on an input associated with the visual object 620.

Referring to FIG. 8, a control panel 140-$a$ in which the first image obtained through a camera disposed toward the direction Da is displayed is illustrated. The wearable device 101 may display the first image and the first visual object 841 superimposed on the first image on the control panel 140-$a$. The first visual object 841 may be a two-dimensional representation of the first virtual object 831 included in the displaying area of the wearable device 101 facing the direction Da. The first image and the first visual object 841 displayed on the control panel 140-$a$ may be associated with mixed reality shown through the displaying area of the wearable device 101 disposed toward the direction Da. According to an embodiment, the wearable device 101 may modify the color, brightness, and/or chroma of the first image to emphasize the first visual object 841 among the first real object 821 and the first visual object 841 included in the first image. In order to emphasize the first visual object 841, the wearable device 101 may generate a plurality of layers superimposed on the control panel 140-$a$. According to an embodiment, an example of an operation in which the wearable device 101 generates the plurality of superimposed layers will be described with reference to FIG. 10A.

Referring to FIG. 8, a control panel 140-$b$ on which a second image obtained by the wearable device 101 through the camera disposed toward the direction Db is disposed is illustrated. The wearable device 101 may be disposed toward the direction Db based on the user 110's motion facing the direction Db, while the user 110 wears the wearable device 101. The wearable device 101 disposed toward the direction Db may obtain the second image using a camera disposed toward the direction Db, in response to an input indicating to select the visual object 620. The second image may include the second real object 822 and/or the second virtual object 832. The wearable device 101 may display a second visual object 842 two-dimensionally representing the second virtual object 832 on the control panel 140-*b*, together with the second image captured with the second real object 822. A location of the second visual object 842 in the second image displayed on the control panel 140-*b* may match a location of the second virtual object 832 in the mixed reality viewed by the user 110 wearing the wearable device 101 facing the direction Db. Since the wearable device 101 reconstructs the mixed reality in the control panel 140-*b*, the second image and the second visual object 842 displayed on the control panel 140-*b* may represent a mini map with respect to the mixed reality.

According to an embodiment, the wearable device 101 may control at least one virtual object associated with the mixed reality, based on a control panel representing mixed reality shown in a specific direction, such as control panels 140-*a* and 140-*b*. For example, the wearable device 101 may control the first virtual object 831 matched to the first visual object 841 in response to an input indicating to control the first visual object 841 in the control panel 140-*a*. Similarly, the wearable device 101 may execute a function associated with the second virtual object 832 matched to the second visual object 842, based on an input associated with the second visual object 842 in the control panel 140-*b*. The wearable device 101 may modify a virtual object corresponding to a visual object based on the input associated with the visual object in the control panel.

In an embodiment, in a state in which a control panel, such as control panels 140-*a* and 140-*b*, matched to at least a portion of the virtual space is formed, the wearable device 101 may receive an input indicating to select the visual object 710. In a state in which the control panel 140-*a* is included in the virtual space, in response to the input indicating to select the visual object 710, the wearable device 101 may deactivate the first image and/or the first visual object 841 disposed on the control panel 140-*a*. To emphasize outline of the control panel 140-*a*, the wearable device 101 may apply preset a visual effect such as dimming and/or blur to the first image and/or the first visual object 841 disposed on the control panel 140-*a*.

As described above, according to an embodiment, the wearable device 101 may generate a control panel for supporting a control of a virtual object (e.g., the first virtual object 831 to the second virtual object 832) included in the virtual space. The control panel may be disposed adjacent to a point mapped to the location of the wearable device 101 within the virtual space. On the control panel, the wearable device 101 may two-dimensionally represent the mixed reality shown through the displaying area of the wearable device 101 facing a specific direction, such as the control panels 140-*a* and 140-*b* of FIG. 8. Since the control panel generated by the wearable device 101 is disposed closer to the point than the virtual object associated with the control panel within the virtual space including the virtual object, the wearable device 101 may execute a function for controlling remotely the virtual object using the control panel. For example, the wearable device 101 may provide a user experience of remotely controlling the virtual object based on the control panel.

Hereinafter, referring to FIG. 9, an example of an operation of the wearable device 101 for forming a control panel described above with reference to FIGS. 6A, 6B, 7, and 8 will be described.

Figure 9:
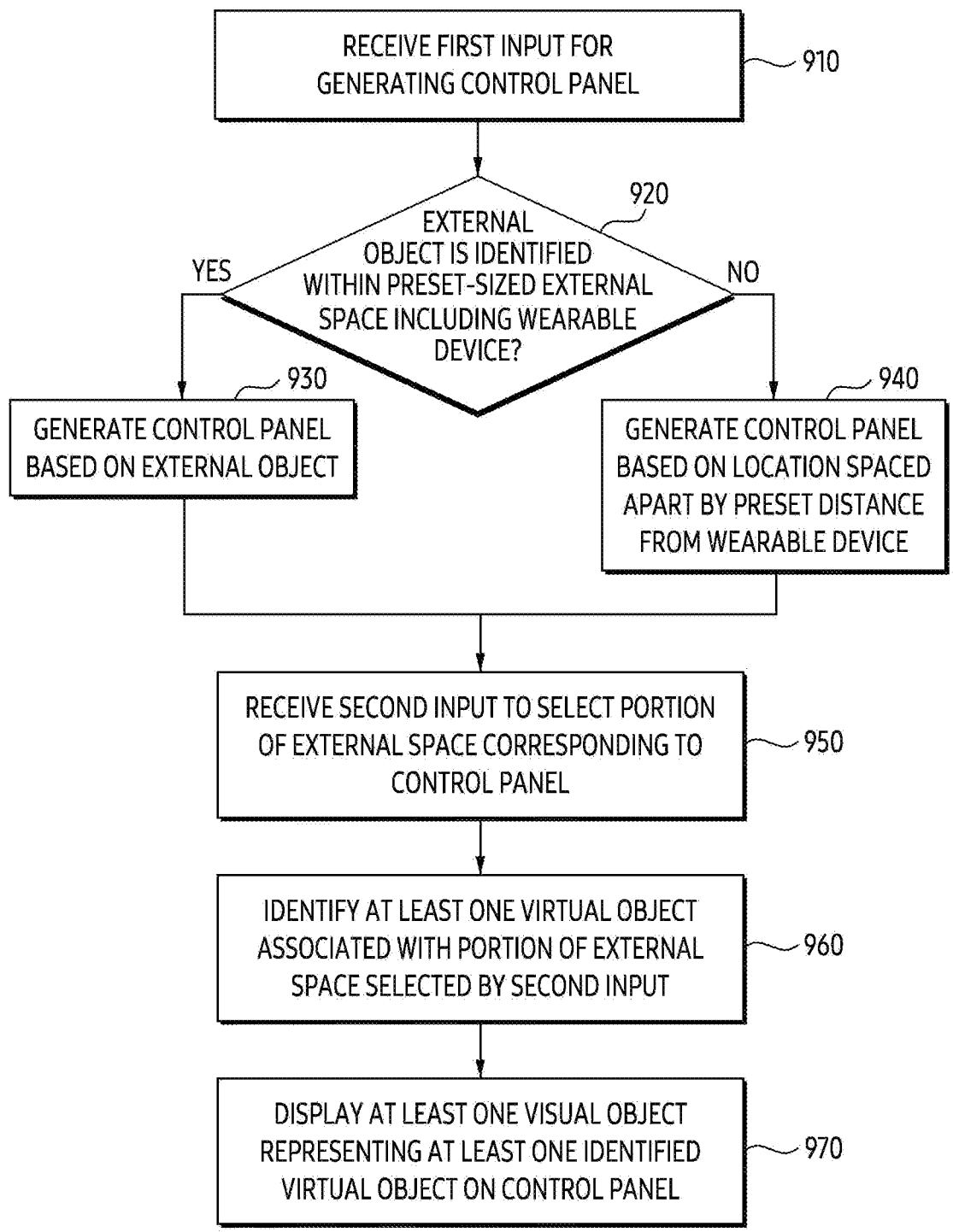
FIG. 9 illustrates an example of a flowchart for a wearable device, according to an embodiment.

FIG. 9 illustrates an example of a flowchart for a wearable device, according to an embodiment. The wearable device of FIG. 9 may be an example of the wearable device of FIGS. 1A, 1B, 2, 3A, 3B, 4A, 4B, and 5. For example, operations of FIG. 9 may be performed by the wearable device 101 and/or the processor 210 of FIG. 2. An operation of the wearable device to be described later with reference to FIG. 9 may be associated with at least one of the operations of FIG. 5 (e.g., operation 510 of FIG. 5).

Referring to FIG. 9, in operation 910, according to an embodiment, the wearable device may receive a first input for generating a control panel. The control panel of operation 910 may include the control panel 140 of FIGS. 1A, 1B, 6A, 6B, 7, and 8. The control panel of operation 910 may be a control panel for controlling at least one virtual object included in a virtual space (e.g., the space 160 of FIGS. 1A and 1B) of the wearable device. The first input may include the input indicating to generate the control panel described above with reference to FIGS. 6A and 6B. For example, the first input may include the input indicating to select the visual object 610 of FIG. 6A. The first input may be identified by a natural language sentence indicating to generate the control panel. The first input may be identified by a controller and/or an external electronic device connected to the wearable device.

Referring to FIG. 9, within operation 920, according to an embodiment, the wearable device may determine whether an external object is identified within a preset-sized external space including the wearable device. The external object may include a substantially flat surface (e.g., one surface 632 of FIG. 6A), such as the real object 630 of FIG. 6A. The wearable device may identify the external object within the preset-sized external space associated with radius of action of the user wearing the wearable device. The radius of action and/or the preset size may correspond to a space in which the user's hand may reach independently of the user's footstep.

Referring to FIG. 9, in a state identifying the external object in the external space of operation 920 (920—YES), the wearable device may generate a control panel based on the external object, by performing operation 930. The wearable device may generate a control panel, on a substantially flat surface of an object external of operation 930, such as the control panel 140 formed on one surface 632 of the real object 630 of FIG. 6A. Generating the control panel by the wearable device may include determining a location of the control panel by the wearable device based on the location of the external object, within the virtual space mapped to the external space. For example, the wearable device may determine the location and/or size of the control panel in operation 930, based on a portion of the virtual space corresponding to the one surface of the external object.

Referring to FIG. 9, in a state in which the external object of operation 920 is not identified (920—NO), the wearable device may generate a control panel based on a location spaced apart by a preset distance from the wearable device, by performing operation 940. The wearable device may determine a location where the control panel will be generated, based on the size (e.g., the height of the user) of the user's body part and/or posture of the user wearing the wearable device. As described above with reference to FIG.

6A, the wearable device may determine the location of the control panel, based on a point in the virtual space matched to the location of the wearable device. For example, the wearable device may dispose the control panel at a point spaced apart in a preset direction (e.g., a direction facing a surface in the virtual space corresponding to the floor surface of the external space), from the point in the virtual space matched to the location of the wearable device.

Referring to FIG. 9, within operation 950, according to an embodiment, the wearable device may receive a second input to select a portion of the external space corresponding to the control panel. The second input may include an input indicating to select the visual object 620 of FIG. 8. Referring to FIG. 9, within operation 960, according to an embodiment, the wearable device may identify at least one virtual object associated with a portion of the external space selected by the second input. The wearable device may obtain information on the mixed reality associated with a portion of the external space, by using a camera disposed toward the portion of the external space of operation 950. The wearable device may identify a portion of the virtual space mapped to the portion of the external space selected by the second input, based on the virtual space mapped to the external space. The wearable device may identify the at least one visual object included in the portion of the identified virtual space.

Referring to FIG. 9, within operation 970, according to an embodiment, the wearable device may display at least one visual object representing at least one identified virtual object on the control panel. The at least one visual object may include an image and/or a video representing the appearance of at least one virtual object shown through the displaying area of the wearable device. The wearable device may display the at least one visual object on an image (e.g., the first image to the second image of FIG. 8) in which a portion of the external space is captured, by superimposing. Since the at least one visual object is superimposed on the image, the wearable device may represent a mixed reality provided through the portion of the external space, on the control panel.

Hereinafter, referring to FIGS. 10A to 10D, according to an embodiment, a structure and/or layout of a control panel generated by a wearable device based on the operations of FIG. 9 will be described.

FIGS. 10A, 10B, 10C, and 10D illustrate an example of an operation in which a wearable device displays a control panel 140 for controlling a virtual object in a space, according to an embodiment. The wearable device of FIGS. 10A to 10D may be an example of the wearable devices of FIGS. 1A, 1B, 2, 3A, 3B, 4A, 4B, and 5. For example, an operation of the wearable device described later with reference to FIGS. 10A to 10D may be performed by the wearable device 101 of FIG. 2.

Referring to FIGS. 10A to 10D, according to an embodiment, different states 1001, 1002, 1003, and 1004 of the control panel 140 added to the virtual space by the wearable device as a control panel for controlling at least one virtual object in the virtual space (e.g., the space 160 of FIGS. 1A and 1B) are illustrated. The control panel 140 may be generated in the virtual space, based on the operation of the wearable device described above with reference to FIGS. 6A and 6B and 7 to 9. The wearable device may display at least a portion of the control panel 140 based on a direction of the wearable device.

Figure 10A:
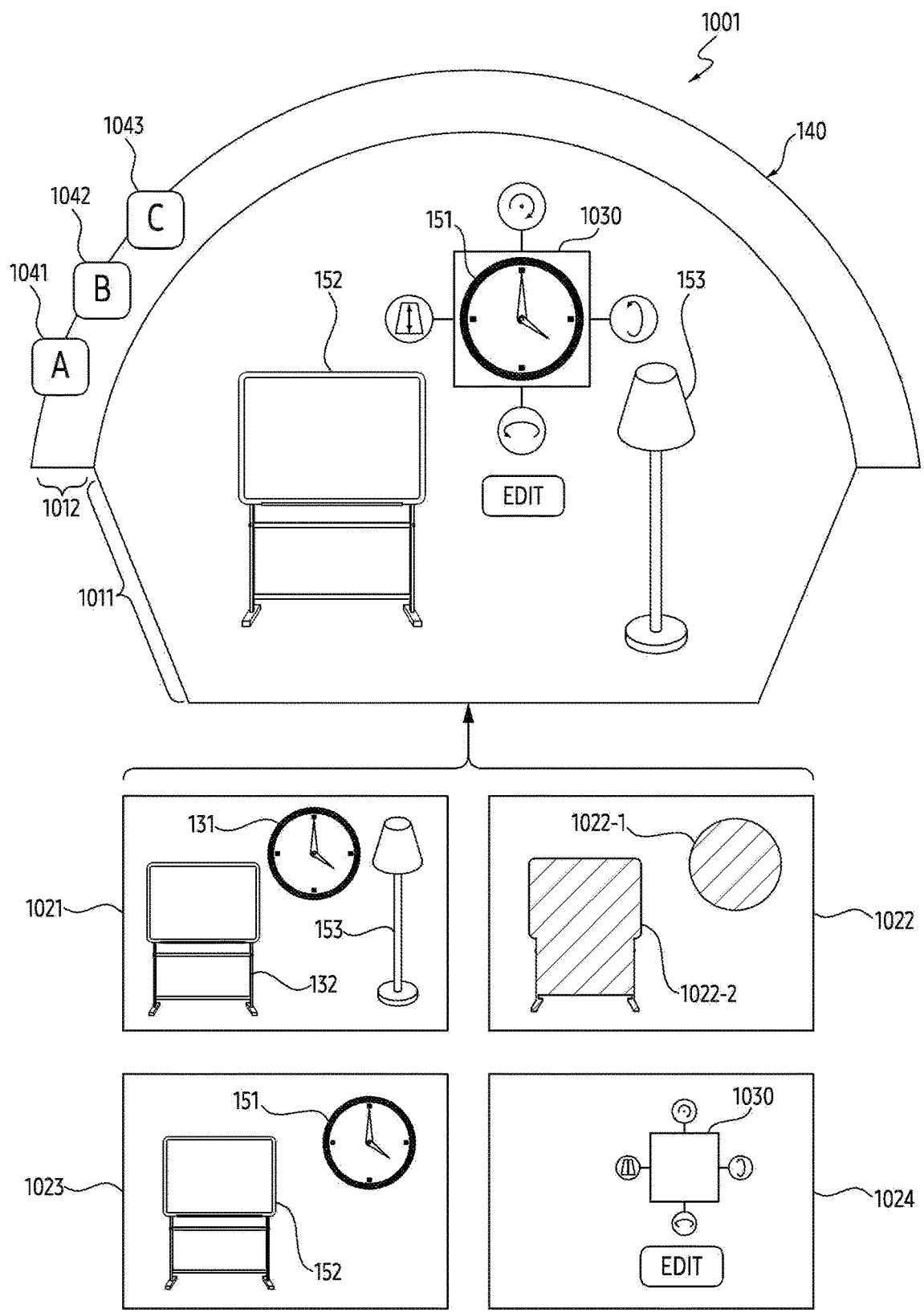
FIGS. 10A, 10B, 10C, and 10D illustrate an example of an operation in which a wearable device displays a control panel for controlling a virtual object in a space, according to an embodiment.

Referring to FIG. 10A, a state 1001 of the control panel 140 is illustrated in which one or more visual objects (e.g., the first visual object 151 to the second visual object 152) corresponding to one or more virtual objects (e.g., the first virtual object 131 to the second virtual object 132 of FIG. 1A) shown through the displaying area of the wearable device through the direction D1 of FIG. 1A are disposed. The control panel 140 in which one or more visual objects are disposed may be a control panel for remotely controlling and/or modifying one or more virtual objects. According to an embodiment, the wearable device may divide the control panel 140 into areas (e.g., a first area 1011 to a second area 1012). Within the first area 1011, the wearable device may represent AR and/or MR based on the one or more virtual objects. The wearable device may identify an input indicating insertion and/or extraction of the virtual object with respect to the virtual space, by using the second area 1012 different from the first area 1011. A state 1001 in which the second area 1012 is formed along the arc of a fan shape within the control panel 140 having the fan shape is illustrated, but shapes of the first area 1011, the second area 1012, and/or the control panel 140 are not limited to an embodiment described above with reference to FIGS. 10A to 10D.

Referring to FIG. 10A, in the state 1001 displaying visual objects (the first visual object 151 to the second visual object 152) corresponding to virtual objects (the first virtual object 131 to the second virtual object 132) shown through the direction D1 of FIG. 1A, the wearable device may generate a user interface (UI) to be displayed through the first area 1011 in the control panel 140, based on a plurality of layers (e.g., a first layer 1021 to a fourth layer 1024) superimposed on each other. The wearable device may obtain the UI and/or texture in the first area 1011 by sequentially stacking the plurality of layers from the first layer 1021 to the fourth layer 1024. The first layer 1021 to the fourth layer 1024 may correspond to different images obtained by performing different operations by the wearable device.

According to an embodiment, the wearable device may obtain the first layer 1021 based on at least one frame obtained using a camera of the wearable device. The camera may be disposed in one direction (e.g., a front direction of the wearable device) of the wearable device. The wearable device may obtain an image including the third visual object 153 representing a real object (e.g., the real object 120 of FIG. 1A) by using the camera. In an embodiment, the image may be a screen shot, which includes virtual objects (e.g., the first virtual objects 131 to the second virtual objects 132) displayed through the displaying area of the wearable device. The wearable device may dispose the image obtained using the camera in the first layer 1021. In an embodiment, the wearable device may apply visual effects such as dimming and/or blur to an image disposed within the first layer 1021. The wearable device may darken and/or blur the external space represented by the image, by modifying the color tone of the image in the first layer 1021.

According to an embodiment, the wearable device may dispose a masking area to emphasize a visual object (e.g., the first visual object 151 to the second visual object 152) to be displayed through the control panel 140, within the second layer 1022 stacked on the first layer 1021. In order to dispose the masking area, the wearable device may identify locations of virtual objects (e.g., the first virtual object 131 and/or the second virtual object 132) within the image of the first layer 1021. For example, the wearable device may generate a first masking area 1022-1 within the second layer 1022, based on the size, location, and/or shape of the first virtual object 131 in the image. Similarly, the wearable device may generate a second masking area 1022-2 within the second layer 1022, based on the size, location, and/or shape of the second virtual object 132 in the image. Since the second layer 1022 is stacked on the first layer 1021, virtual objects (e.g., the first virtual object 131 to the second virtual object 132) included in the image of the first layer 1021 may be occluded by masking areas (e.g., the first masking area 1022-1 to the second masking area 1022-2).

According to an embodiment, the wearable device may display visual objects representing virtual objects included in the image of the first layer 1021, within the third layer 1023 stacked on the first layer 1021 and the second layer 1022. The wearable device may display the first visual object 151 2-dimensionally representing the first virtual object 131 in the third layer 1023. The wearable device may display the second visual object 152 having the appearance of the second virtual object 132 shown through the image in the third layer 1023. Since the first layer 1021 to the third layer 1023 are sequentially stacked within the first area 1011 of the control panel 140, the wearable device may display the third visual object 153 representing a real object, together with the first visual objects 151 to the second visual objects 152 representing the first virtual object 131 to the second virtual object 132, through the first area 1011.

According to an embodiment, the wearable device may display the visual object 1030 for controlling a virtual object with respect to a specific visual object selected by the user, among the visual objects in the third layer 1023, within the fourth layer 1024 stacked on the first layer 1021 to the third layer 1023. In the state 1001 of FIG. 10A, the wearable device may generate the visual object 1030 within the fourth layer 1024, based on an input indicating to select the first visual object 151. The wearable device may generate the visual object 1030 within the fourth layer 1024, based on the location and/or shape of the first visual object 151 selected by the input. Since the first layer 1021 to the fourth layer 1024 are stacked sequentially, the wearable device may display the visual object 1030, by superimposing on all visual objects (e.g., the first visual object 151 to the third visual object 153) of the first layer 1021 to the third layer 1023. When the wearable device applies a visual effect, such as dimming and/or blur to the image of the first layer 1021, visual objects (e.g., the first visual object 151 to the second visual object 152) representing virtual objects and the visual objects 1030 for controlling the virtual object may be emphasized within the first area 1011. The visual object 1030 may include one or more handles to control the parallel movement and/or rotation movement of the first virtual object 131 matched to the first visual object 151 selected by the input. According to an embodiment, an operation in which the wearable device identifies an input associated with the visual object 1030 will be described with reference to FIGS. 11A to 11C.

According to an embodiment, the wearable device may display an icon matched to another virtual object different from the virtual object controlled based on the first area 1011, by using the second area 1012 displayed in parallel with the first area 1011 in the control panel 140. In the state 1001 of FIG. 10A, the wearable device may display icons 1041, 1042, and 1043 matched to other virtual objects different from the first virtual object 131 to the second virtual object 132, in the second area 1012. Each of the icons 1041, 1042, and 1043 may correspond to an application (e.g., applications in the application layer 240 of FIG. 2) and/or a file stored in a memory (e.g., the memory 215 of FIG. 2) of the wearable device. Based on a gesture crossing the boundary between the first area 1011 and the second area 1012, the wearable device may add a virtual object to a portion of the virtual space corresponding to the first area 1011, or remove the virtual object from the portion of the virtual space. Hereinafter, an operation of the wearable device with respect to different gestures crossing the boundary will be described with reference to FIGS. 10B to 10D.

Figure 10B:
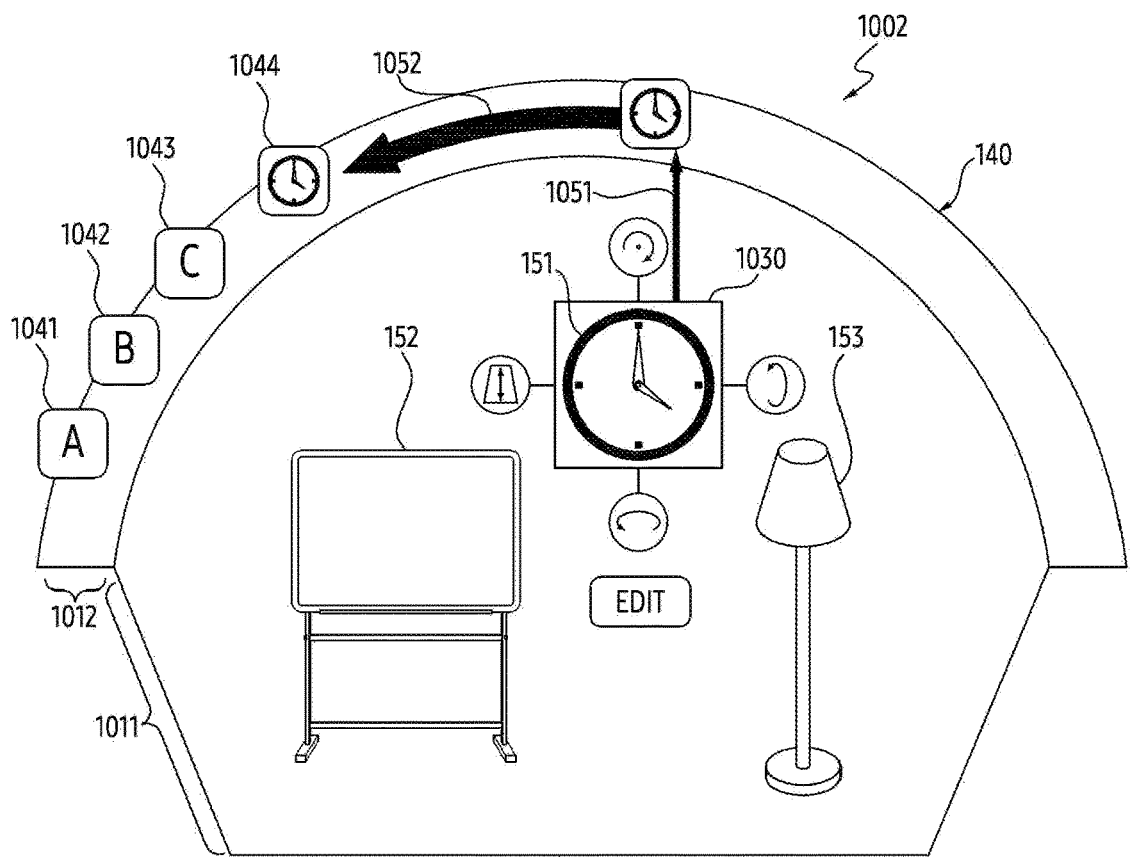
Figure 10B:
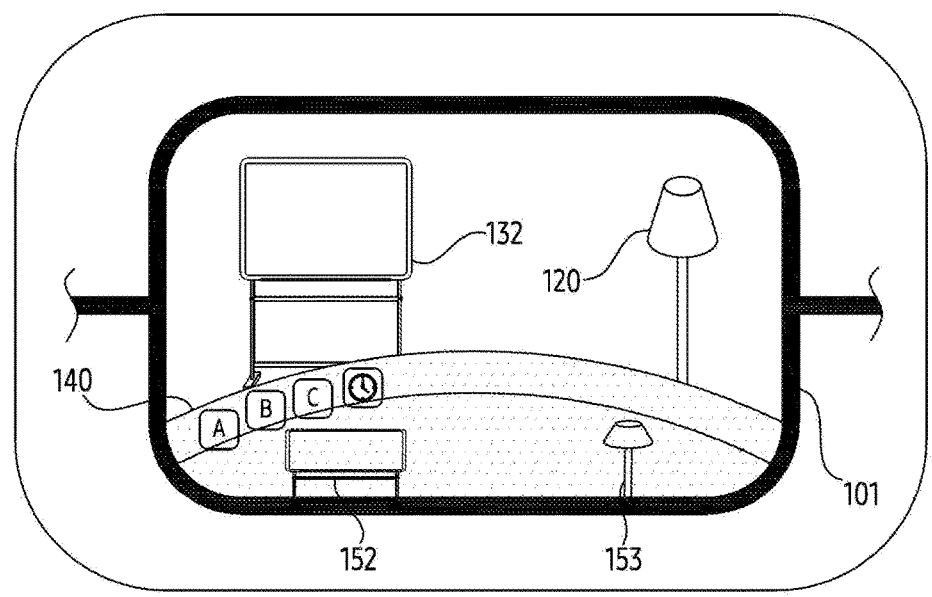

Referring to FIG. 10B, according to an embodiment, the state 1002 is illustrated in which the wearable device identifies a gesture facing from the first area 1011 to the second area 1012. For example, in the state 1001 of FIG. 10A, the wearable device may identify the gesture by tracking at least one of a direction of the user's gaze and/or a motion of the hand. Based on identifying the gesture, the wearable device may switch from the state 1001 to the state 1002 of FIG. 10B. Within the state 1002, in response to the gesture indicating to move the first visual object 151 along with the first direction 1051, the wearable device may move the first visual object 151 from the first area 1011 to the second area 1012, along with the first direction 1051. Based on the gesture, the wearable device may identify an input indicating to move the first visual object 151 from the first area 1011 to the second area 1012.

Within the state 1002 of FIG. 10B, in response to the input indicating to move the first visual object 151 from the first area 1011 to the second area 1012, the wearable device may remove the first virtual object 131 corresponding to the first visual object 151 in the virtual space. Referring to FIG. 10B, as the first virtual object 131 is removed, the wearable device 101 may cease at least temporary displaying the first virtual object 131 in the displaying area. Similar to removing the first virtual object 131, the wearable device may remove the first visual object 151 associated with the input from the first area 1011 of the control panel 140. Referring to FIG. 10B, the wearable device may replace the first visual object 151 moved into the second area 1012 along the first direction 1051 with an icon 1044 representing the first virtual object 131 corresponding to the first visual object 151. Within the state 1002 in which icons 1041, 1042, and 1043 are sequentially arranged on the left side of the second area 1012, the wearable device may move the icon 1044 to a portion of the second area 1012 adjacent to the icons 1041, 1042, and 1043 along with the second direction 1052. As the icon 1044 moves along with the second direction 1052, the icons 1041, 1042, 1043, and 1044 may be sequentially arranged from the left end of the second area 1012.

Figure 10C:
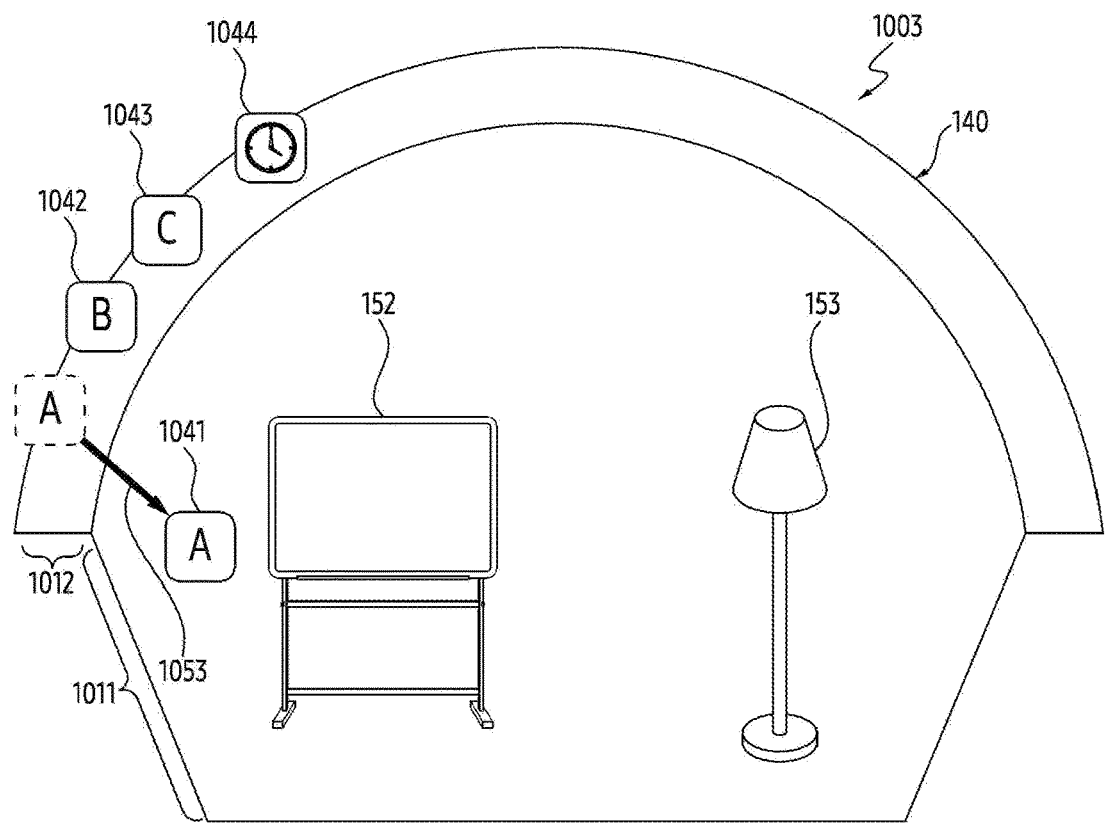
Figure 10C:
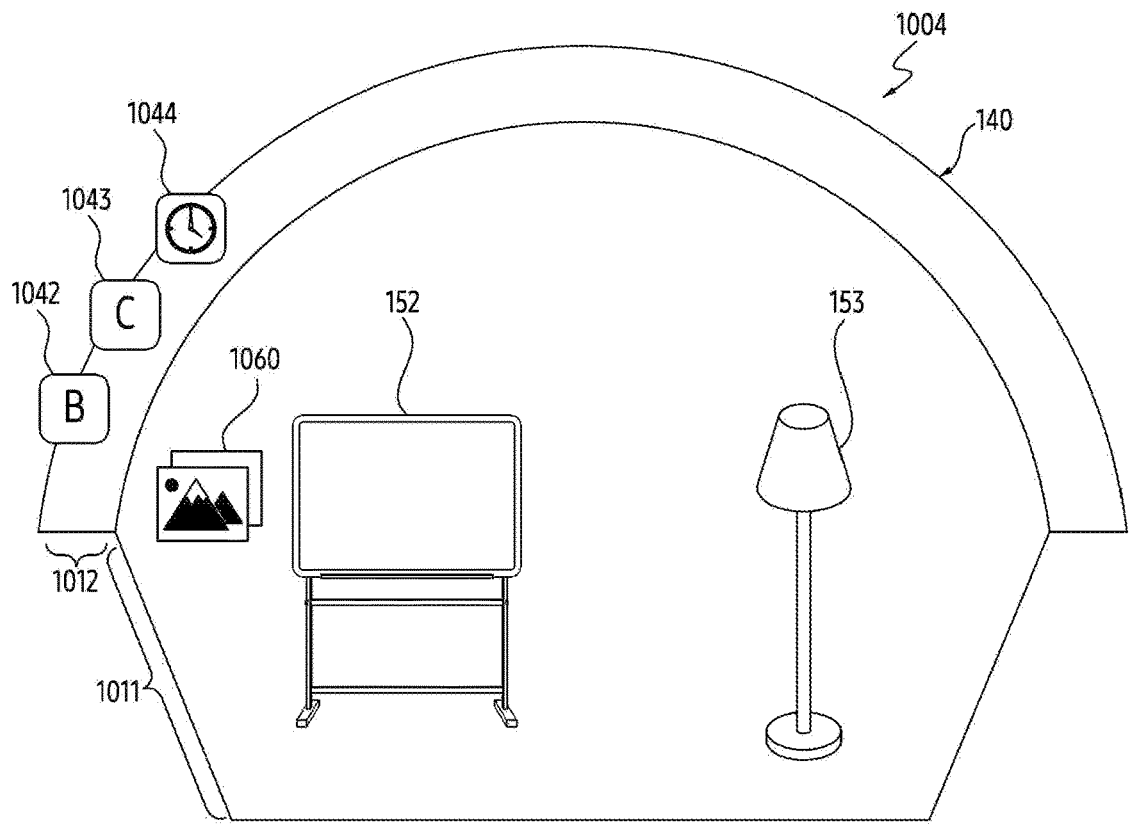

Referring to FIG. 10C, according to an embodiment, the state 1003 in which the wearable device identifies a gesture facing from the second area 1012 to the first area 1011 is illustrated. For example, in the state 1002 of FIG. 10B, the wearable device may identify the gesture by tracking at least one of the direction of the user's gaze and/or the motion of the hand. Based on identifying the gesture, the wearable device may switch from the state 1002 to the state 1003 of FIG. 10C. Within the state 1003, the wearable device may move the icon 1041 from the second area 1012 to the first area 1011 along with the third direction 1053, based on the gesture indicating to move the icon 1041. The gesture may include an input indicating to move the icon 1041 from the second area 1012 to the first area 1011.

Figure 10D:
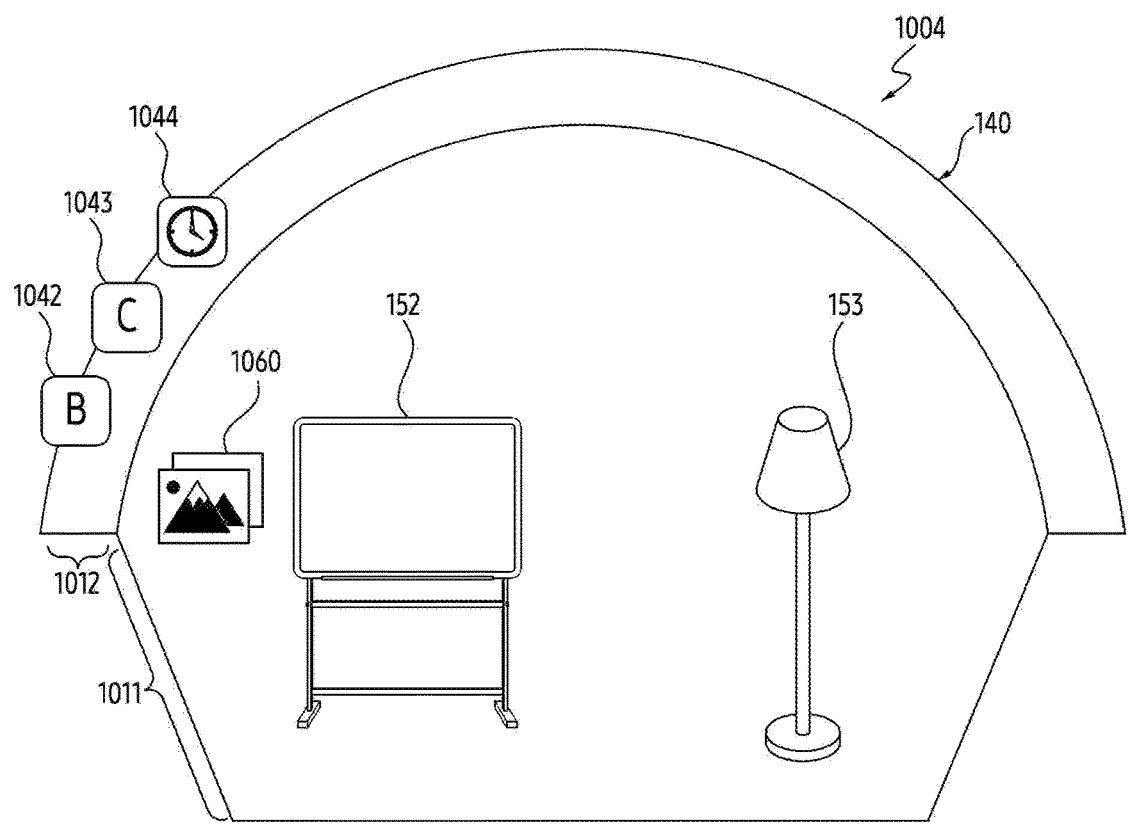
Figure 10D:
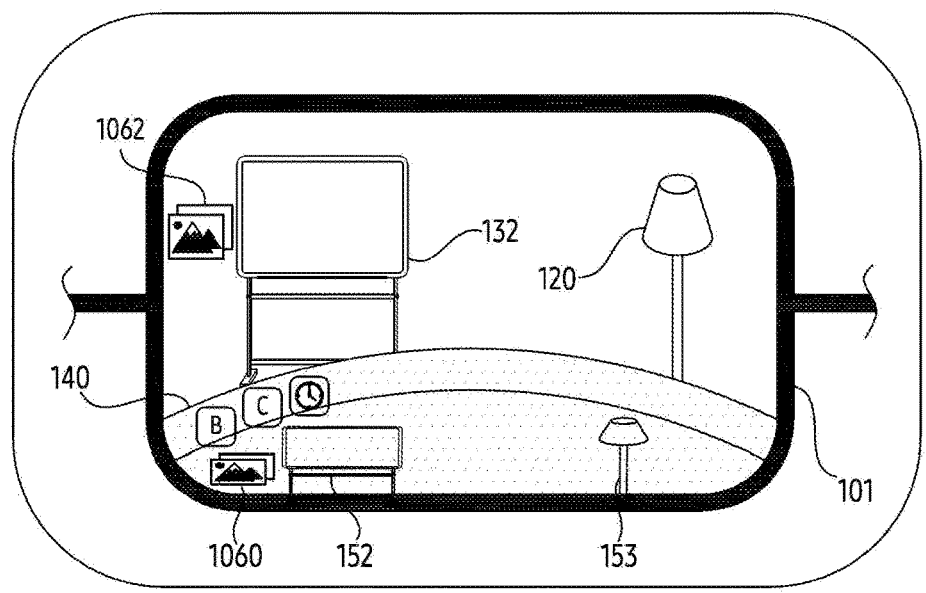

Referring to FIG. 10C and/or FIG. 10D, in response to an input indicating to move the icon 1041 from the second area 1012 to the first area 1011, the wearable device may switch from the state 1003 to the state 1004. Within the state 1004, the wearable device may add a third virtual object 1062 corresponding to the icon 1041 in the virtual space. As the third virtual object 1062 is added to the virtual space, the wearable device may switch from the state 1003 to the state 1004 in which a fourth visual object 1060 representing the third virtual object 1062 is added to the first area 1011. Referring to FIG. 10C, within the state 1004, the wearable device may display the fourth visual object 1060, based on the location in the first area 1011 of the icon 1041 moved along the third direction 1053. The wearable device may display the fourth visual object 1060 and/or the third virtual object 1062 based on an application and/or file matched to the icon 1041. Referring to the state 1004 of FIG. 10D, as the icon 1041 moves from the second area 1012 to the first area 1011, other icons 1042, 1043, and 1044 distinguished from the icon 1041 in the second area 1012 may be sequentially arranged from the left end of the second area 1012.

Referring to FIG. 10D, within the state 1004, the wearable device 101 may display the third virtual object 1062 added to the virtual space together with the fourth visual object 1060 added to the first area 1011 in the control panel 140. The wearable device may add the third virtual object 1062, based on a location relationship of visual objects (e.g., the second visual object 152, the third visual object 153, and the fourth visual object 1060) in the first area 1011. Referring to FIG. 10D, since the fourth visual object 1060 is disposed on the left side of the second visual object 152 to the third visual object 153 in the first area 1011, the wearable device 101 may display the third virtual object 1062 corresponding to the fourth visual object 1060 in the displaying area on the left side of the second virtual object 132 to the real object 120. For example, the location relationship between the second visual object 152, the third visual object 153, and the fourth visual object 1060 in the first area 1011 may be coincide with the location relationship of the second virtual object 132, the real object 120, and the third virtual object 1062 shown through the displaying area.

As described above, according to an embodiment, the wearable device 101 may generate the control panel 140 including the first area 1011 and the second area 1012 as an example of the control panel for controlling at least one virtual object in the virtual space. The wearable device 101 may support intuitive control of virtual objects shown through the displaying area, by using the first area 1011 in the control panel 140. The wearable device 101 may remove virtual objects shown through the display area or/or add virtual objects within the displaying area, by using the second area 1012 in the control panel 140.

Hereinafter, referring to FIGS. 11A to 11C, according to an embodiment, an example of an operation in which the wearable device 101 displays an additional visual object for controlling a virtual object, such as the visual objects 1030, on the first area 1011 of the control panel 140 will be described.

Figure 11A:
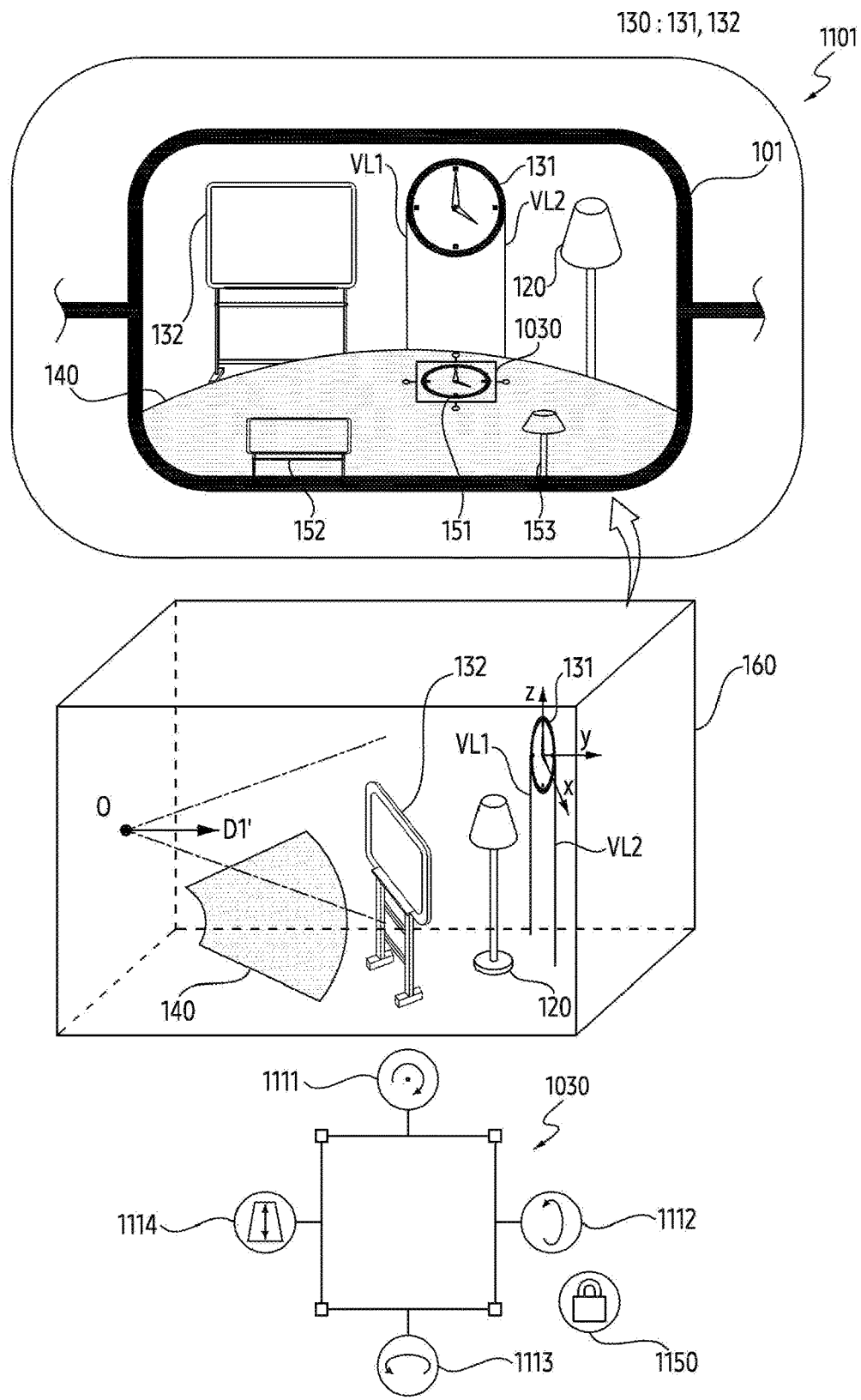
FIGS. 11A, 11B, and 11C illustrate an example of an operation in which a wearable device controls a space and/or a virtual object in the space in response to an input associated with a control panel, according to an embodiment.
Figure 11B:
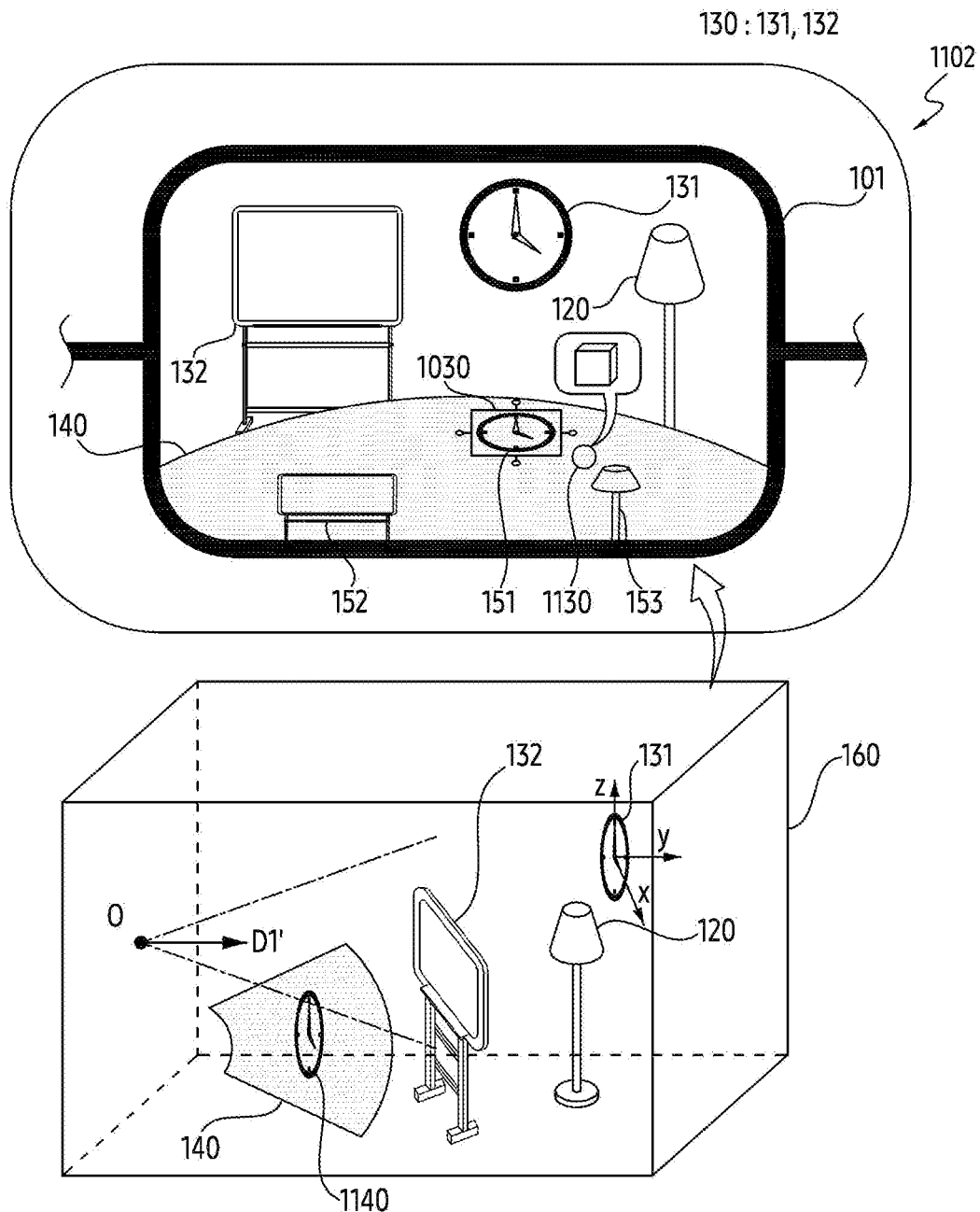
Figure 11C:
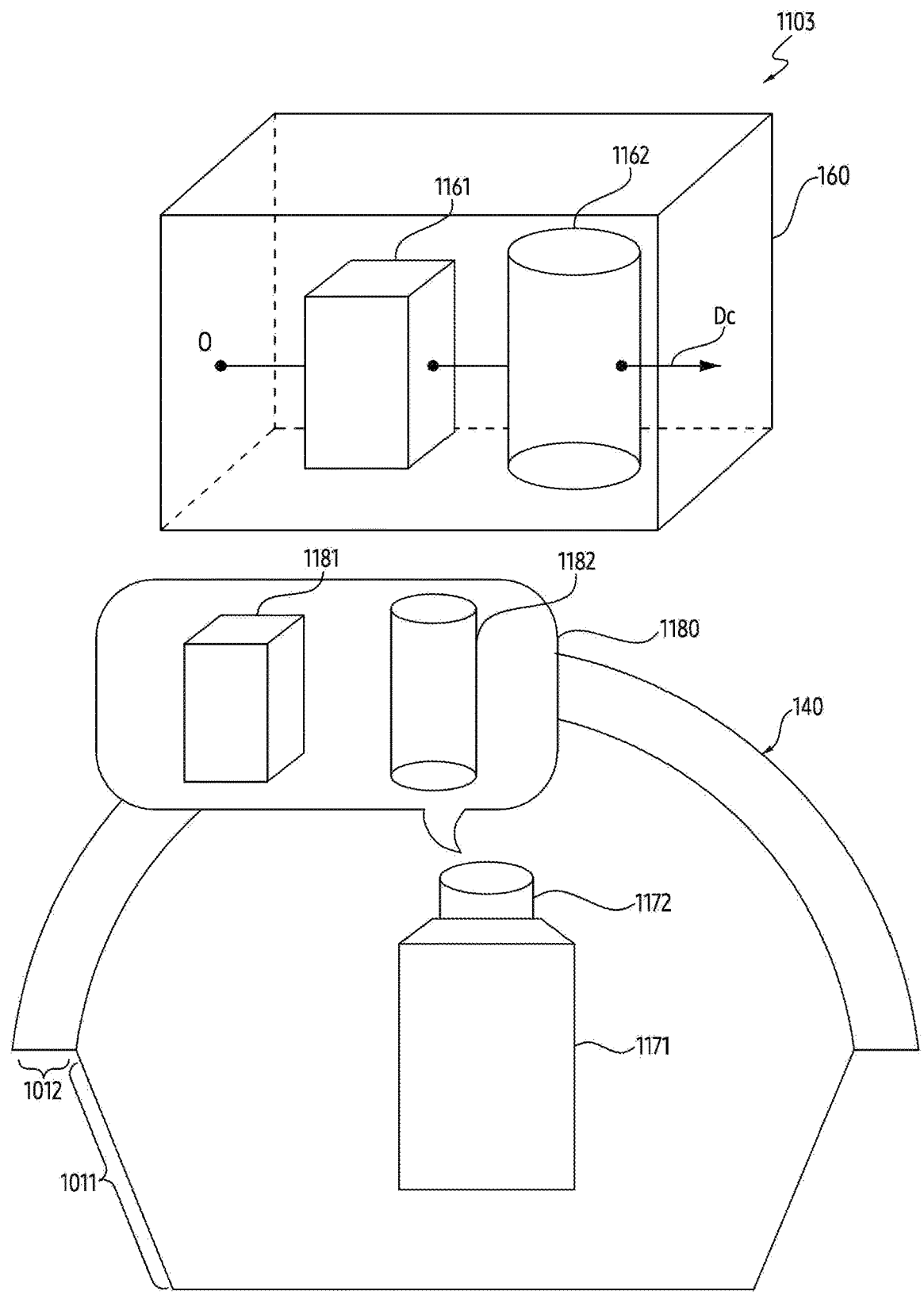

FIGS. 11A, 11B, and 11C illustrate an example of an operation in which a wearable device 101 controls a space 160 and/or a virtual object in the space 160 in response to an input associated with a control panel 140, according to an embodiment. The wearable device 101 of FIGS. 11A to 11C may be an example of the wearable device of FIGS. 1A, 1B, 2, 3A, 3B, 4A, 4B, and 5. For example, an operation of the wearable device 101 described later with reference to FIGS. 11A to 11C may be performed by the wearable device 101 of FIG. 2.

Referring to FIGS. 11A to 11C, according to an embodiment, different states 1101, 1102, and 1103 in which the wearable device 101 controls the virtual object in the space 160 using the control panel 140 are illustrated. Within the state 1101 of FIG. 11A, based on an input indicating to select the first visual object 151, which is matched to the first virtual object 131 in the space 160, in the control panel 140, the wearable device 101 may display the visual object 1030 for controlling the first virtual object 131 and/or the first visual object 151 by superimposing on the first visual object 151.

Referring to FIG. 11A, according to an embodiment, an example of the visual object 1030 displayed by the wearable device 101 in association with the first visual object 151 is illustrated. The visual object 1030 may include a rectangular box surrounding the first visual object 151 in the control panel 140 and visual objects 1111, 1112, 1113, and 1114 connected to each of the edges of the box. The visual object 1111 may have a form of a handle, button, and/or icon to guide rotation movement based on the y-axis in the space 160 of the first virtual object 131 matched to the first visual object 151. The visual object 1112 may have a form of a handle, button, and/or icon to guide rotation movement based on the x-axis in the space 160 of the first virtual object 131. The visual object 1113 may have a form of a handle, button, and/or icon to guide rotation movement based on the z-axis in the space 160 of the first virtual object 131. For example, visual objects 1111, 1112, and 1113 may be displayed to control rotational movement corresponding to each of different axes the x-axis, the y-axis, and the z-axis in the virtual space. The visual object 1114 may have a form of a handle, button, and/or icon for guiding parallel movement based on the y-axis in the space 160 of the first virtual object 131.

In an embodiment, based on a gesture of selecting and/or moving at least one of the visual objects 1111, 1112, 1113, and 1114, the wearable device 101 may perform parallel movement and/or rotation movement with respect to the first virtual object 131 within the space 160. For example, based on an input indicating to select and/or move the visual object 1114, the wearable device 101 may move the first virtual object 131 along with the y-axis within the space 160. Based on the input, the wearable device 101 may display guidelines VL1 and VL2 extending from the first virtual object 131 to one surface (e.g., x-y plane corresponding to the floor surface) of the space 160. The guidelines VL1 and VL2 may be displayed by the wearable device 101 to visualize a location relationship of the first virtual object 131 moved along with the y-axis. According to an embodiment, the wearable device 101 may communicate with an external electronic device (e.g., the server 270 of FIG. 2) connected to the wearable device 101, in order to perform parallel movement and/or rotation movement of the first virtual object 131 based on a gesture of selecting and/or moving at least one of the visual objects 1111, 1112, 1113, and 1114. For example, the wearable device 101 may transmit information associated with the gesture (e.g., information tracking the motion of the user's hand) to the external electronic device. For example, the wearable device 101 may transmit a property of the first virtual object 131 modified by parallel movement and/or rotational movement based on the gesture to the external electronic device. Based on the property, the external electronic device may perform parallel movement and/or rotation movement with respect to the first virtual object 131 within the space 160. The external electronic device may transmit information (e.g., a final state of the space 160) including a result of performing the parallel movement and/or the rotational movement within the space 160 to the wearable device 101. The wearable device 101 may receive the information with respect to the first virtual object 131 moved by the gesture within the space 160, from the external electronic device. Based on the information, the wearable device 101 may modify the first virtual object 131 displayed in the displaying area and/or the first visual object 151 displayed on the control panel 140.

Within the state 1101 of FIG. 11A, the parallel movement of the first virtual object 131 within the space 160 performed by the parallel movement of the first visual object 151 within the control panel 140 may be associated with a scale between the first visual object 151 and the first virtual object 131. The wearable device 101 may display the first visual object 151 representing a first virtual object 131 reduced based on a preset ratio within the control panel 140. Within the state 1101, in response to an input indicating to move the first visual object 151, the wearable device 101 may obtain a moving distance of the first virtual object 131 in the space 160 by applying the preset ratio to the moving distance of the first visual object 151 moved by the input. The wearable device 101 may perform parallel movement with respect to the first virtual object 131 within the space 160, based on the obtained movement distance. Obtaining the moving distance of the first virtual object 131 by the wearable device 101 may be performed based on communicating with an external electronic device (e.g., the server 270 of FIG. 2) connected to the wearable device 101.

According to an embodiment, the wearable device 101 may display a visual object 1150 to indicate whether the movement of the first virtual object 131 is restricted, together with the visual object 1030 associated with the first visual object 151. For example, the wearable device 101 may visualize that the movement of the first virtual object 131 is restricted by using the visual object 1150 having a form of an icon in which a lock is illustrated. When the visual object 1150 is displayed, the wearable device 101 may display preset text (e.g., "the movement of the virtual object is restricted") for guiding that the movement of the first virtual object 131 corresponding to the first visual object 151 is restricted based on the input indicating to move the first visual object 151. The preset text may be displayed in a form of a pop-up window or/or outputted in a form of a natural language sentence outputted from the wearable device 101. The wearable device 101 may toggle restricting the movement of the first virtual object 131, based on the input indicating to select the visual object 1150.

In an embodiment, the wearable device 101 may restrict the movement (e.g., parallel movement and/or rotational movement) of at least one of the virtual objects corresponding to the visual objects, based on whether the movement of each visual object is restricted within the control panel 140. For example, when the movement of the first virtual object 131 corresponding to the first visual object 151 is allowed, in response to a gesture of moving the second visual object 152 to a portion of the control panel 140 superimposed on the first visual object 151, the wearable device 101 may move the first visual object 151 within the control panel 140 so that the first visual object 151 and the second visual object 152 is not superimposed on the control panel 140. In the above example, when the movement of the first virtual object 131 corresponding to the first visual object 151 is restricted, the wearable device 101 may restrict the movement of the second visual object 152 and/or the second virtual object 132 as the movement of the first visual object 151 and/or the first virtual object 131 is restricted in response to the gesture. In the example, the wearable device 101 may display a preset text (e.g. "No location available to move" and/or "Not enough space to turn") indicating that the movement of the second visual object 152 is restricted based on the gesture.

Referring to FIG. 11B, according to an embodiment, the wearable device 101 may display a visual object 1130 for displaying the first virtual object 131 matched to the first visual object 151 in 3-dimensions on the control panel 140, based on an input indicating to select the first visual object 151 displayed in the control panel 140. The wearable device 101 may display the visual object 1130 having a form of an icon in which a three-dimensional figure is illustrated, together with the visual object 1030 described above with reference to FIG. 11A. Within the state 1102 of FIG. 11B, in response to an input indicating to select the visual object 1130, the wearable device 101 may display a virtual object 1140 corresponding to the first virtual object 131 matched to the first visual object 151 on the control panel 140. The virtual object 1140 may have a miniature form in which the first virtual object 131 is reduced, based on the scale between the first visual object 151 and the first virtual object 131 in the control panel 140. The wearable device 101 may arrange the virtual object 1140 on the control panel 140 within the space 160, based on the input associated with the visual object 1130.

Within the state 1102 of FIG. 11B, the wearable device 101 may perform parallel movement and/or rotation movement with respect to the first virtual object 131 matched to the virtual object 1140, based on the input with respect to the virtual object 1140 disposed on the control panel 140. For example, the wearable device 101 may perform parallel movement with respect to the first virtual object 131 within the space 160, based on the input indicating to move the virtual object 1140 on the control panel 140. For example, the wearable device 101 may perform rotation movement with respect to the first virtual object 131 within the space 160, based on the input indicating to rotate the virtual object 1140 on the control panel 140.

Referring to FIG. 11C, a state 1103 in which a plurality of virtual objects 1161 and 1162 are arranged along with a direction Dc within the space 160 is illustrated. When a view angle of the wearable device 101 is formed based on the point O in the space 160, the virtual objects 1161 and 1162 may at least partially overlap within the displaying area of the wearable device 101. When a control panel is formed based on the view angle, visual objects 1171 and 1172 corresponding to each of the virtual objects 1161 and 1162 may at least partially overlap within the control panel 140 corresponding to the control panel.

As shown in the state 1103 of FIG. 11C, the wearable device 101, which displays the control panel 140 including superimposed on visual objects 1171 and 1172 at least partially may display a pop-up window 1180 for guiding to select virtual objects 1161 and 1162 corresponding to each of the visual objects 1171 and 1172. Within the pop-up window 1180, the wearable device 101 may display visual objects 1181 and 1182 corresponding to each of the virtual objects 1161 and 1162. Based on the input indicating to select any one of the visual objects 1181 and 1182, the wearable device 101 may select any one of the virtual objects 1161 and 1162. Based on the input, the wearable device 101 may emphasize a visual object selected by the input among the visual objects 1181 and 1182. Emphasizing the visual object selected by the input by the wearable device 101 may include modifying the color and/or boundary of the visual object. After identifying the input, the wearable device 101 may control a specific virtual object selected by the input among the virtual objects 1161 and 1162. Visual objects 1181 and 1182 may include thumbnails with respect to each of the virtual objects 1161 and 1162 that are at least partially superimposed on. Embodiments are not limited thereto.

As described above, according to an embodiment, the wearable device 101 may perform parallel movement and/or rotation movement with respect to at least one virtual object in the space 160, based on the input performed on the control panel 140 which is an example of the control panel. As described above with reference to FIG. 5, the at least one virtual object displayed by the wearable device 101 is not limited to a graphical object based on 3-dimensional rendering. For example, the wearable device 101 may display a virtual object as an executable object matched to at least one function supported by an application, based on the execution of the application. Hereinafter, referring to FIGS. 12 and 13, an example of an operation in which the wearable device 101 modifies the virtual object by executing an application associated with the virtual object will be described.

Figure 12:
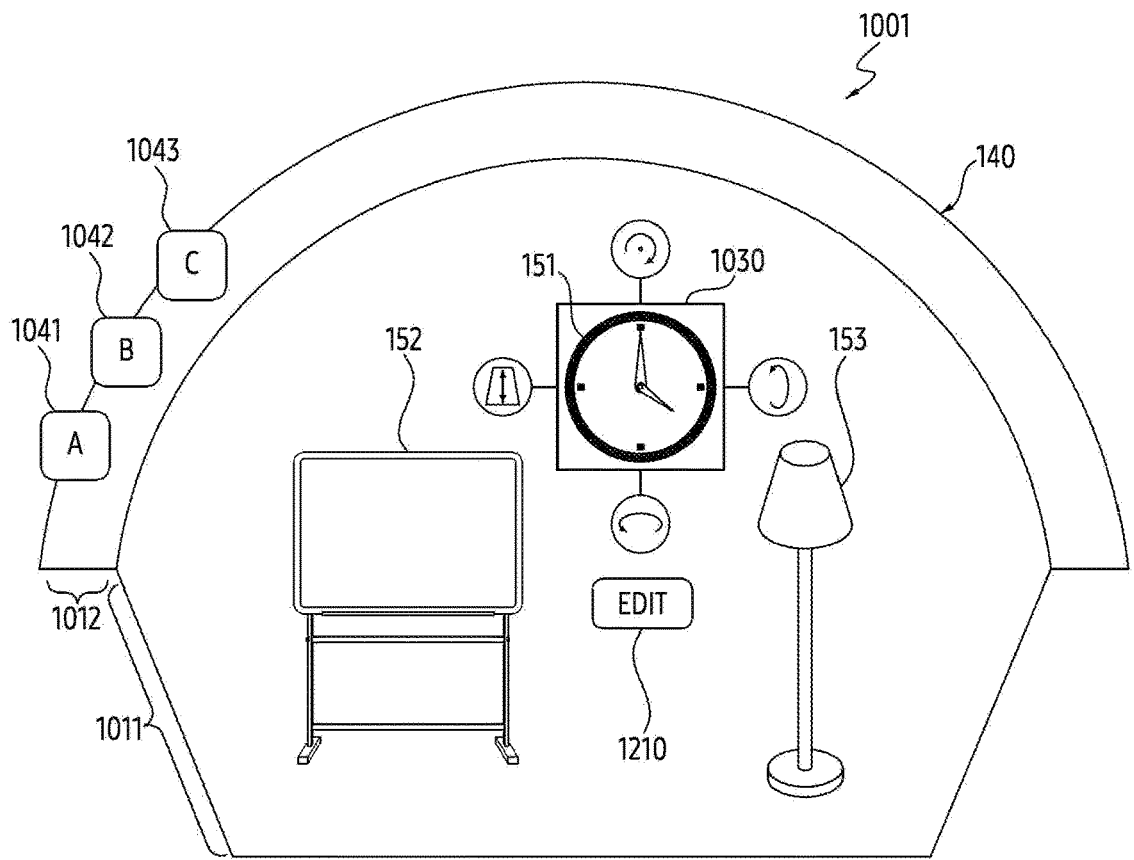
FIG. 12 illustrates an example of an operation in which a wearable device controls a space and/or a virtual object in the space in response to an input associated with a control panel, according to an embodiment.
Figure 12:
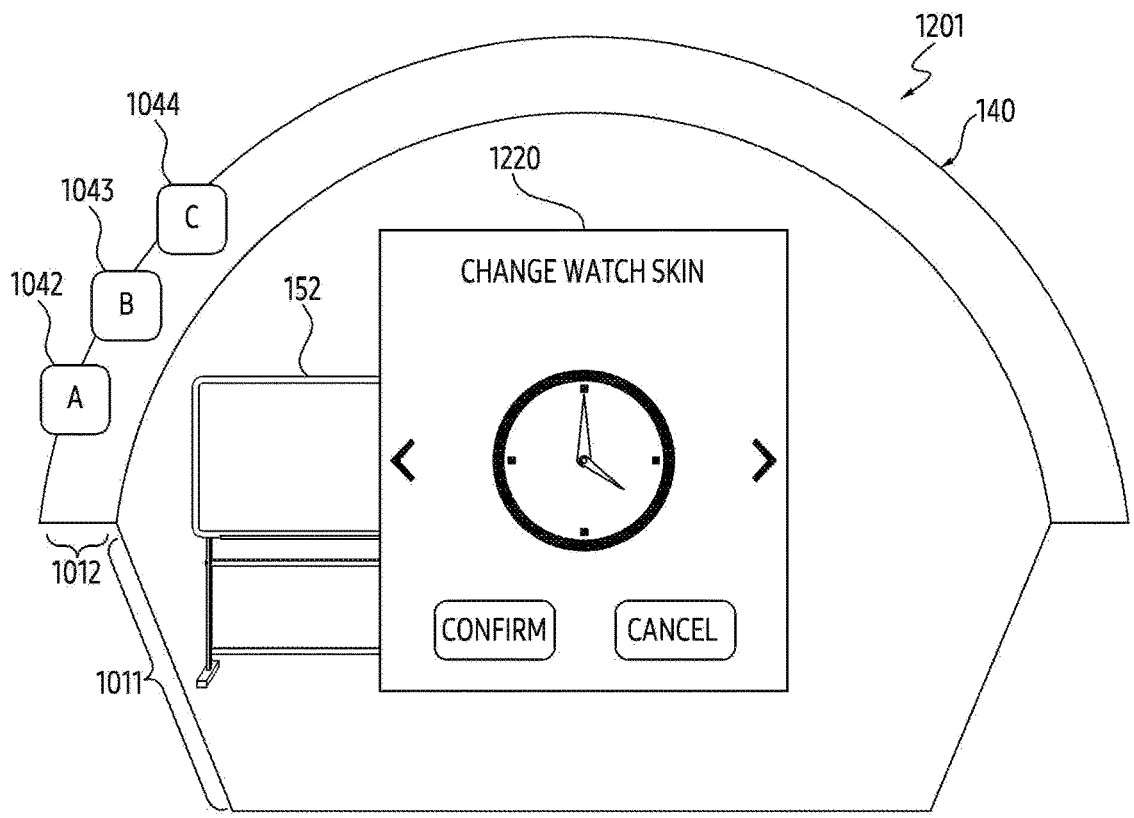

FIG. 12 illustrates an example of an operation in which a wearable device controls a space and/or a virtual object in the space in response to an input associated with a control panel 140, according to an embodiment. The wearable device of FIG. 12 may be an example of the wearable device of FIGS. 1A, 1B, 2, 3A, 3B, 4A, 4B, and 5. For example, an operation of the wearable device to be described later with reference to FIG. 12 may be performed by the wearable device 101 of FIG. 2.

Referring to FIG. 12, according to an embodiment, different states 1001 and 1201 of the control panel 140 added to the virtual space by the wearable device as a control panel for controlling at least one virtual object in the virtual space (e.g., the space 160 of FIGS. 1A and 1B) are illustrated. The state 1001 of FIG. 12 may be associated with the state 1001 of FIG. 10A. In the state 1001 of FIG. 12, based on the input indicating to select the first visual object 151, the wearable device may display the visual object 1030 to control the parallel movement and/or rotation movement of the first virtual object (e.g., the first virtual object 131 of FIGS. 1A and 1B) matched to the first visual object 151 within the control panel 140.

Hereinafter, it is assumed that the first virtual object matched to the first visual object 151 and/or the first visual object 151 is provided by a watch application (e.g., the watch application 241 of FIG. 2) installed in the wearable device. According to an embodiment, the wearable device may display at least one visual object for executing a function provided by the watch application within the state 1001 that identifies the input indicating to select the first visual object 151. Referring to the state 1001 of FIG. 12, the wearable device may display a visual object 1210 in the form of a button for executing the function provided by the watch application in association with the visual object 1030 and/or the first visual object 151. In response to an input indicating to select the visual object 1210, the wearable device may switch from the state 1001 to the state 1201.

Within the state 1201 of FIG. 12, in response to the input indicating to select the visual object 1210, the wearable device may execute a watch application associated with the first virtual object matched to the first visual object 151. The wearable device may display a screen 1220, which is provided from the watch application and superimposed on the control panel 140. Referring to FIG. 12, the wearable device may display the screen 1220 at the center of the control panel 140. A state 1201 in which the wearable device displays the screen 1220 having the form of a window and/or activity provided by the watch application is illustrated, but the embodiment is not limited thereto. For example, the wearable device may display the screen 1220 having the size and/or shape of the control panel 140. The wearable device may replace the entire area of the control panel 140 with the screen 1220. For example, the wearable device may display a floating screen 1220 at a location adjacent to the first virtual object.

Within the state 1201 of FIG. 12, the wearable device may display the screen 1220 for modifying the appearance (e.g., skin) of the first virtual object having a form of a watch based on the execution of the watch application. The embodiment is not limited thereto, and the wearable device may modify the time visualized through the first virtual object and/or display one or more options for setting an alarm, within the screen 1220.

Referring to the state 1201 of FIG. 12, a screen 1220 larger than the visual object 1210 and/or the first visual object 151 may be displayed on the control panel 140, based on the input indicating to select the visual object 1210. Within the state 1201, the wearable device may move another visual object (e.g., the second visual object 152) different from the first visual object 151 associated with the input within the control panel 140, in order to prevent at least one visual object (e.g., the second visual object 152) in the control panel 140 from being covered by the screen 1220. Referring to FIG. 12, the wearable device may cause the second visual object 152 to be moved to a portion of the control panel 140 that is not covered by the screen 1220, by moving the second visual object 152 in parallel within the control panel 140.

As described above with reference to FIG. 12, according to an embodiment, the wearable device may display an executable object (e.g., the visual object 1210) matched to a function supported by the watch application associated with the first virtual object. In response to the input indicating to select the executable object, the wearable device may execute the function using the watch application. Although the state 1001 in which the visual object 1210 having a form of a button including text such as "edit" is displayed is illustrated, the embodiment is not limited thereto. Hereinafter, referring to FIG. 13, an example in which the wearable device executes a function of a note application based on an input associated with the second visual object 152 matched to the note application (e.g., the note application 244 of FIG. 2) will be described.

Figure 13:
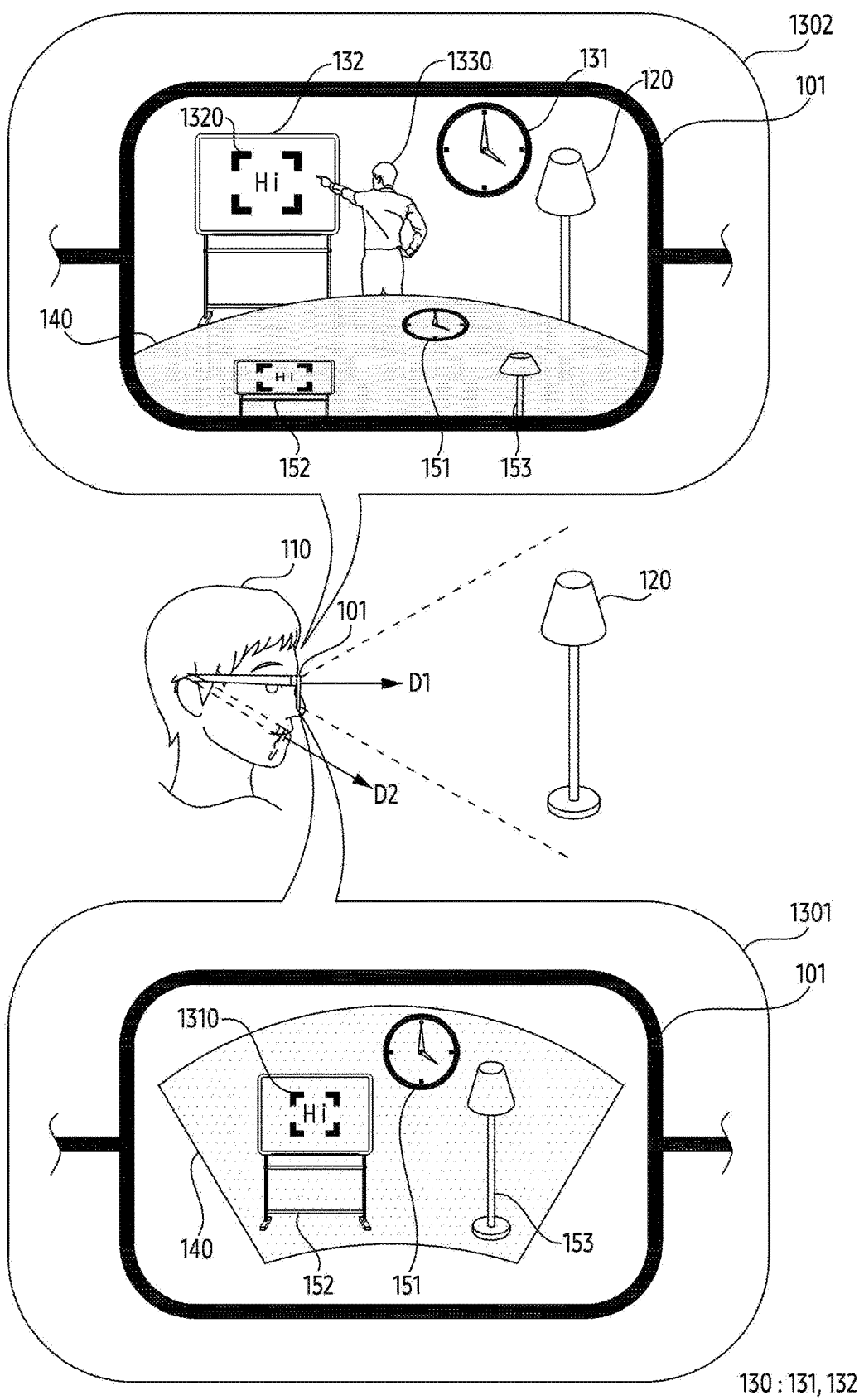
FIG. 13 illustrates an example of an operation in which a wearable device controls a space and/or a virtual object in the space in response to an input associated with a control panel, according to an embodiment.

FIG. 13 illustrates an example of an operation in which a wearable device 101 controls a space and/or a virtual object in the space in response to an input associated with a control panel 140, according to an embodiment. The wearable device 101 of FIG. 13 may be an example of the wearable device 101 of FIGS. 1A, 1B, 2, 3A, 3B, 4A, 4B, and 5. For example, an operation of the wearable device 101 described later with reference to FIG. 13 may be performed by the wearable device 101 of FIG. 2.

Referring to FIG. 13, according to an embodiment, different states 1301 and 1302 in which the wearable device 101 respectively faces the directions D1 and D2 are illustrated. Within the states 1301 and 1302 to which an external space and a virtual space (e.g., the space 160 of FIGS. 1A and 1B) are mapped, the wearable device 101 may modify a portion of the virtual space shown through the displaying area, based on a direction of the wearable device 101 in the external space identified using a sensor (e.g., the sensor 230 of FIG. 2). Within the state 1301 in which the wearable device 101 faces the direction D2, the wearable device 101 may display entirely the control panel 140, as a control panel for controlling at least one virtual object in the virtual space within the displaying area. Within the state 1302 in which the wearable device 101 faces the direction D1, the wearable device 101 may display one or more virtual objects (e.g., the first virtual object 131 to the second virtual object 132)

controlled by the control panel 140 in the displaying area, together with a portion of the control panel 140. Within the state 1302, when the wearable device 101 provides a user experience based on AR, MR, and/or VST, a real object 120 spaced apart from the user 110 along with the direction D1 may be included in the displaying area of the wearable device 101.

Within the states 1301 and 1302 of FIG. 13, it is assumed that the second virtual object 132 having a form of a blackboard is provided by the note application (e.g., the note application 244 of FIG. 2) installed in the wearable device 101. According to an embodiment, within the state 1301, the wearable device 101 may identify an input associated with the second visual object 152 disposed on the control panel 140 and matched to the second virtual object 132. Referring to FIG. 13, the state 1301 in which the wearable device 101 identifies the input of drawing handwriting 1310 on the second visual object 152 by tracking the user's gaze and/or hand motion is illustrated. Based on the input, the wearable device 101 may recognize the handwriting 1310, by executing the note application corresponding to the second visual object 152 and/or the second virtual object 132. Within the state 1302 of FIG. 13, the wearable device 101 may display the second visual object 152 on which the handwriting 1310 is drawn, by modifying the second visual object 152 in the control panel 140 in response to the input.

According to an embodiment, the wearable device 101 may modify the second virtual object 132 corresponding to the second visual object 152 based on the input, while modifying the second visual object 152 based on the input. The wearable device 101 may reproduce an animation for guiding to modify the second virtual object 132 by using an avatar 1330. For example, based on the avatar 1330 associated with the second virtual object 132 associated with the input, the wearable device 101 may reproduce an animation indicating to modify the second virtual object 132. Referring to FIG. 13, within the state 1302 after the state 1301 identifying the input of drawing the handwriting 1310, the wearable device 101 may reproduce an animation in which the avatar 1330 draws the handwriting 1320 on at least a portion of the second virtual object 132. The handwriting 1320 indicated as being drawn by the avatar 1330 may correspond to the handwriting 1310 drawn on the second visual object 152 by the input. Based on the animation, the wearable device 101 may visualize a synchronized modification of the second visual object 152 and the second virtual object 132.

Although an operation of the wearable device 101 that controls the avatar 1330 based on the execution of the note application is described based on the states 1301 and 1302 of FIG. 13, an operation of the wearable device 101 of controlling the avatar 1330 based on the input on the control panel 140 is not limited thereto. For example, animations reproduced by the wearable device 101 through the avatar 1330 according to the application providing the virtual object may be summarized as shown in Table 1.

TABLE 1

| Application | Function executed based on control panel | Animation reproduce through avatar 1330 |
| --- | --- | --- |
| Calendar application | function to add schedule | animation of handwriting on notebook |
| Drawing application | function to draw image | animation of wiping virtual object with brush, or animation associated with canvas |

TABLE 1-continued

| Application | Function executed based on control panel | Animation reproduce through avatar 1330 |
| --- | --- | --- |
| Music application | function to reproduce music | animation of wearing headphones or animation of depicting action of listening to music |
| Video application | function to reproduce video | animation of sitting on chair or animation depicting action of watching a video |

Referring to Table 1, within a control panel such as the control panel 140, in response to an input indicating to select a visual object matched to a calendar application, the wearable device 101 may display a screen provided by the calendar application within the control panel, such as the screen 1220 of FIG. 12. When a function of adding a schedule is executed within the screen, the wearable device 101 may reproduce an animation writing on a note by controlling the avatar 1330 in the displaying area. For example, based on the input indication to select a visual object matched to the drawing application within the control panel 140, the wearable device 101 may display a screen provided by the drawing application in the control panel 140. When the function of drawing an image is executed based on the screen, the wearable device 101 may reproduce an animation of wiping the virtual object corresponding to the drawing application with a brush, by controlling the avatar 1330. For example, based on the input associated with a visual object matched to the music application within the control panel 140, the wearable device 101 may reproduce an animation of depicting an action of listening music by using the avatar 1330. For example, the wearable device 101 may reproduce the animation of depicting an action of watching video by controlling the avatar 1330, in response to an input with respect to a visual object associated with the video application within the control panel 140.

In an embodiment, an animation reproduced by the wearable device 101 using the avatar 1330 is not limited to the example in Table 1. The wearable devices 101 may provide a function to selectively reproduce at least one of a preset animations, through the application executed based on the input in the control panel, such as the control panel 140. The function may be executed based on a call from a preset application programming interface (API). The preset animations may include an animation of the avatar 1330 depicting human action, such as clapping, jumping, and/or yoga. The preset animations may include an animation of the avatar 1330 depicting facial expression (e.g., facial expression that opens eyes wide). The function provided by the wearable device 101 may include a function of specifying a condition for reproducing an animation, such as a function of reproducing an animation such as yoga, when no input is received during the preset period.

As described above, according to an embodiment, the wearable device 101 may execute a function provided by an application matched with the virtual object, as well as parallel movement and rotational movement with respect to the virtual object in the virtual space, by using the control panel. The wearable device 101 may use the avatar 1330 to visualize that the function executed based on the control panel causes a modification of the virtual object.

Hereinafter, referring to FIG. 14, an example of an operation of the wearable device 101 for controlling a virtual object based on the above-described control panel with reference to FIGS. 10A to 10D, 11A to 11C, and/or 12 will be described.

Figure 14:
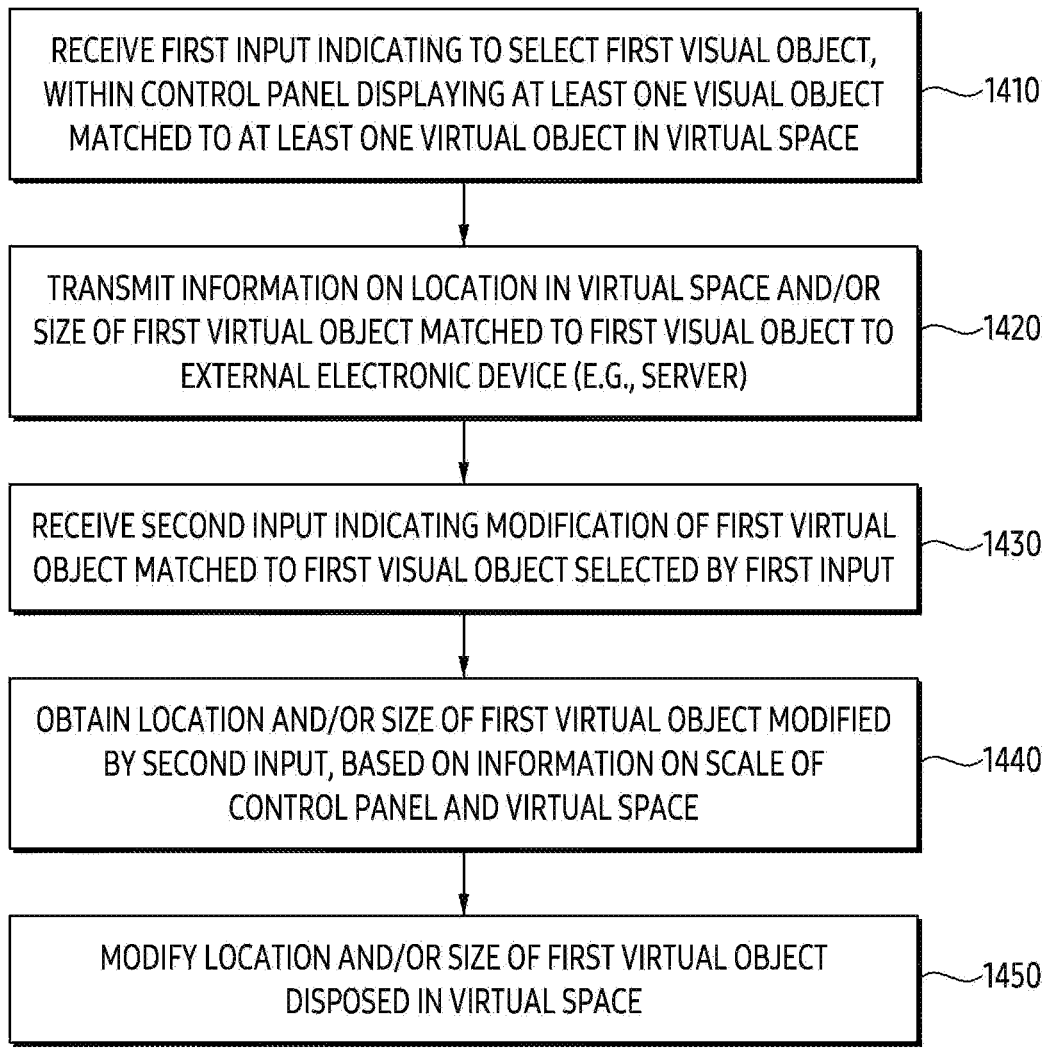
FIG. 14 illustrates an example of a flowchart for a wearable device, according to an embodiment.

FIG. 14 illustrates an example of a flowchart for a wearable device, according to an embodiment. The wearable device of FIG. 14 may be an example of the wearable device of FIGS. 1A, 1B, 2, 3A, 3B, 4A, 4B, and 5. For example, operations of FIG. 14 may be performed by the wearable device 101 and/or the processor 210 of FIG. 2. An operation of the wearable device to be described later with reference to FIG. 14 may be associated with at least one of the operations of FIG. 5 (e.g., operations 520 and 530).

Referring to FIG. 14, in operation 1410, according to an embodiment, the wearable device may receive a first input indicating to select the first visual object, within the control panel displaying at least one visual object matched to at least one virtual object in the virtual space. The control panel of the operation 1410 may include the control panel 140 of FIGS. 10A to 10D, 11A to 11C, and 12 to 13. For example, the control panel of operation 1410 may be an example of a control panel for controlling at least one virtual object in a virtual space (e.g., the space 160 of FIGS. 1A and 1B). The first input of operation 1410 may be identified based on a motion of a hand and/a direction of a gaze tracked by the wearable device. Based on receiving the first input, the wearable device may display a visual object including one or more handles for guiding a modification of the first virtual object matched to the first visual object in association with the first visual object within the control panel, such as the visual object 1030 in FIG. 10A.

Referring to FIG. 14, in operation 1420, according to an embodiment, the wearable device may transmit information on a location in a virtual space and/or size of the first virtual object matched to the first visual object to an external electronic device (e.g., the server 270 of FIG. 2). The wearable device may perform operation 1420 based on a first input of operation 1410. According to an embodiment, the wearable device may bypass operation 1420. The external electronic device may provide a metaverse service to provide the virtual space accessible by different electronic devices including the wearable devices. In terms of a service provider providing a metaverse service, the external electronic device may be referred to as a server. A description associated with the metaverse service will be described with reference to FIG. 20.

Referring to FIG. 14, in operation 1430, according to an embodiment, the wearable device may receive a second input indicating a modification of the first virtual object matched to the first visual object selected by the first input. The second input may be received through a visual object displayed by superimposing on the first visual object and for guiding the modification of the first virtual object, such as the visual object 1030 of FIG. 10A.

Referring to FIG. 14, in operation 1440, according to an embodiment, the wearable device may obtain the location and/or size of the first virtual object modified by the second input, based on information on a scale of the control panel and the virtual space. In an embodiment of transmitting information to an external electronic device based on operation 1420, the wearable device may obtain the location and/or size of the first virtual object modified by the second input, by communicating with the external electronic device. In an embodiment where operation 1420 is bypassed, the wearable device may perform parallel movement and/or rotation movement in the virtual space of the first virtual object based on the second input, by using a processor (e.g., the processor 210 of FIG. 2) of the wearable device. The location and/or size of the first virtual object obtained based on operation 1440 may be matched with the location and/or size of the first virtual object modified by the parallel movement and/or the rotational movement.

Referring to FIG. 14, in operation 1450, according to an embodiment, the wearable device may modify the location and/or size of the first virtual object disposed in the virtual space. Based on the modification of the location and/or size of the first virtual object, the wearable device may modify the location and/or size of the first visual object matched to the first virtual object in the control panel. Based on operation 1450, the wearable device may at least partially display the first virtual object having a modified location and/or a modified size within the displaying area. Based on the operations of FIG. 14 including operation 1450, the wearable device may remotely modify the first virtual object based on the first visual object in the control panel having a planar shape.

According to an embodiment, the wearable device may exchange information for displaying the control panel with respect to a virtual object in the virtual space with an external electronic device, or exchange the virtual object based on the control panel. Hereinafter, referring to FIGS. 15A and 15B, according to an embodiment, an example of an operation in which the wearable device transmit and/or receive information associated with the control panel by communicating with an external electronic device is described.

Figure 15A:
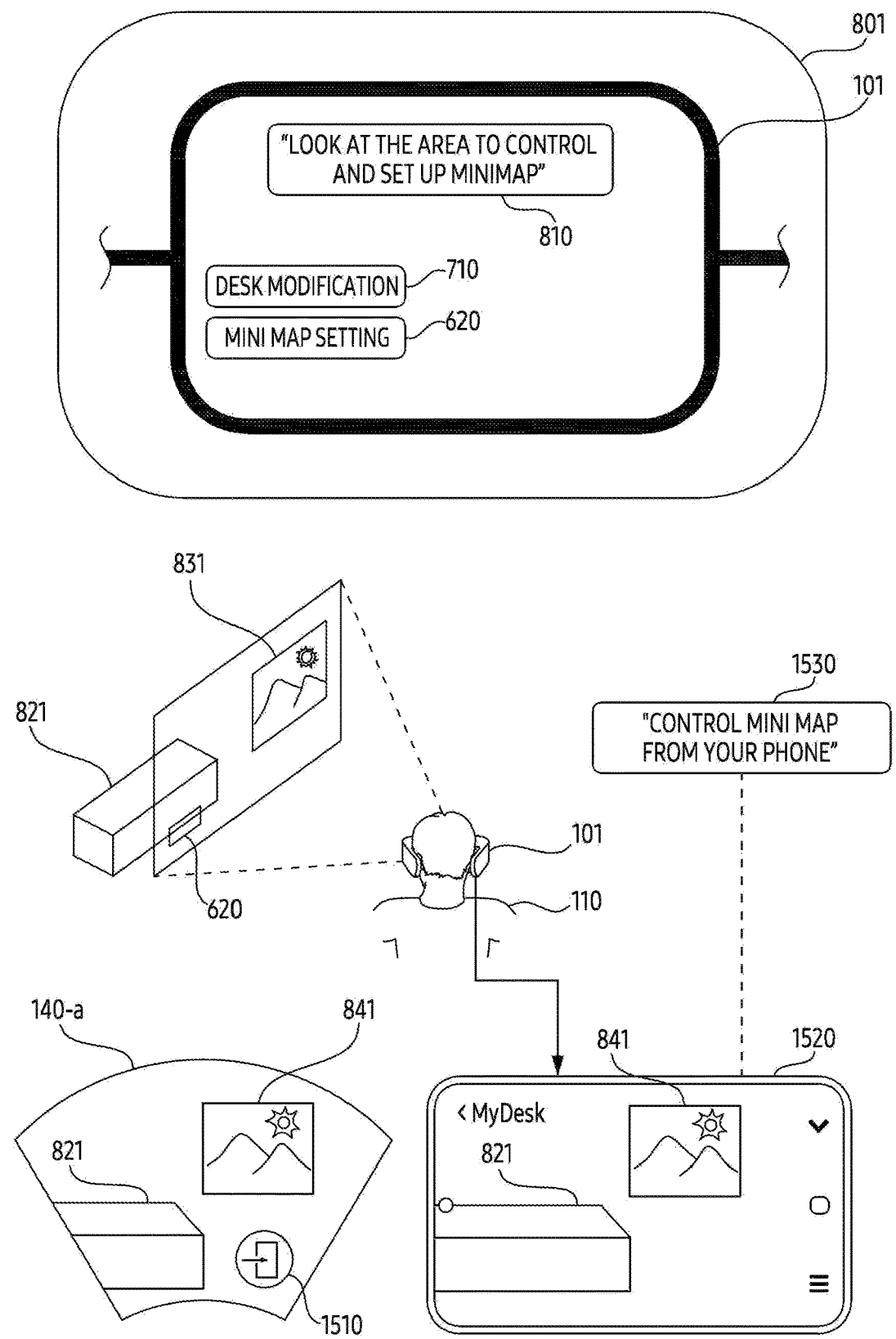
FIGS. 15A and 15B illustrate an example of an operation in which a wearable device and an external electronic device exchange information on a control panel for controlling a virtual object in a space, according to an embodiment.
Figure 15B:
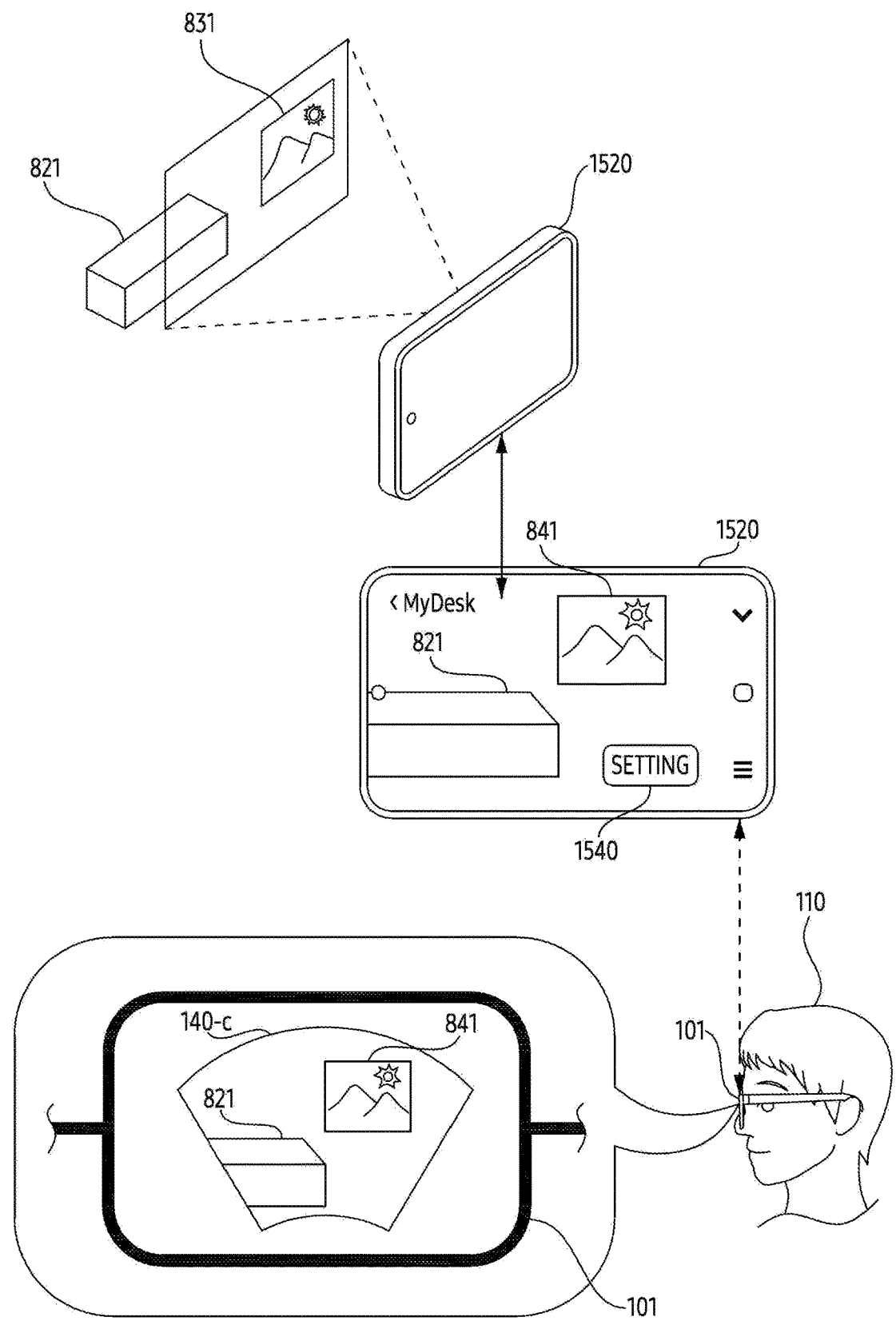

FIGS. 15A and 15B illustrate an example of an operation in which a wearable device 101 and an external electronic device 1520 exchange information on a control panel for controlling a virtual object in a space, according to an embodiment. The wearable device 101 of FIGS. 15A and 15B may be an example of the wearable device 101 of FIGS. 1A, 1B, 2, 3A, 3B, 4A, 4B, and 5. For example, an operation of the wearable device 101 described later with reference to FIGS. 15A and 15B may be performed by the wearable device 101 of FIG. 2.

Referring to FIG. 15A, in the state 801 in which a wearable device 101 is disposed toward a direction Da, a case of generating a control panel 140-a for remotely controlling the first virtual object 831 shown through the displaying area is illustrated. The state 801 of FIG. 15A may correspond to the state 801 of FIG. 8. The wearable device 101 may display the first visual object 841 representing the first virtual object 831 in 2-dimensions within the control panel 140-a, by superimposing on the image including the first real object 821. The wearable device 101 may display at least a portion of the control panel 140-a based on a direction of the wearable device 101 and/or the user 110 wearing the wearable device 101.

Referring to FIG. 15A, according to an embodiment, the wearable device 101 may identify the external electronic device 1520, by using a communication circuit (e.g., the communication circuit 235 of FIG. 2). Identifying the external electronic device 1520 by the wearable device 101 may include establishing a communication link between the external electronic device 1520 and the wearable device 101, based on a wireless communication protocol such as Bluetooth, Wi-Fi direct, and/or near field communication (NFC). Based on identifying the external electronic device 1520, the wearable device 101 may display the visual object 1510 for transmitting information on the control panel 140-a on the control panel 140-a. An example in which the wearable device 101 displays the visual object 1510 by superimposing on the control panel 140-a is described, but an embodiment is not limited thereto. For example, the wearable device 101 may display the visual object 1510 in a preset portion (e.g., a portion spaced apart from the center of the FoV of the user 110) within the displaying area.

Referring to FIG. 15A, according to an embodiment, the external electronic device 1520 identifying the wearable device 101 may also display the visual object 1530 associated with the control panel 140-*a* added to the virtual space by the wearable device 101. Although an example of the external electronic device 1520 having a form factor of a mobile phone is illustrated, an embodiment is not limited thereto. The external electronic device 1520 may display the visual object 1530 having a form of a notification panel, based on the execution of a preset system application such as a notification center in the display. Within the visual object 1530, the external electronic device 1520 may display text (e.g., "control mini-map from your phone") to guide a control of the virtual space based on the control panel 140-*a*. In response to the input indicating to select the visual object 1530, the external electronic device 1520 may transmit a signal requesting control of at least one virtual object in the virtual space to the wearable device 101 based on the control panel 140-*a*.

Referring to FIG. 15A, within a state of receiving the signal from the external electronic device 1520 or receiving an input indicating to select the visual object 1510, the wearable device 101 may transmit information associated with the control panel 140-*a* to the external electronic device 1520. The information may include one or more layers (e.g., the plurality of layers 1021, 1022, 1023, and 1024 of FIG. 10A) superimposed on the control panel 140-*a* to visualize the control panel 140-*a*. The information may include an attribute of the first virtual object 831 in the virtual space controlled by the control panel 140-*a*. The attribute may include an identifier (e.g., key and/or ID) uniquely assigned to the first virtual object 831, and location, shape, and size of the first virtual object 831 in the virtual space, and/or whether the movement of the first virtual object 831 is restricted.

Referring to FIG. 15A, based on receiving the information from the wearable device 101, the external electronic device 1520 may display a screen matched to the control panel 140-*a* in a display. Similar to the control panel 140-*a*, the screen displayed by the external electronic device 1520 may include an image including the real object 821 and at least one visual object (e.g., the first visual object 841 representing the first virtual object 831 in 2-dimensions) superimposed on the image. While a screen matched to the control panel 140-*a* is displayed, the external electronic device 1520 may remotely control at least one virtual object (e.g., the first virtual object 831) in the virtual space, based on a touch input to the screen.

Referring to FIG. 15A, the wearable device 101 may transmit information on the control panel 140-*a*, which is an example of the control panel, to the external electronic device 1520. The embodiment is not limited thereto, and according to an embodiment, the wearable device 101 may generate the control panel 140-*a* based on the information obtained by the external electronic device 1520.

Referring to FIG. 15B, the external electronic device 1520 may obtain an image including the first real object 821, by using a camera of the external electronic device 1520 exposed in a direction. The external electronic device 1520 may obtain the image based on the execution of an application for displaying a control panel. The external electronic device 1520 may obtain a control panel including the first visual object 841 representing the first virtual object 831 corresponding to the image in the virtual space. The external electronic device 1520 may display a screen including the control panel obtained based on the execution of the application in a display. The external electronic device 1520 may display the visual object 1540 having a form of a button for storing the control panel in the screen. Based on the input indicating to select the visual object 1540, the external electronic device 1520 may transmit information associated with the control panel to the wearable device 101 and/or a server (e.g., the server 270 of FIG. 2). Based on the control panel displayed through the display, the external electronic device 1520 may identify and/or respond to an input for controlling a virtual object (e.g., the first virtual object 831) in the virtual space. Controlling the virtual object by the external electronic device 1520 based on the input may be performed similarly to the above-described operation of the wearable device with reference to FIGS. 10A to 10D, 11A to 11C, and 12 to 14.

Referring to FIG. 15B, according to an embodiment, the wearable device 101 may display a control panel 140-*c* matched to a control panel generated by the external electronic device 1520. The control panel 140-*c* may be displayed in the displaying area of the wearable device 101, based on a direction of the user 110 wearing the wearable device 101 and/or the wearable device 101. Within the control panel 140-*c*, the wearable device 101 may display an image that is captured by the external electronic device 1520 and including the first real object 821. In the control panel 140-*c*, the wearable device 101 may display the first visual object 841 representing the first virtual object 831 matched to the control panel.

As described above, according to an embodiment, the wearable device 101 may transmit information on a control panel added to the virtual space by wearable devices 101, or receive information on the control panels added to the virtual space by the external electronic devices 1520, by communicating with the external electronic device 1520.

In an embodiment, the wearable device 101 and/or the external electronic device 1520 may display a control panel for controlling a virtual object in another space different than the external space including the wearable device 101. Hereinafter, referring to FIG. 16, according to an embodiment, an example of an operation in which the wearable device 101 and/or the external electronic device 1520 controls the virtual object based on control panels generated in different places is described.

Figure 16:
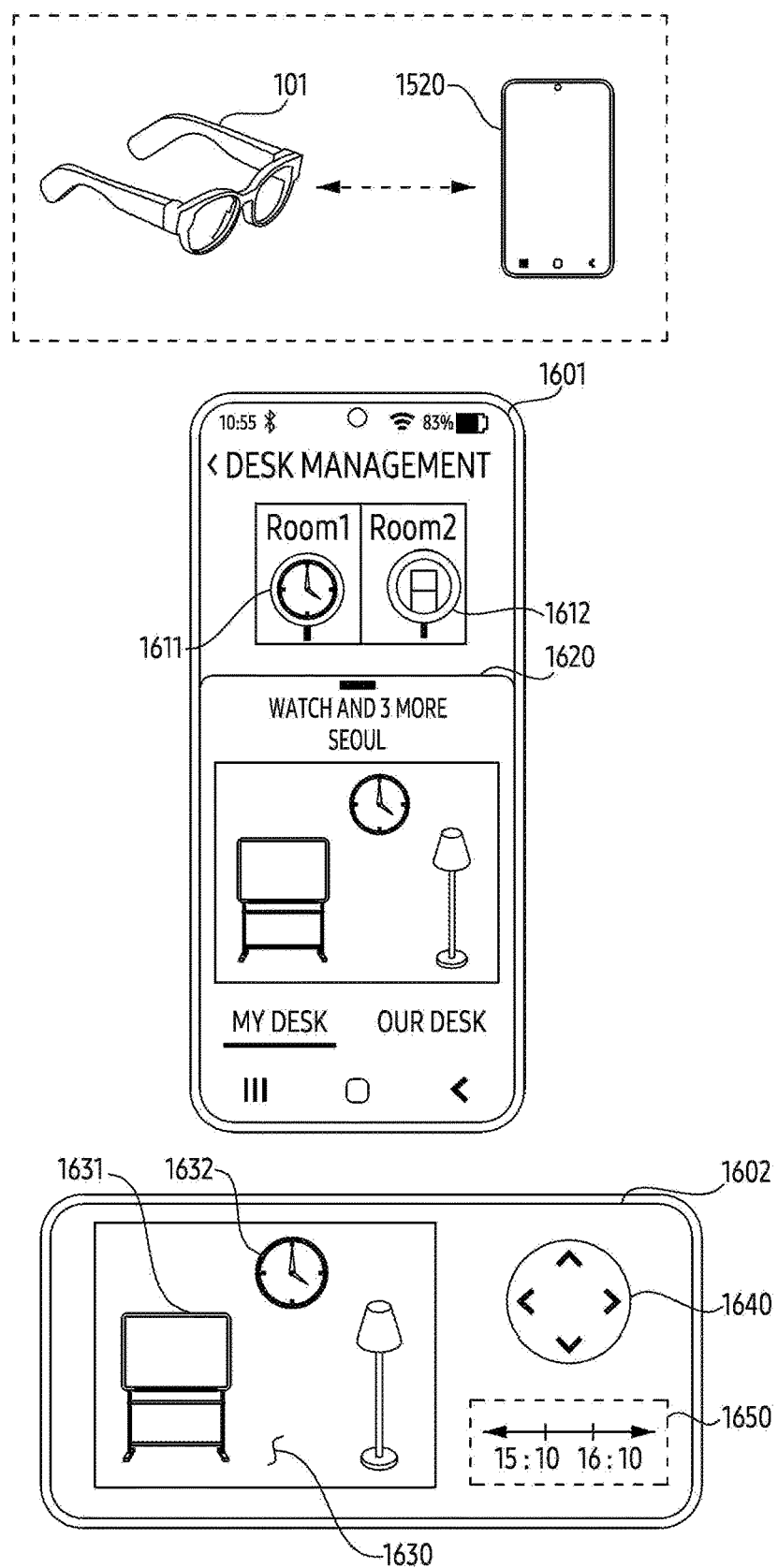
FIG. 16 illustrates an example of an operation in which a wearable device controls a virtual object in a second space different from the first space corresponding to an external space including the wearable device according to an embodiment.

FIG. 16 illustrates an example of an operation in which a wearable device 101 controls a virtual object in a second space different from the first space corresponding to an external space including the wearable device 101, according to an embodiment. The wearable device 101 of FIG. 16 may be an example of the wearable device 101 of FIGS. 1A, 1B, 2, 3A, 3B, 4A, 4B, and 5. For example, an operation of the wearable device 101 described later with reference to FIG. 16 may be performed by the wearable device 101 of FIG. 2.

In an embodiment, control panels to control at least one virtual object in a virtual space (e.g., the space 160 of FIGS. 1A and 1B) may be generated, based on the wearable device 101 and/or the external electronic device 1520. The control panels may be generated to control different virtual objects included in different view angles within a specific virtual space. When divided external spaces are recognized, the wearable device 101 may generate virtual spaces mapped to each of the recognized external spaces. For example, the external spaces may be separated or geographically separated by a wall.

Referring to FIG. 16, the wearable device 101 may display a screen 1601 for managing a plurality of control panels. The screen 1601 may be displayed in the FoV of a user (e.g., the user 110 of FIGS. 1A and 1B) wearing the wearable device 101, through a displaying area (e.g., the displaying area formed by the display 220 of FIG. 2) of the wearable device 101. The embodiment is not limited thereto, and the external electronic device 1520 distinguished from the wearable device 101 may display the screen 1601 on a display. Hereinafter, in order to reduce repetition, an operation of the wearable device 101 based on the screen 1601 is selectively described, but the external electronic device 1520 on which the screen 1601 is displayed may also perform an operation similar to the operation of the wearable device 101 based on the screen 1601.

Referring to FIG. 16, according to an embodiment, the wearable device 101 may display a map including at least one different virtual space identified by the wearable device 101 within the screen 1601 of FIG. 16. Since a virtual space is mapped to an external space, at least one external space recognized by the wearable device 101 may be arranged within a map displayed in the screen 1601. Referring to FIG. 16, according to an embodiment, a case in which the wearable device 101 displays the screen 1601 including a map in which two external spaces are arranged is illustrated. Within the map of the screen 1601, the wearable device 101 may display visual objects 1611 and 1612 corresponding to control panels included in virtual spaces mapped to each of external spaces. Within the map of the screen 1601, the visual objects 1611 and 1612 may be displayed based on locations within virtual spaces of control panels. The wearable device 101 may display an image and/or icon representing a last controlled virtual object within the visual objects 1611 and 1612, through control panels corresponding to each of the visual objects 1611 and 1612. For example, by using the visual object 1611 including an icon representing a watch application, the wearable device 101 may visualize that the last controlled virtual object through the control panel corresponding to the visual object 1611 is a virtual object provided by the watch application.

Referring to FIG. 16, based on an input indicating to select any one of the visual objects 1611 and 1612, the wearable device 101 may display a pop-up window 1620 including information on a visual object selected by the input within the screen 1601. Although an operation of the wearable device 101 displaying the pop-up window 1620 by superimposing on the screen 1601 is illustrated, the embodiment is not limited thereto. Based on the input indicating to select the visual object 1611, the wearable device 101 may display information on the control panel corresponding to the visual object 1611 within the pop-up window 1620. The information displayed through the pop-up window 1620 may include information (e.g., the number and/or type of the virtual object) on at least one virtual object controlled by the control panel. The information displayed through the pop-up window 1620 may include information (e.g., an address representing a geographical location of the external space) on an external space mapped to a virtual space including the at least one virtual object. Within the pop-up window 1620, the wearable device 101 may display an image representing a virtual object controlled by the control panel.

According to an embodiment, the wearable device 101 may receive an input for displaying a control panel corresponding to any one of the visual objects 1611 and 1612, within the screen 1601 and/or the pop-up window 1620. Referring to FIG. 16, a case in which the wearable device 101 displays the screen 1602 including the control panel in response to an input for displaying a control panel corresponding to the visual object 1611 is illustrated. The wearable device 101 may display the images 1630 included in the control panel corresponding to the visual object 1611 and visual objects 1631 and 1632 superimposed on the image 1630, within the screen 1602. The visual objects 1631 and 1632 may include images representing the appearance of each virtual object set to be controlled by the control panel in two-dimensions. According to an embodiment, when the wearable device 101 displays a control panel for controlling a virtual object included in the display area, such as the control panel 140 of FIGS. 1A and 1B, the wearable device 101 may display the screen 1602 in the control panel.

Referring to FIG. 16, the wearable device 101 may identify an input for controlling at least one of the virtual objects matched to the visual objects 1611 and 1612, based on the screen 1602. The wearable device 101 may identify the input with respect to a virtual space mapped to another external space distinguished from an external space including the wearable device 101, within the screen 1602. The wearable device 101 may control a virtual object in the virtual space mapped to the other external space based on the input. Controlling the virtual object by the wearable device 101 may include adding, removing, parallel moving, and/or rotating of the virtual object described above with reference to FIGS. 10A to 10D, 11A, and 11B. In order to receive an input indicating the parallel movement and/or rotation movement of the virtual object, the wearable device 101 may display the visual object 1640 in which buttons indicating different directions are arranged in the screen 1602. Controlling the virtual object by the wearable device 101 may include an operation of executing at least one function supported by an application corresponding to the virtual object described above with reference to FIGS. 11A to 11C and 12.

Referring to FIG. 16, according to an embodiment, the wearable device 101 may perform a function of modifying (e.g., restoring) a virtual space matched to the control panel displayed in the screen 1602, based on a state of the past timing before the current timing. In order to execute the function, the wearable device 101 may display a visual object 1650 having a form of a timeline within the screen 1602. Based on the visual object 1650, the wearable device 101 may identify an input indicating to select a specific timing. Based on the input, the wearable device 101 may modify a state of the virtual space to a state within the specific timing. Information on the state of the virtual space within different timings may be stored in the wearable device 101, the external electronic device 1520, and/or a server (e.g., the server 270 of FIG. 2).

For example, based on a state within the specific timing, the wearable device 101 may modify a location and/or size of at least one virtual object in the virtual space. The wearable device 101 may add and/or remove at least one virtual object within the virtual space, based on the state within the specific timing. After modifying the state of the virtual space based on the state within the specific timing, the wearable device 101 may display text (e.g., "Restoration is successful.") indicating a result of modifying the state of the virtual space. For example, when the wearable device 101 cannot restore the virtual object included in the virtual space within the specific timing, the wearable device 101 may display a notification and/or text indicating that restoration of the virtual object is impossible. Based on the modified state of the virtual space, the wearable device 101 may modify at least one visual object (e.g., visual objects 1631 and 1632) included in the control panel in the screen 1602.

As described above, according to an embodiment, the wearable device 101 and/or the external electronic device

1520 may manage at least one virtual space based on one or more control panels. The wearable device 101 may provide a UI (e.g., the screen 1602 including the visual object 1650) for switching the state of the virtual space based on a time domain, together with a control panel for controlling at least one virtual object in the virtual space. As the state of the virtual space is switched based on the time domain, the wearable device 101 may modify a state (e.g., location, shape, and/or size) of at least one virtual object included in the virtual space to another state within the past timing than the current timing.

In an embodiment, the wearable device 101 may transmit information on at least one virtual object included in the virtual space of the wearable device 101 to another electronic device different from the wearable device 101, based on the control panel. Hereinafter, referring to FIGS. 17A to 17D, according to an embodiment, an example of an operation performed by the wearable device 101 for transmitting the information will be described.

FIGS. 17A, 17B, 17C, and 17D illustrate an example of an operation in which a wearable device 101 displays a plane for exchanging information including an external electronic device and a virtual object, according to an embodiment. The wearable device 101 of FIGS. 17A to 17D may be an example of the wearable device 101 of FIGS. 1A, 1B, 2, 3A, 3B, 4A, 4B, and 5. For example, an operation of the wearable device 101 described later with reference to FIGS. 17A to 17D may be performed by the wearable device 101 of FIG. 2.

According to an embodiment, the wearable device 101 may generate an area in the control panel to exchange information on the virtual object with the external electronic device, based on a distance between the wearable device 101 and the external electronic device and/or direction. According to an embodiment, the wearable device 101 may generate the area based on an input indicating to add the area within a control panel. Referring to FIGS. 17A to 17D, according to an embodiment, states 1701, 1702, 1703, and 1704 in which the wearable device 101 exchanges information on at least one virtual object based on the control panel are illustrated.

Figure 17A:
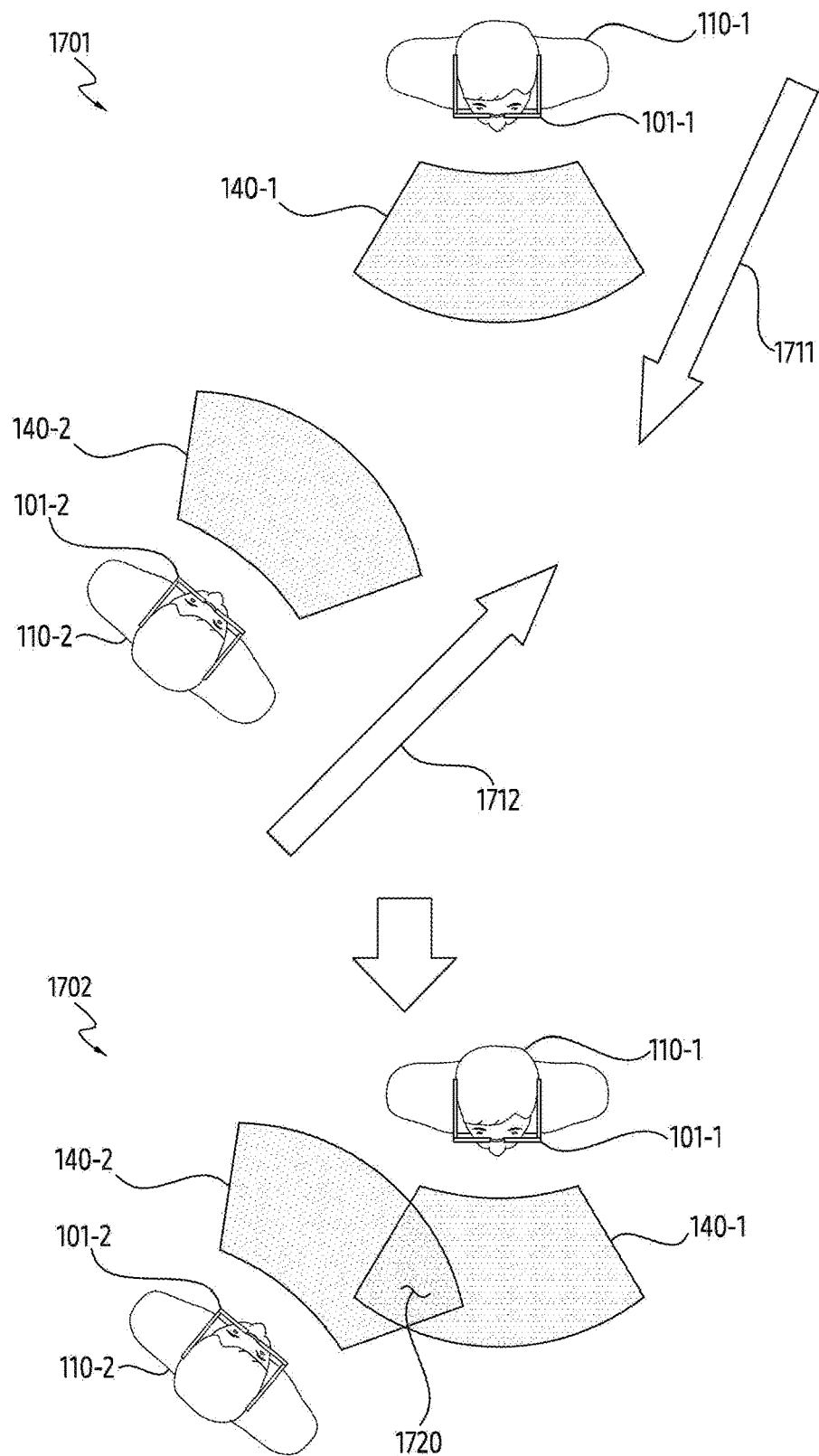
FIGS. 17A, 17B, 17C, and 17D illustrate an example of an operation in which a wearable device displays a plane for exchanging information including an external electronic device and a virtual object, according to an embodiment.

Referring to FIG. 17A, the state 1701 in which the first wearable device 101-1 and the second wearable device 101-2 are moved is illustrated. The first wearable device 101-1 may provide the first user 110-1 with a first control panel 140-1 for controlling at least one virtual object in a virtual space mapped to an external space. The second wearable device 101-2 may provide the second user 110-2 with a second control panel 140-2 for controlling at least one virtual object displayed to the second user 110-2 through a displaying area of the second wearable device 101-2.

Hereinafter, it is assumed that the first user 110-1 wearing the first wearable device 101-1 moves toward the second user 110-2 along with a path 1711, in the state 1701. It is assumed that the second user 110-2 wearing the second wearable device 101-2 moves toward the first user 110-1 along with a path 1712, in the state 1701. Within the assumption, the first wearable device 101-1 may modify a location of the first control panel 140-1 in the virtual space, based on the movement of the first wearable device 101-1. For example, based on a location in the virtual space mapped to a location of the first user 110-1 wearing the first wearable device 101-1, the first wearable device 101-1 may modify a location of the first control panel 140-1. In order to maintain that the first control panel 140-1 is displayed in the FoV of the first user 110-1 looking forward, the first wearable device 101-1 may modify the location of the first control panel 140-1. Similarly, the second wearable device 101-2 may modify a location of the second control panel 140-2 within the virtual space based on the movement of the second wearable device 101-2. In an embodiment, the wearable device 101 (e.g., the first wearable device 101-1 and/or the second wearable device 101-2) according to an embodiment may identify a location and/or direction of an electronic device external to the wearable device 101, based on an external electronic device (e.g., the server 270 of FIG. 2 and/or a wireless signal (e.g., the wireless signal within ultra-wideband (UWB)).

For example, the wearable device 101 (e.g., the first wearable device 101-1 and/or the second wearable device 101-2) may transmit the location of the wearable device 101 to the server (e.g., the server 270 of FIG. 2). For example, the wearable device 101 may repeatedly and/or periodically transmit a GPS coordinate of the wearable device 101 identified by the sensor (e.g., the sensor 230 of FIG. 2) to the server. Within the state 1701 of FIG. 17A, based on locations transmitted from each of the first wearable device 101-1 and the second wearable device 101-2, the server may identify that the first wearable device 101-1 and the second wearable device 101-2 move toward each other. The server may inform the first wearable device 101-1 that the second wearable device 101-2 approaches the first wearable device 101-1 along with the path 1712. Similarly, the server may inform the second wearable device 101-2 that the first wearable device 101-1 approaches the second wearable device 101-2 along with the path 1711. As described above, based on communication with the server, the wearable device 101 may identify another wearable device adjacent to the wearable device 101.

For example, the wearable device 101 (e.g., the first wearable device 101-1 and/or the second wearable device 101-2) may identify an external electronic device adjacent to the wearable devices 101 based on a wireless signal. Within the state 1701 of FIG. 17A, the first wearable device 101-1 may output a wireless signal in the UWB to the external space. As the wireless signal is reflected by the second wearable device 101-2, at least a portion of the wireless signal outputted by the first wearable device 101-1 may be propagated toward the first wearable device 101-1. Based on a phase and/or amplitude of the wireless signal reflected by the second wearable device 101-2, the first wearable device 101-1 may identify a distance between the first wearable device 101-1 and the second wearable device 101-2 and/or a direction of the second wearable device 101-2 with respect to the first wearable device 101-1. Similarly, the second wearable device 101-2 may identify the first wearable device 101-1 adjacent to the second wearable device 101-2, based on the reflection of the wireless signal outputted from the second wearable device 101-2.

Referring to FIG. 17A, a state 1702 in which a distance between the first wearable device 101-1 and the second wearable device 101-2 is reduced to less than a preset distance is illustrated. The state 1702 may be a state after the state 1701 in which each of the first user 110-1 and the second user 110-2 moves toward each other along with paths 1711 and 1712. When each of the first wearable device 101-1 and the second wearable device 101-2 transmits a location to the server, within the state 1702, the server may identify that the first control panel 140-1 and the second control panel 140-2 collide with each other, based on a point in the virtual space mapped to a location of the first wearable device 101-1 and a point in the virtual space mapped to a location of the second wearable device 101-2. Referring to FIG. 17A, the server may identify the intersection area 1720 of the first control panel 140-1 and the second control panel 140-2. Based on identifying the intersection area 1720, the server may transmit information on the intersection area 1720 to the first wearable device 101-1 and the second wearable device 101-2. The first wearable device 101-1 and/or the second wearable device 101-2 receiving the information may visualize the intersection area 1720 within the control panel.

In an embodiment, the first wearable device 101-1 may identify that the intersection area 1720 is formed based on a distance between the first wearable device 101-1 and the second wearable device 101-2 identified based on a wireless signal. Based on identifying that intersection area 1720 is formed, the first wearable device 101-1 may establish a communication link for exchanging information on the virtual object with the second wearable device 101-2, or may display the intersection area 1720 within the first control panel 140-1 which is an example of the control panel.

Within the state 1702 of FIG. 17A, the first wearable device 101-1 and the second wearable device 101-2 may exchange information on a virtual object exclusively displayed by each of the first wearable device 101-1 and the second wearable device 101-2, based on the intersection area 1720. For example, within the state 1702, the first wearable device 101-1 may display the intersection area 1720 within the first control panel 140-1 included in the displaying area. Based on an input indicating to move the visual object matched with the virtual object to the intersection area 1720 displayed in the first control panel 140-1, the first wearable device 101-1 may transmit information on the virtual object associated with the input to the second wearable device 101-2. Based on the information, the second wearable device 101-2 may add the virtual object to the virtual space of the second wearable device 101-2, or add a visual object representing the virtual object to the intersection area 1720 of the second control panel 140-2. An operation of the wearable device 101 that transmits and/or receives the information based on the intersection area 1720 will be described later with reference to FIG. 18.

Figure 17B:
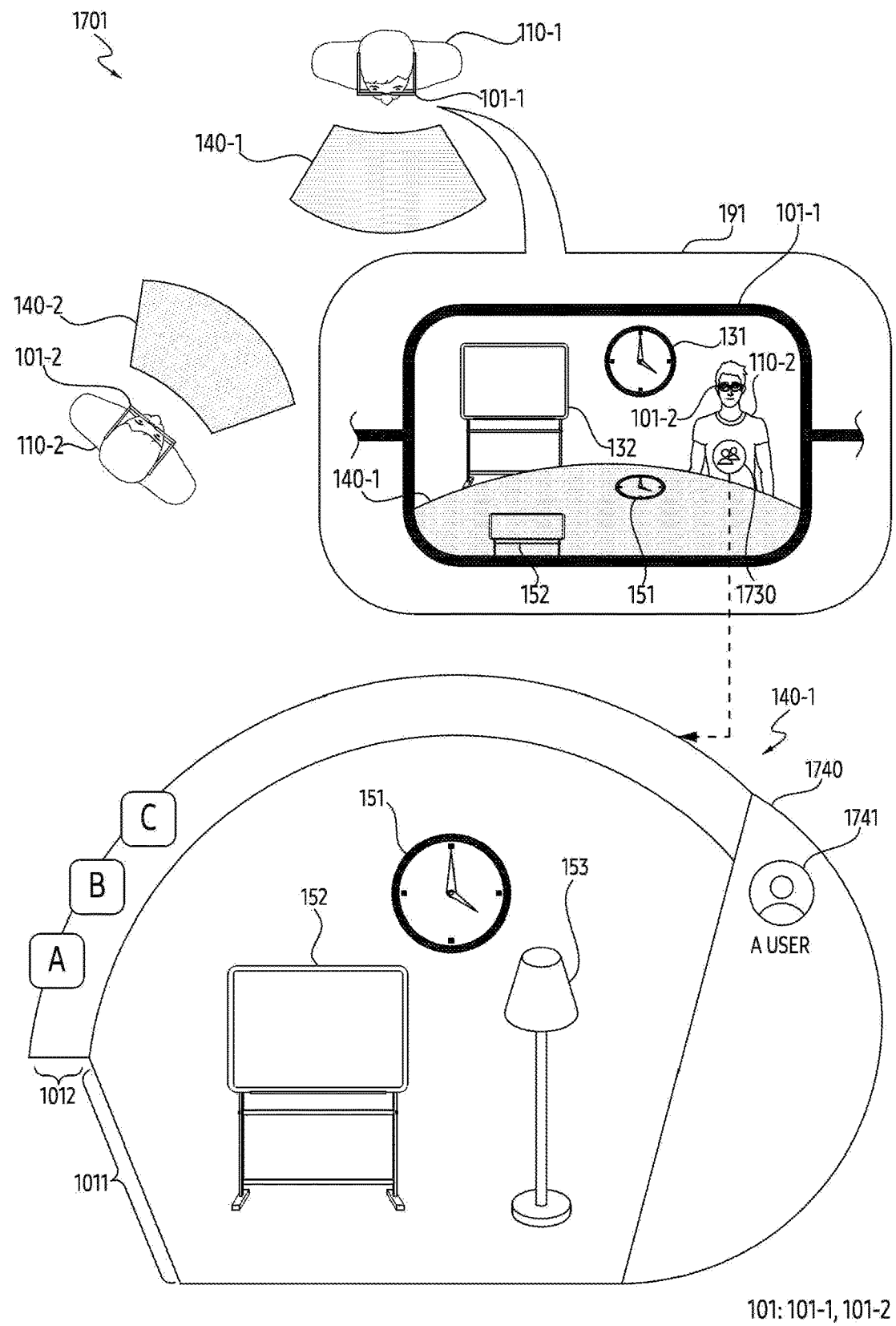

According to an embodiment, the wearable device 101 may receive an input indicating to add an area for exchanging information with an external electronic device, independently from the movement of the wearable device 101 described above with reference to FIG. 17A. Referring to FIG. 17B, in the state 1701, an example of a UI in which the first wearable device 101-1 outputs to the first user 110-1 through the displaying area is shown. Within the state 1701 of FIG. 17B, in the displaying area based on a direction of the first wearable device 101-1, the first wearable device 101-1 may display the first virtual object 131 and the second virtual object 132 included in the view angle in the virtual space set by the direction. Since the first wearable device 101-1 provides a user experience based on the MR, the first user 110-1 wearing the first wearable device 101-1 may see the second user 110-2 and the second wearable device 101-2 worn by the second user 110-2, through the displaying area of the first wearable device 101-1, together with the first virtual object 131 and the second virtual object 132. The first wearable device 101-1 may display at least a portion of the first control panel 140-1 for controlling the first virtual object 131 and the second virtual object 132 in the displaying area. The wearable device 101 may display the first visual object 151 and the second visual object 152 representing the first virtual object 131 and the second virtual object 132, within the first control panel 140-1.

Referring to FIG. 17B, within the state 1701 that identifies the second wearable device 101-2 adjacent to the first wearable device 101-1, the first wearable device 101-1 may display a visual object 1730 to add an area 1740 for sharing a virtual object with the second wearable device 101-2, in the displaying area, within the first control panel 140-1, which is an example of the control panel. Although the visual object 1730 having a form of an icon is illustrated, the embodiment is not limited thereto. For example, the first wearable device 101-1 may display information (e.g., photo and/or text such as a name) representing the second user 110-2 wearing the second wearable device 101-2 within the visual object 1730.

Referring to FIG. 17B, based on an input indicating to select the visual object 1730, the first wearable device 101-1 may form an area 1740 for exchanging information on the virtual object with the second wearable device 101-2 in the first control panel 140-1. Although an embodiment in which the first wearable device 101-1 generates the area 1740 by superimposing on the right edge of the first control panel 140-1 is illustrated, shapes of the first control panel 140-1 and/or the area 1740 are not limited thereto. Referring to FIG. 17B, the first wearable device 101-1 may display the visual object 1741 indicating the second wearable device 101-2, in the area 1740 different from the first area 1011 and the second area 1012 in the first control panel 140-1. The first wearable device 101-1 may display information on the second wearable device 101-2 and/or the second user 110-2 wearing the second wearable device 101-2 (e.g., the name and/or picture of the second user 110-2), in the visual object 1741.

According to an embodiment, based on an input indicating to select the visual object 1730, the first wearable device 101-1 may request the second wearable device 101-2 to add an area (e.g., the area 1740) for exchanging information on the virtual object within the second control panel 140-2. Based on the request, the second wearable device 101-2 may display a visual object (e.g., a pop-up window) to confirm the addition of the area for exchanging information, within the second control panel 140-2 in the displaying area. The first wearable device 101-1 may receive a signal indicating the reception of an input with respect to the visual object in the displaying area of the second wearable device 101-2, from the second wearable device 101-2. The first wearable device 101-1 may generate the area 1740 in the first control panel 140-1, based on receiving the signal.

As described above with reference to FIGS. 17A and 17B, a plurality of wearable devices may add an area (e.g., the intersection area 1720 and/or the area 1740) to exchange and/or share information on a virtual object to the control panel. The area for exchanging and/or sharing the information may be referred to as a sharing panel and/or sharing desk (or our desk). The sharing panel may be formed based on a connection between two or more wearable devices.

Figure 17C:
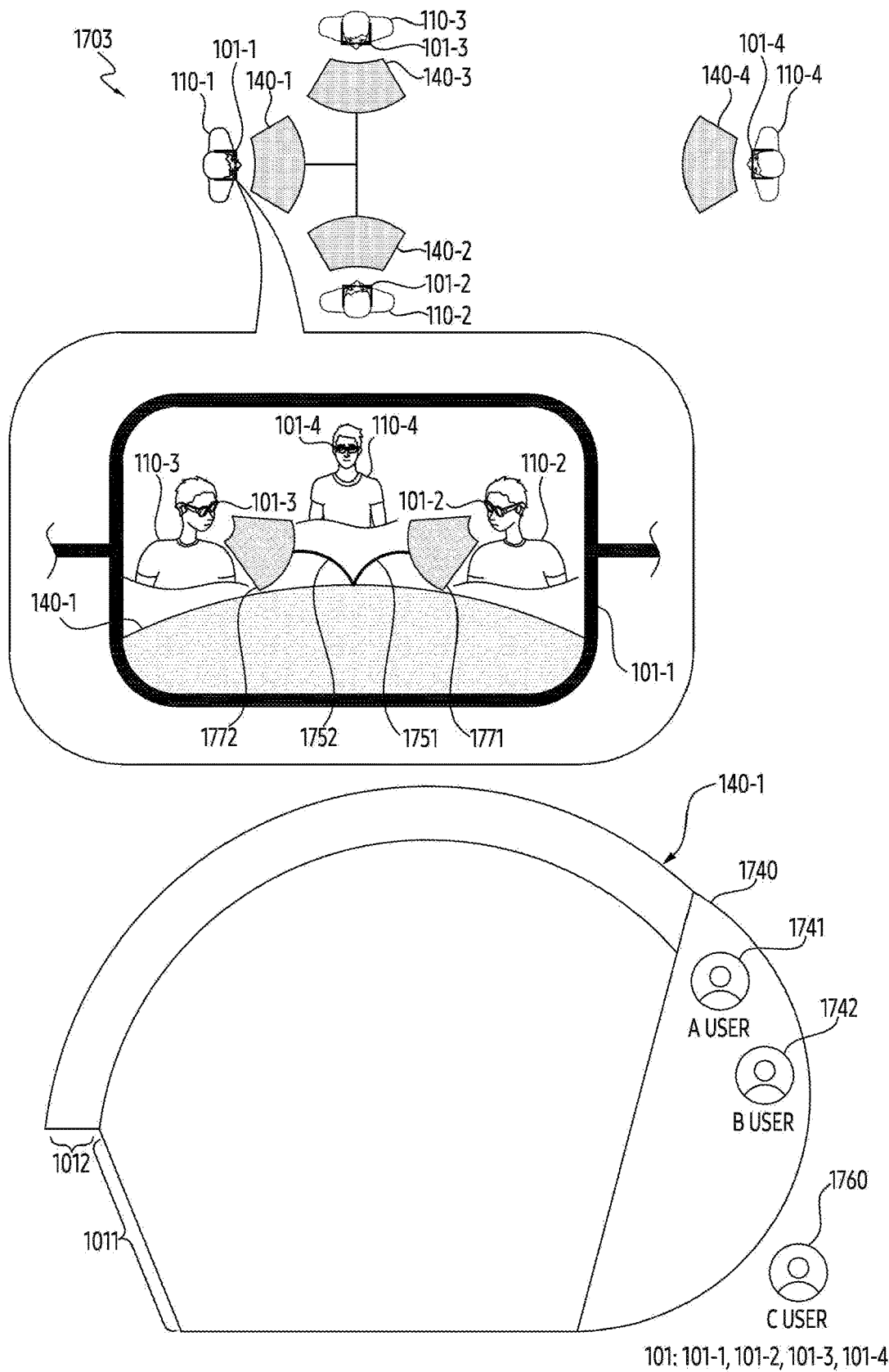

Referring to FIG. 17C, a state 1703 in which three wearable devices (e.g., the first wearable device 101-1 to the third wearable device 101-3) are connected to exchange information on a virtual object is illustrated. Based on information (e.g., information including locations of each of the first wearable device 101-1 to the third wearable device 101-3) transmitted from the server, and/or the reflection of a wireless signal (e.g., the wireless signal of UWB), the first wearable device 101-1 to the third wearable device 101-3 may add a sharing panel to the control panels of the first wearable device 101-1 to the third wearable device 101-3. Referring to FIG. 17C, an example of a UI that the first wearable device 101-1 outputs to the first user 110-1 through the display area in state 1703 is illustrated. Within the state 1703 of FIG. 17C, the first wearable device 101-1 may display the area 1740 for exchanging information between the first wearable device 101-1 and the third wearable device 101-3, within the first control panel 140-1, which is a control panel for remotely controlling a virtual object. As described above with reference to FIG. 17B, the first wearable device 101-1 may display visual objects 1741 and 1742 indicating each of the second wearable device 101-2 and the third wearable device 101-3 connected to the first wearable device 101-1 for exchanging information on the virtual object, in the area 1740.

Within the state 1703 of FIG. 17C, the first wearable device 101-1 may visualize that the second wearable device 101-2 and the third wearable device 101-3 are connected to the first wearable device 101-1 to exchange information on the virtual object, by using lines 1751 and 1752 extending from the first control panel 140-1. The lines 1751 and 1752 may have a preset color (e.g., blue) and/or preset transparency. The first wearable device 101-1 may display a visual object 1771 having a form of the second control panel 140-2 of the second wearable device 101-2 within the displaying area. Based on the line 1751 having a form connecting the first control panel 140-1 and the visual object 1771, the first wearable device 101-1 may inform the first user 110-1 that the second wearable device 101-2 and the first wearable device 101-1 are connected to exchange information on the virtual object. Similarly, the first wearable device 101-1 may display a visual object 1772 having a form of the third control panel 140-3, and connect the visual object 1772 and the first control panel 140-1 based on the line 1752.

In an embodiment, a connection between the first wearable device 101-1 to the third wearable device 101-3 may be controlled based on a gesture associated with at least one of the lines 1751 and 1752. For example, based on identifying a body part (e.g., the hand of the first user 110-1) moving across the line 1751, the first wearable device 101-1 may cease exchanging information between the second wearable device 101-2 and the first wearable device 101-1 associated with the line 1751. Based on ceasing the exchange of information, the first wearable device 101-1 may refrain from transmitting the information on the virtual object to the second wearable device 101-2. For example, based on an input indicating to divide the line 1752, the first wearable device 101-1 may release a communication link established between the first wearable device 101-1 and the third wearable device 101-3 and for exchanging information on the virtual object. Based on the input, the first wearable device 101-1 may reproduce an animation representing the division of the line 1752 in the displaying area.

Referring to FIG. 17C, the first wearable device 101-1 to the third wearable device 101-3 may exchange information on the virtual object, based on different capability information. The capability information may indicate an authority for adding and/or removing a wearable device for exchanging information on a virtual object. For example, the first wearable device 101-1 may be a host that is allowed to add and/or remove a wearable device sharing information on a virtual object through a sharing panel such as the area 1740. In the example, the second wearable device 101-2 to the third wearable device 101-3 may be a guest that is limited to add and/or remove a wearable device sharing the information. Based on the capability information, the lines 1751 and 1752 may be visualized differently within displaying areas of each of the first wearable device 101-1 to the third wearable device 101-3. For example, the first wearable device 101-1, which is a host may display all of the lines 1751 and 1752 in the displaying area. The second wearable device 101-2, which is a guest may display the line 1751 indicating a connection between the first wearable device 101-1 that is a host and the second wearable device 101-2 and refrain from displaying the line 1752, within the displaying area. The third wearable device 101-3 associated with a third user 110-3, which is a guest may display the line 1752 indicating a connection between the first wearable device 101-1 and the third wearable device 101-3 and refrain from displaying the line 1751, within the displaying area.

Referring to FIG. 17C, within the state 1703 in which the first wearable device 101-1 to the third wearable device 101-3 are connected to each other to share information on the virtual object, the fourth wearable device 101-4 may be limited from exchanging information on the virtual object with at least one of the first wearable devices 101-1 to the third wearable device 101-3. For example, the fourth control panel 140-4, which is a control panel included in the virtual space of the fourth wearable device 101-4, may not include a sharing panel. Within the state 1703, based on identifying the fourth wearable device 101-4 spaced apart below the preset distance, the first wearable device 101-1 may display a visual object 1760 associated with the fourth wearable device 101-4 on a portion of the displaying area adjacent to the first control panel 140-1. Identifying the fourth wearable device 101-4 by the first wearable device 101-1 may be performed based on a signal transmitted from the server and/or a wireless signal reflected from the fourth wearable device 101-4. The visual object 1760 may include an image and/or a name of the user 110-4 wearing the fourth wearable device 101-4 and/or the fourth wearable device 101-4.

Referring to FIG. 17C, in the state 1703 displaying the visual object 1760 adjacent to the first control panel 140-1, the first wearable device 101-1 may add the fourth wearable device 101-4 to the group of the first wearable device 101-1 to the third wearable device 101-3 for sharing information on the virtual object, based on the selection and/or movement of the visual object 1760. For example, the first wearable device 101-1 may add the fourth wearable device 101-4 to the group, based on an input indicating to move the visual object 1760 into the area 1740. As the fourth wearable device 101-4 is added to the group, the fourth wearable device 101-4 may form an area to share information on the virtual object with the first wearable device 101-1 to the third wearable device 101-3, within the fourth control panel 140-4. As the fourth wearable device 101-4 is added to the group, the first wearable device 101-1 may add a polygon representing the fourth control panel 140-4 within the displaying area. The first wearable device 101-1 may add a line connecting the polygon and the first control panel 140-1.

As described above, according to an embodiment, wearable devices (e.g., the first wearable device 101-1 to the fourth wearable device 101-4) may add a sharing panel (e.g., the intersection area 1720 and/or the area 1740) for sharing and/or exchanging information on the virtual object, within the control panel for controlling the virtual object in the virtual space. The embodiments are not limited thereto, and the sharing panel may be formed at the center of the wearable devices.

Figure 17D:
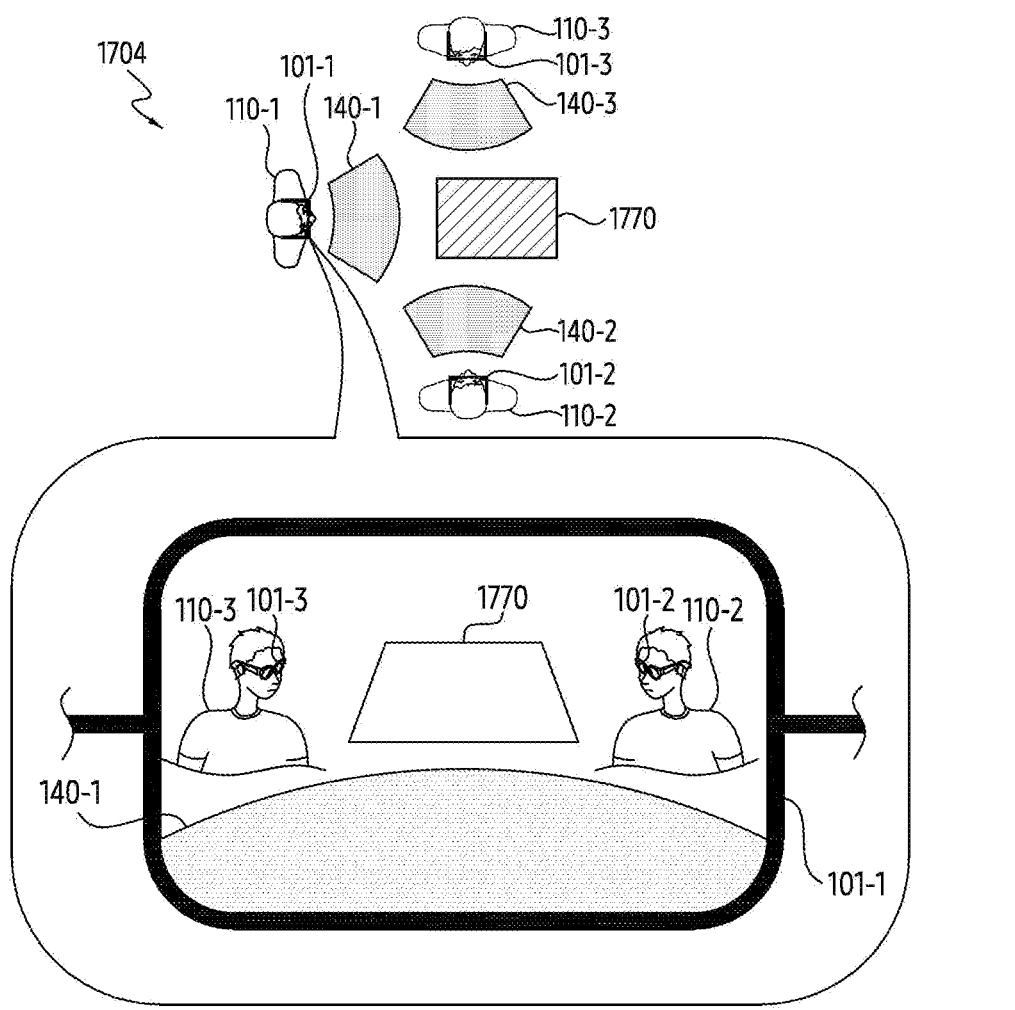

Referring to FIG. 17D, a state 1704 in which the first wearable device 101-1 to the third wearable device 101-3 adds a control panel 1770 for exchanging information on the virtual object in the virtual space is illustrated. Within the state 1704, all of the first wearable device 101-1 to the third wearable device 101-3 may add the control panel 1770, which is an example of a sharing panel, based on a point corresponding to the center of the first wearable device 101-1 to the third wearable device 101-3 within the virtual space mapped to the external space. The shape and/or size of the control panel 1770 may depend on a location relationship between the first wearable device 101-1 to the third wearable device 101-3.

Referring to FIG. 17D, within the state 1704, an example of a UI in which the first wearable device 101-1 outputs to the first user 110-1 through the displaying area is illustrated. In the state 1704 of FIG. 17D, the first wearable device 101-1 may display the control panel 1770, together with the first control panel 140-1, which is a control panel for controlling at least one virtual object in the virtual space of the first wearable device 101-1. Within the control panel 1770, the first wearable device 101-1 may display a visual object representing a virtual object to be exchanged between the first wearable device 101-1 to the third wearable device 101-3.

Hereinafter, referring to FIG. 18, an example of an operation in which information on a virtual object is exchanged based on a sharing panel commonly displayed by a plurality of wearable devices will be described.

Figure 18:
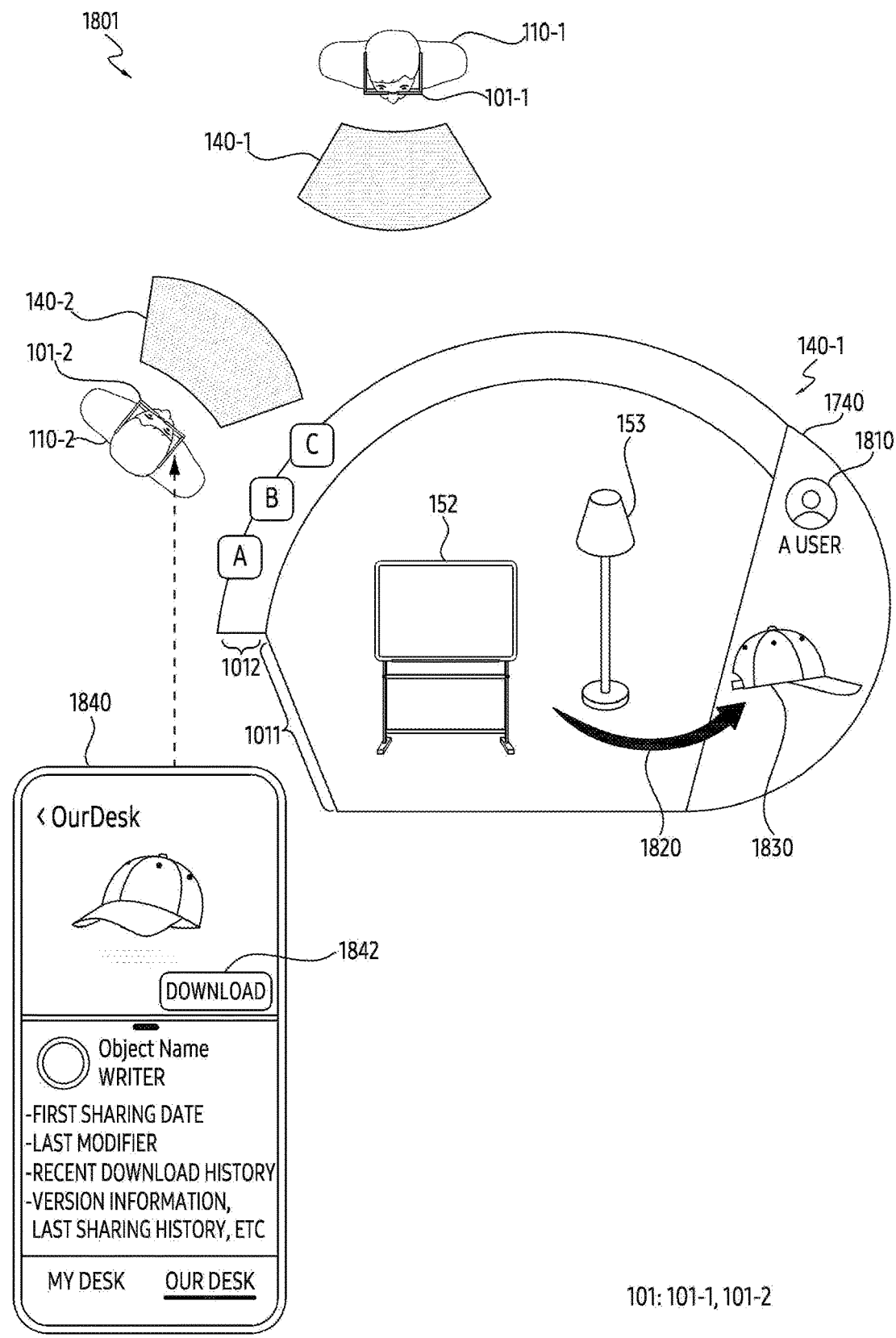
FIG. 18 illustrates an example of an operation in which a wearable device exchanges information with an external electronic device based on a control panel, according to an embodiment.

FIG. 18 illustrates an example of an operation in which a wearable device 101 exchanges information with an external electronic device based on a control panel, according to an embodiment. The wearable device 101 of FIG. 18 may be an example of the wearable device 101 of FIGS. 1A, 1B, 2, 3A, 3B, 4A, 4B, and 5. For example, an operation of the wearable device 101 described later with reference to FIG. 18 may be performed by the wearable device 101 of FIG. 2.

Referring to FIG. 18, a state 1801 in which a plurality of wearable devices (e.g., the first wearable device 101-1 to the second wearable device 101-2) are connected to each other to exchange information on a virtual object is illustrated. Within the state 1801, the first wearable device 101-1 may add the area 1740 for exchanging the information within the first control panel 140-1, which is an example of the control panel. Within the area 1740, the first wearable device 101-1 may display a visual object 1810 for guiding to form the area 1740 to exchange the information with the second wearable device 101-2. Similar to the visual objects 1741 and 1742 of FIGS. 17A to 17D, the visual object 1810 may include an image and/or text indicating the second user 110-2 of the second wearable device 101-2 and/or the second wearable device 101-2.

Referring to FIG. 18, the first wearable device 101-1 may display visual objects 152 and 1830 representing virtual objects in the virtual space of the first wearable device 101-1 within the first control panel 140-1. The virtual objects may be exclusively displayed in the displaying area of the first wearable device 101-1, based on the virtual space. Within the state 1801 of FIG. 18, according to an embodiment, the first wearable device 101-1 may identify an input indicating to move the visual object 1830 from the first area 1011 to the area 1740 along with the direction 1820. Based on the input, the first wearable device 101-1 may transmit information on a virtual object corresponding to the visual object 1830 to the second wearable device 101-2. For example, the first wearable device 101-1 may transmit the information to visualize the virtual object within the displaying area of the second wearable device 101-2 to the second wearable device 101-2. For example, the first wearable device 101-1 may transmit the information including at least one file matched to the virtual object to the second wearable device 101-2.

Referring to FIG. 18, the second wearable device 101-2 may display a screen 1840 to guide the reception of information in the displaying area, based on receiving the information on a virtual object corresponding to the visual object 1830 from the first wearable device 101-1. An embodiment in which the second wearable device 101-2 displays a screen 1840 having a form of a pop-up window is described, but the embodiment is not limited thereto. For example, based on receiving the above information, the second wearable device 101-2 may display a visual object (e.g., a visual object representing the virtual object) based on the information, on at least a portion of the second control panel 140-2.

Referring to FIG. 18, the second wearable device 101-2 may display at least a portion of the information in the screen 1840. For example, the second wearable device 101-2 may display an image and/or video with respect to a virtual object indicated by the information, within the screen 1840. The second wearable device 101-2 may display a history (e.g., a sharing date, a sharing history, and/or a download history) in which information on a virtual object is exchanged, in the screen 1840. The second wearable device 101-2 may display a version of the virtual object in the screen 1840. The second wearable device 101-2 may display a visual object 1842 for storing the information in the second wearable device 101-2 in the screen 1840. Although the visual object 1842 having a form of a button is illustrated, the embodiment is not limited thereto.

Hereinafter, referring to FIG. 19, an operation of the wearable devices (e.g., the first wearable device 101-1 to the second wearable device 101-2 of FIG. 18) connected to each other to share information on a virtual object will be described.

Figure 19:
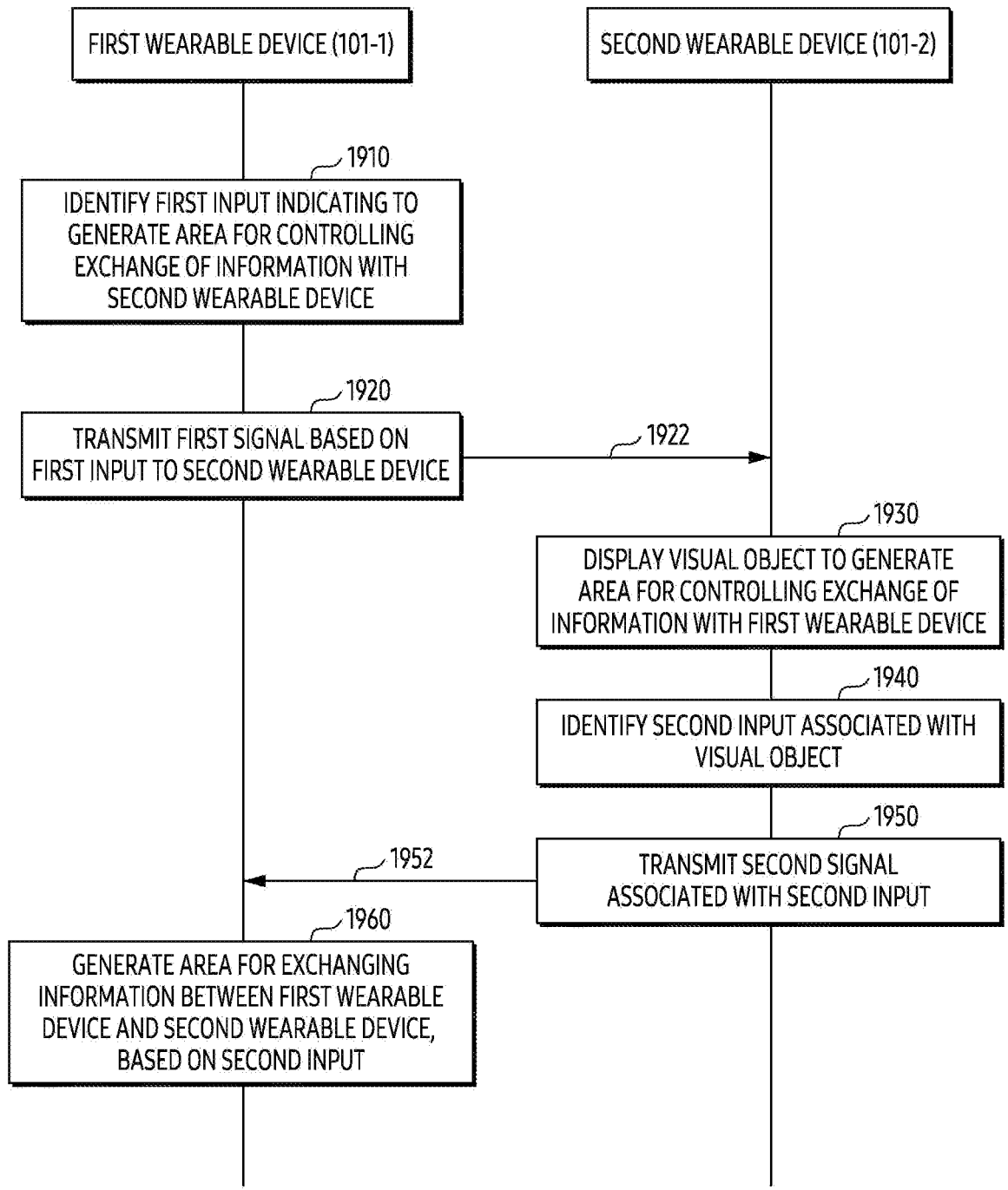
FIG. 19 illustrates an example of a signal flowchart between wearable devices, according to an embodiment.

FIG. 19 illustrates an example of a signal flowchart between wearable devices (e.g., the first wearable device 101-1 to the second wearable device 101-2), according to an embodiment. The first wearable device 101-1 to the second wearable device 101-2 of FIG. 19 may be an example of the wearable device 101 of FIGS. 1A, 1B, 2, 3A, 3B, 4A, 4B, and 5. For example, at least one of operations of FIG. 19 may be performed by the wearable device 101 and/or the processor 210 of FIG. 2.

Referring to FIG. 19, in operation 1910, according to an embodiment, the first wearable device 101-1 may identify a first input indicating to generate an area for controlling the exchange of information with the second wearable device 101-2. The information may be information on at least one virtual object included in a virtual space (e.g., the space 160 of FIGS. 1A and 1B) of the first wearable device 101-1. The information may be information stored in the first wearable device 101-1. The area may include an area formed by the intersection area 1720, the area 1740, and/or the control panel 1770 of FIGS. 17A to 17D. The first input may include an input indicating to select the visual object 1730 of FIG. 17B. The first input may include an input indicating to select and/or move the visual object 1760. The first input may be identified based on a distance between the first wearable device 101-1 and the second wearable device 101-2.

Referring to FIG. 19, in operation 1920, according to an embodiment, the first wearable device 101-1 may transmit a first signal 1922 based on a first input of operation 1910 to the second wearable device 101-2. The second wearable device 101-2 receiving the first signal 1922 may display a visual object to generate an area for controlling the exchange of information with the first wearable device 101-1 within operation 1930. The second wearable device 101-2 may display a visual object of operation 1920 to receive an input for allowing the exchange of information with the first wearable device 101-1.

Referring to FIG. 19, within operation 1940, according to an embodiment, the second wearable device 101-2 may identify a second input associated with the visual object of operation 1930. The second wearable device 101-2 receiving the second input may transmit a second signal 1952 associated with the second input of operation 1940 to the first wearable device 101-1 within operation 1950. The second signal 1952 may include information indicating whether the exchange of information between the second wearable device 101-2 and the first wearable device 101-1 is allowed based on the visual object of operation 1930.

Referring to FIG. 19, in operation 1960, according to an embodiment, the first wearable device 101-1 may generate an area for exchanging information between the first wearable device 101-1 and the second wearable device 101-2, based on the second input. The first wearable device 101-1 may identify information on a second input from the second signal 1952. Based on the second signal 1952, when the second input identified by the second wearable device 101-2 indicates that the exchange of information between the first wearable device 101-1 and the second wearable device 101-2 is allowed, the first wearable device 101-1 may add an area for controlling the exchange of information between the first wearable device 101-1 and the second wearable device 101-2 in the virtual space. Similarly, the second wearable device 101-2 may also generate an area for exchanging information between the first wearable device 101-1 and the second wearable device 101-2. The area may be formed in a control panel for remotely controlling a virtual object, such as the intersection area 1720 and/or the area 1740 of FIGS. 17A to 17D. The area may be formed in a portion of a virtual space spaced apart from the control panel, such as the control panel 1770 of FIG. 17D. After generating an area based on operation 1960, the first wearable device 101-1 may transmit information on a virtual object selected by the third input to the second wearable device 101-2, in response to a third input associated with the area.

As described above, according to an embodiment, the first wearable device 101-1 may generate a sharing panel for transmitting information on the virtual object to the second wearable device 101-2, together with a control panel for remotely controlling virtual objects in a virtual space. Based on the visual object moved between the control panel and the sharing panel, the first wearable device 101-1 may transmit information associated with the virtual object corresponding to the visual object to the second wearable device 101-2.

The operation of the wearable device described with reference to FIGS. 1A, 1B, 2, 3A, 3B, 4A, 4B, 5, 6A, 6B, 7 to 9, 10A to 10D, 11A to 11C, 12 to 14, 15A, 15B, 16, 17A to 17D, 18, and 19 may be associated with a metaverse service provided through a network. Hereinafter, referring to FIG. 20, according to an embodiment, an example of a metaverse service provided to a user based on a wearable device will be described.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service.

Figure 20:
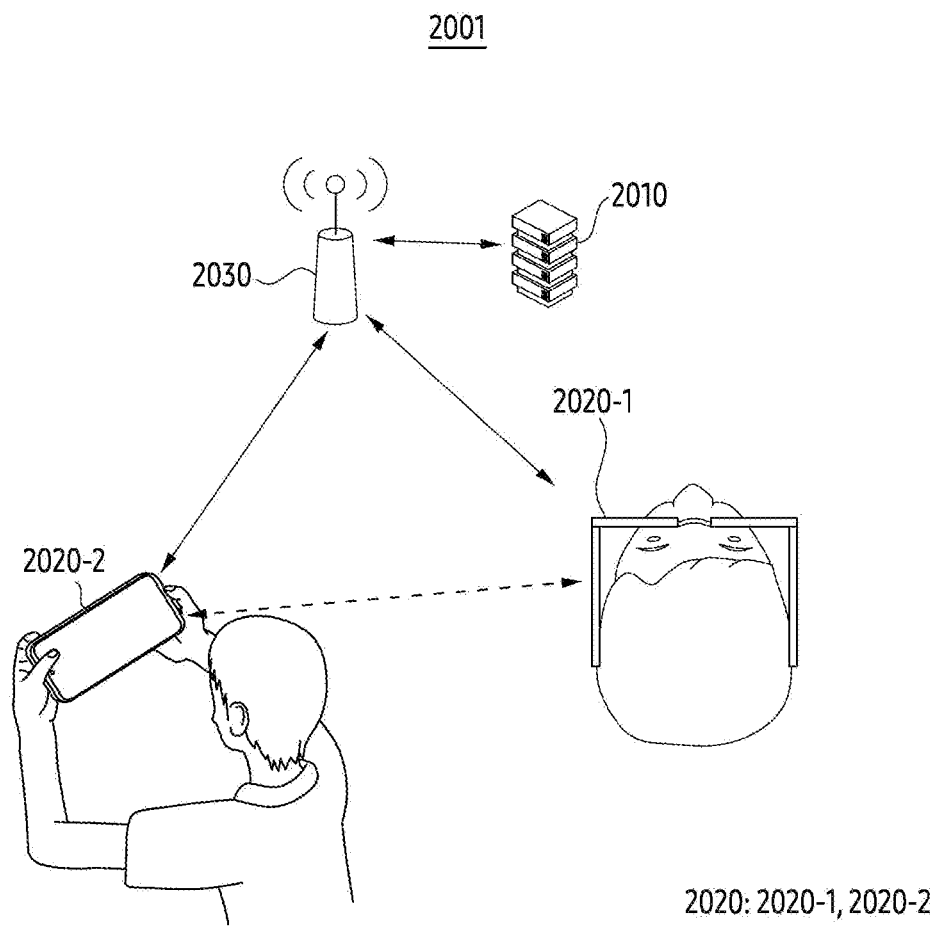
FIG. 20 is a diagram of a network environment associated with a metaverse service.

FIG. 20 is a diagram of a network environment 2001 that receives a metaverse service through a server 2010.

Referring to FIG. 20, the network environment 2001 may include a server 2010, a user terminal 2020 (e.g., a first terminal 2020-1 and a second terminal 2020-2), and a network connecting the server 2010 and the user terminal 2020. In the network environment 2001, the server 2010 may provide a metaverse service to the user terminal 2020. The network may be formed by at least one intermediate node 2030 including an access point (AP) and/or a base station. The user terminal 2020 may access the server 2010 through a network and output a user interface (UI) associated with the metaverse service to the user of the user terminal 2020. Based on the UI, the user terminal 2020 may obtain information to be inputted into the metaverse service from the user or output information associated with the metaverse service (e.g., multimedia content) to the user.

In this case, the server 2010 provides a virtual space so that the user terminal 2020 may perform activities in the virtual space. In addition, the user terminal 2020 may represent information provided by the server 2010 to the user or transmit information in which the user wants to represent in the virtual space to the server, by installing S/W agent to access a virtual space provided by the server 2010. The S/W agent may be provided directly through the server 2010, downloaded from a public server, or embedded and provided when purchasing a terminal.

In an embodiment, the metaverse service may be provided to the user terminal 2020 and/or the user by using the server 2010. The embodiment is not limited thereto, and the metaverse service may be provided through individual contact between users. For example, within the network environment 2001, the metaverse service may be provided by a direct connection between the first terminal 2020-1 and the second terminal 2020-2, independently of the server 2010. Referring to FIG. 20, in the network environment 2001, the first terminal 2020-1 and the second terminal 2020-2 may be connected to each other through a network formed by at least one intermediate node 2030. In an embodiment where the first terminal 2020-1 and the second terminal 2020-2 are directly connected, any one user terminal of the first terminal 2020-1 and the second terminal 2020-2 may serve as the server 2010. For example, a metaverse environment may be configured only with a device-to-device connection (e.g., a peer-to-peer (P2P) connection).

In an embodiment, the user terminal 2020 (or the user terminal 2020 including the first terminal 2020-1 and the second terminal 2020-2) may be made into various form factors, and may be characterized by including an input device for inputting information to the metaverse service and an output device that provides video and/or sound to the user. Examples of various form factors of the user terminal 2020 include a smartphone (e.g., the second terminal 2020-2), an AR device (e.g., the first terminal 2020-1), a VR device, an MR device, a video see through (VST) device, an optical see through (OST) device, a smart lens, a smart mirror, a TV or a projector capable of input/output.

Network (e.g., a network formed by at least one intermediate node 2030) include various broadband networks including 3G, 4G, and 5G, a short-range networks including Wi-fi and BT (e.g., a wired network or a wireless network that directly connect the first terminal 2020-1 and the second terminal 2020-2).

In an embodiment, the user terminal 2020 of FIG. 20 may include the wearable device 101 of FIGS. 1A, 1B, 2, 3A, 3B, 4A, 4B, and 5.

In an embodiment, a method for a user wearing a wearable device to remotely control a virtual object displayed through a displaying area of the wearable device by using a visual object shown closer than the virtual object may be required. As described above, according to an embodiment, a wearable device (e.g., the wearable device 101 of FIGS. 1A, 1B, 2, 3A, 3B, 4A, 4B, 5, 6A, 6B, 7 to 9, 10A to 10D, 11A to 11C, 12 to 14, 15A, 15B, 16, 17A, and 18) may comprise a camera (e.g., the cameras 225 of FIG. 2), a display (e.g., the display 220 of FIG. 2), and a processor (e.g., the processor 210 of FIG. 2). The processor may be configured to obtain, by using the camera disposed toward a direction of a displaying area formed by the display, an image including at least portion of the displaying area. The processor may be configured to identify locations of one or more virtual objects disposed in the displaying area based on the image. The processor may be configured to display, on a plane (e.g., the control panel 140 of FIGS. 1A and 1B) disposed based on a location of the wearable device in an external space including the wearable device, the image overlapped with one or more visual objects representing the one or more virtual objects. The one or more visual objects may be disposed on the image based on the identified locations. The processor may be configured to modify, in response to an input associated with the one or more visual objects, the one or more virtual objects. According to an embodiment, the wearable device may execute a function of remotely controlling the virtual object by using the visual object displayed in the plane.

For example, the processor may be configured to display, in response to the input indicating to select a first visual object (e.g., the first visual object 151 of FIGS. 1A and 1B) overlapped on the image on the plane, a plurality of handles associated with the first visual object. The processor may be configured to modify, in response to another input indicating to control at least one of the plurality of handles, a first virtual object (e.g., the first virtual object 131 of FIGS. 1A and 1B) corresponding to the first visual object.

For example, the processor may be configured to display, in a virtual space (e.g., the space 160 of FIGS. 1A and 1B) mapped to the external space, the plurality of handles which are respectively corresponding to a plurality of preset axis with respect to the virtual space and are displayed for controlling rotation of the first virtual object.

For example, the processor may be configured to display, in the virtual space mapped to the external space, the plurality of handles including a preset handle for moving the first virtual object along the direction of the displaying area.

For example, the processor may be configured to display, in response to another input indicating to select the preset handle, one or more guidelines extended from the first virtual object to a floor of the external space.

For example, the processor may be configured to display, in response to the input, an executable object matched to a function supported by a first application associated with the first virtual object. The processor may be configured to execute, in response to another input indicating to select the executable object, the function by using the first application.

For example, the processor may be configured to display another visual object different from the one or more visual objects, in a second area (e.g., the second area 1012 of FIGS. 10A to 10D) different from a first area (e.g., the first area 1011 of FIGS. 10A to 10D) where the image is displayed, in the plane.

For example, the processor may be configured to cease at least temporary, in response to another input indicating to move the first visual object from the first area to the second area, to display first virtual object corresponding to the first visual object.

For example, the processor may be configured to display, in response to another input indicating to move the other visual object from the second area to the first area, virtual object associated with the other visual object.

For example, the processor may be configured to display another visual object (e.g., the visual objects 1611 and 1612 of FIG. 16) associated with another external space different from the external space in the plane. The processor may be configured to modify, in response to an input indicating to select the other visual object, an image displayed in the plane to another image with respect to the other external space. The processor may be configured to display, on the other image, at least one visual object representing at least one virtual object disposed in the other external space.

For example, the wearable device may comprise a communication circuit (e.g., the communication circuit 235 of FIG. 2). The processor may be configured to identify, based on information received from an external electronic device through the communication circuit, the locations of the one or more virtual objects disposed in the displaying area. The processor may be configured to transmit, to the external electronic device, information with respect to the modified one or more virtual objects, in response to the input.

For example, the wearable device may comprise a communication circuit. The processor may be configured to display, with a first area on the plane where the image is displayed, a second area for sharing information with an external electronic device connected through the communication circuit.

For example, the processor may be configured to transmit, to the external electronic device through the communication circuit, information associated with a virtual object corresponding to the first visual object, in response to another input indicating to move a first visual object from the first area to the second area.

For example, the processor may be configured to display, based on identifying the external electronic device spaced apart from the wearable device less than a preset distance in the external space by using the communication circuit, the second area.

For example, the processor may be configured to display, in the displaying area, a guideline extended from the plane to another plane matched to the external electronic device.

For example, the processor may be configured to reproduce, based on an avatar (e.g., the avatar 1330 of FIG. 13) associated with a virtual object selected by the input, animation indicating to modify the virtual object selected by the input.

For example, the processor may be configured to obtain, by applying a preset ratio to an altitude (e.g., the altitude a1 of FIG. 6A) of the wearable device with respect to the external space, an altitude (e.g., the altitude a2 of FIG. 6A) of the plane with respect to the external space.

For example, the processor may be configured to identify an input indicating to select the plane in the external space, by tracking a preset body part including the hand using the camera.

For example, the processor may be configured to display at least a portion of the plane in which the image and the one or more visual objects are disposed in the displaying area, based on the direction of the displaying area and a location of the plane.

For example, the processor may be configured to display, as a control panel for controlling the one or more virtual objects disposed in the external space recognized by the wearable device, the image overlapped to the one or more visual objects on the plane.

As described above, according to an embodiment, a method of an electronic device may comprise obtaining, by using a camera of the wearable device disposed toward a direction of a displaying area formed by a display, an image including at least portion of the displaying area formed by the display of the wearable device. The method may comprise identifying locations of one or more virtual objects disposed in the displaying area based on the image. The method may comprise displaying, on a plane disposed based on a location of the wearable device in an external space including the wearable device, the image overlapped with one or more visual objects representing the one or more virtual objects. The one or more visual objects may be disposed on the image based on the identified locations. The method may comprise modifying, in response to an input associated with the one or more visual objects, the one or more virtual objects.

For example, the identifying may comprise identifying, based on information received from an external electronic device through the communication circuit of the wearable device, the locations of the one or more virtual objects disposed in the displaying area. The identifying may comprise, in response to the input, transmitting, to the external electronic device, information with respect to the modified one or more virtual objects.

For example, the displaying may comprise displaying, with a first area on the plane where the image is displayed, a second area for sharing information with an external electronic device connected through the communication circuit.

For example, the method may comprise, in response to another input indicating to move a first visual object from the first area to the second area, transmitting, to the external electronic device through the communication circuit, information associated with a virtual object corresponding to the first visual object.

For example, the displaying the second area may comprise displaying, based on identifying the external electronic device spaced apart from the wearable device less than a preset distance in the external space by using the communication circuit, the second area.

For example, the displaying the second area may comprise displaying, in the displaying area, a guideline extended from the plane to another plane matched to the external electronic device.

For example, the modifying may comprise displaying, in response to the input indicating to select a first visual object 151 overlapped on the image on the plane, a plurality of handles associated with the first visual object. The modifying may comprise modifying, in response to another input indicating to control at least one of the plurality of handles, a first virtual object 131 corresponding to the first visual object.

For example, the displaying the plurality of handles may comprise displaying, in a virtual space mapped to the external space, the plurality of handles which are respectively corresponding to a plurality of preset axis with respect to the virtual space and are displayed for controlling rotation of the first virtual object.

For example, the displaying the plurality of handles may comprise displaying, in the virtual space mapped to the external space, the plurality of handles including a preset handle for moving the first virtual object along the direction of the displaying area.

For example, the modifying may comprise displaying, in response to another input indicating to select the preset handle, one or more guidelines extended from the first virtual object to a floor of the external space.

For example, the displaying the plurality of handles may comprise displaying, in response to the input, an executable object matched to a function supported by a first application associated with the first virtual object. The displaying the plurality of handles may comprise executing, in response to another input indicating to select the executable object, the function by using the first application.

For example, the displaying may comprise displaying another visual object different from the one or more visual objects, in a second area different from a first area where the image is displayed, in the plane.

For example, the method may comprise ceasing at least temporary, in response to another input indicating to move the first visual object from the first area to the second area, to display first virtual object corresponding to the first visual object.

For example, the method may comprise displaying, in response to another input indicating to move the other visual object from the second area to the first area, virtual object associated with the other visual object.

For example, the displaying may comprise displaying, as a control panel for controlling the one or more virtual objects disposed in the external space recognized by the wearable device, the image overlapped to the one or more visual objects on the plane.

As described above, according to an embodiment, a non-transitory computer readable storage medium storing one or more programs, the one or more programs may comprise instructions which, when executed by a processor of a wearable device including a camera a display, cause the wearable device to obtain, by using the camera disposed toward a direction of a displaying area formed by the display, an image including at least portion of the displaying area. The non-transitory computer readable storage medium storing the one or more programs, the one or more programs may comprise instructions which, when executed by the processor, cause the wearable device to identify locations of one or more virtual objects disposed in the displaying area based on the image. The non-transitory computer readable storage medium storing the one or more programs, the one or more programs may comprise instructions which, when executed by the processor, cause the wearable device to display, on a plane disposed based on a location of the wearable device in an external space including the wearable device, the image overlapped with one or more visual objects representing the one or more virtual objects. The one or more visual objects may be disposed on the image based on the identified locations. The non-transitory computer readable storage medium storing the one or more programs, the one or more programs may comprise instructions which, when executed by the processor, cause the wearable device to modify, in response to an input associated with the one or more visual objects, the one or more virtual objects.

For example, the non-transitory computer readable storage medium storing the one or more programs, the one or more programs may comprise instructions which, when executed by the processor, cause the wearable device to obtain, by applying a preset ratio to an altitude of the wearable device with respect to the external space, an altitude of the plane with respect to the external space.

For example, the non-transitory computer readable storage medium storing the one or more programs, the one or more programs may comprise instructions which, when executed by the processor, cause the wearable device to identify an input indicating to select the plane in the external space, by tracking a preset body part including the hand using the camera.

For example, the non-transitory computer readable storage medium storing the one or more programs, the one or more programs may comprise instructions which, when executed by the processor, cause the wearable device to display at least a portion of the plane in which the image and the one or more visual objects are disposed in the displaying area, based on the direction of the displaying area and a location of the plane.

For example, the non-transitory computer readable storage medium storing the one or more programs, the one or more programs may comprise instructions which, when executed by the processor, cause the wearable device to display, as a control panel for controlling the one or more virtual objects disposed in the external space recognized by the wearable device, the image overlapped to the one or more visual objects on the plane.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A wearable device, comprising:
    a camera;
    a display;
    memory including one or more storage media storing instructions; and
    at least one processor,
    wherein the instructions, when executed by the at least one processor individually or collectively, cause the wearable device to:
        obtain, by using the camera disposed toward a direction of a displaying area formed by the display, an image including at least a portion of the displaying area,
        identify locations of one or more virtual objects disposed in the displaying area based on the image,
        display, on a plane disposed based on a location of the wearable device in an external space including the wearable device, the image overlapped with one or more visual objects representing the one or more virtual objects, wherein the one or more visual objects are disposed on the image based on the identified locations, and
        modify, in response to an input associated with the one or more visual objects, the one or more virtual objects, and
    wherein the input includes a first input moving a first visual object among the one or more visual objects, the movement causing a movement of a first virtual object corresponding to the first visual object among the one or more virtual objects.

2. The wearable device of claim 1, wherein the instructions, when executed by the at least one processor individually or collectively, further cause the wearable device to:
display, in response to an input indicating to select the first visual object overlapped on the image on the plane, a plurality of handles associated with the first visual object, and
modify, in response to another input indicating to control at least one of the plurality of handles, the first virtual object corresponding to the first visual object.

3. The wearable device of claim 2, wherein the instructions, when executed by the at least one processor individually or collectively, further cause the wearable device to:
display, in a virtual space mapped to the external space, the plurality of handles which are respectively corresponding to a plurality of preset axis with respect to the virtual space and are displayed for controlling rotation of the first virtual object.

4. The wearable device of claim 2, wherein the instructions, when executed by the at least one processor individually or collectively, further cause the wearable device to:
display, in a virtual space mapped to the external space, the plurality of handles including a preset handle for moving the first virtual object along the direction of the displaying area.

5. The wearable device of claim 2, wherein the instructions, when executed by the at least one processor individually or collectively, further cause the wearable device to:
display, in response to another input indicating to select a preset handle, one or more guide lines extended from the first virtual object to a floor of the external space.

6. The wearable device of claim 2, wherein the instructions, when executed by the at least one processor individually or collectively, further cause the wearable device to:
display, in response to the input indicating to select the first visual object, an executable object matched to a function supported by a first application associated with the first virtual object, and
execute, in response to another input indicating to select the executable object, the function by using the first application.

7. The wearable device of claim 1, wherein the instructions, when executed by the at least one processor individually or collectively, further cause the wearable device to:
receive an input on a displayed visual object depicting a timeline; and
modify a state of a virtual space based on a past time indicated by the input on the displayed visual object, the virtual space mapped to the external space.

8. The wearable device of claim 1, wherein the instructions, when executed by the at least one processor individually or collectively, further cause the wearable device to:
cease, in response to another input indicating to move the first visual object from a first area to a second area, to display the first virtual object corresponding to the first visual object.

9. The wearable device of claim 1, wherein the instructions, when executed by the at least one processor individually or collectively, further cause the wearable device to:
display, in response to another input indicating to move another visual object within a second area to a first area, another virtual object associated with the other visual object.

10. The wearable device of claim 1, wherein the instructions, when executed by the at least one processor individually or collectively, further cause the wearable device to:
display another visual object associated with another external space different from the external space in the plane,
modify, in response to an input indicating to select the other visual object, an image displayed in the plane to another image with respect to the other external space, and
display, on the other image, at least one visual object representing at least one virtual object disposed in the other external space.

11. The wearable device of claim 1, further comprising:
a communication circuit,
wherein the instructions, when executed by the at least one processor individually or collectively, cause the wearable device to:
identify, based on information received from an external electronic device through the communication circuit, the locations of the one or more virtual objects disposed in the displaying area, and
in response to the input, transmit, to the external electronic device, information with respect to the modified one or more virtual objects.

12. The wearable device of claim 1, further comprising:
a communication circuit,
wherein the instructions, when executed by the at least one processor individually or collectively, cause the wearable device to:
display, with a first area on the plane where the image is displayed, a second area for sharing information with an external electronic device connected through the communication circuit.

13. The wearable device of claim 12, wherein the instructions, when executed by the at least one processor individually or collectively, cause the wearable device to:
in response to another input indicating to move the first visual object from the first area to the second area, transmit, to the external electronic device through the communication circuit, information associated with the first virtual object corresponding to the first visual object.

14. The wearable device of claim 12, wherein the instructions, when executed by the at least one processor individually or collectively, cause the wearable device to:
display, based on identifying the external electronic device spaced apart from the wearable device less than a preset distance in the external space by using the communication circuit, the second area; and
display, in the displaying area, a guide line extended from the plane to another plane matched to the external electronic device.

15. The wearable device of claim 1, wherein the instructions, when executed by the at least one processor individually or collectively, cause the wearable device to:
receive the first input to move the first visual object among the one or more virtual objects from a first position in the plane to a second position in the plane;
based on the first input, obtain a distance to be applied to the first virtual object corresponding to the first visual object based on a distance between the first position and the second position; and
move the first virtual object in accordance with the obtained distance.

16. The wearable device of claim 1, wherein the instructions, when executed by the at least one processor individually or collectively, cause the wearable device to:

reproduce, based on an avatar associated with the first virtual object selected by the input, animation indicating to modify the first virtual object selected by the input.

17. The wearable device of claim 1, wherein the instructions, when executed by the at least one processor individually or collectively, cause the wearable device to:
obtain, by applying a preset ratio to an altitude a1 of the wearable device with respect to the external space, an altitude a2 of the plane with respect to the external space.

18. A method of an electronic device, the method comprising:
obtaining, by using a camera of a wearable device disposed toward a direction of a displaying area formed by a display, an image including at least a portion of the displaying area formed by the display of the wearable device;
identifying locations of one or more virtual objects disposed in the displaying area based on the image;
displaying, on a plane disposed based on a location of the wearable device in an external space including the wearable device, the image overlapped with one or more visual objects representing the one or more virtual objects, wherein the one or more visual objects are disposed on the image based on the identified locations; and
modifying, in response to an input associated with the one or more visual objects, the one or more virtual objects,
wherein the input includes a first input moving a first visual object among the one or more visual objects, the movement causing a movement of a first virtual object corresponding to the first visual object among the one or more virtual objects.

19. The method of claim 18, wherein the displaying comprises:
displaying, as a control panel for controlling the one or more virtual objects disposed in the external space recognized by the wearable device, the image overlapped to the one or more visual objects on the plane.

20. A non-transitory computer readable medium with one or more executable programs stored thereon, wherein the one or more executable programs instruct a processor of a wearable device to:
obtain, from a camera of the wearable device disposed toward a direction of a displaying area formed by a display of the wearable device, an image including at least portion of the displaying area;
identify locations of one or more virtual objects disposed in the displaying area based on the image;
display, on a plane disposed based on a location of the wearable device in an external space including the wearable device, the image overlapped with one or more visual objects representing the one or more virtual objects, wherein the one or more visual objects are disposed on the image based on the identified locations; and
modify, in response to an input associated with the one or more visual objects, the one or more virtual objects, and
wherein the input includes a first input moving a first visual object among the one or more visual objects, the movement causing a movement of a first virtual object corresponding to the first visual object among the one or more virtual objects.

\* \* \* \* \*